(12) United States Patent
Liaw et al.

(10) Patent No.: US 10,655,789 B2
(45) Date of Patent: May 19, 2020

(54) LIGHT-EMITTING DEVICE

(71) Applicant: EPISTAR CORPORATION, Hsinchu (TW)

(72) Inventors: Been-Yu Liaw, Hsinchu (TW); Hsuan-Wei Chen, Hsinchu (TW); Jian-Qin Liang, Hsinchu (TW); Kang-Sen Huang, Hsinchu (TW); Zhi-Guang Shen, Hsinchu (TW)

(73) Assignee: Epistar Corporation, Hsinchu (TW)

( * ) Notice: Subject to any disclaimer, the term of this patent is extended or adjusted under 35 U.S.C. 154(b) by 0 days.

(21) Appl. No.: 15/872,415

(22) Filed: Jan. 16, 2018

(65) Prior Publication Data
US 2018/0202613 A1    Jul. 19, 2018

(30) Foreign Application Priority Data

Jan. 17, 2017 (CN) .......................... 2017 1 0035957

(51) Int. Cl.
| | |
|---|---|
| *F21K 9/20* | (2016.01) |
| *F21K 9/66* | (2016.01) |
| *H05B 33/08* | (2020.01) |
| *F21V 23/00* | (2015.01) |
| *F21V 19/00* | (2006.01) |
| *F21V 23/06* | (2006.01) |
| *F21Y 107/90* | (2016.01) |

(Continued)

(52) U.S. Cl.
CPC .................. *F21K 9/20* (2016.08); *F21K 9/66* (2016.08); *F21V 23/005* (2013.01); *H05B 45/40* (2020.01); *F21K 9/90* (2013.01); *F21V 17/18* (2013.01); *F21V 19/003* (2013.01); *F21V 23/06* (2013.01); *F21Y 2107/90* (2016.08); *F21Y 2115/10* (2016.08)

(58) Field of Classification Search
CPC .... F21Y 2107/90; F21Y 2115/10; F21K 9/66; F21K 9/20; F21K 9/90; F21V 23/005; F21V 23/06; F21V 17/18; F21V 19/003; H05B 33/0821
See application file for complete search history.

(56) References Cited

U.S. PATENT DOCUMENTS

| | | | | |
|---|---|---|---|---|
| 6,483,439 B1 * | 11/2002 | Vukosic | .................. | G08B 5/36 340/473 |
| 6,924,744 B2 * | 8/2005 | Bohlander | ............... | B60Q 3/14 340/473 |

(Continued)

FOREIGN PATENT DOCUMENTS

CN            105987311 A        10/2016

*Primary Examiner* — Erin Kryukova
(74) *Attorney, Agent, or Firm* — Muncy, Geissler, Olds & Lowe, P.C.

(57) ABSTRACT

A lighting bulb according to embodiments of the disclosure comprises a light source assembly, a base and a transparent top cap. The light source assembly has a carrier plate, a first plurality of light-emitting units and a second plurality of light-emitting units. The carrier plate has first and second surfaces. The base is for fixing the carrier plate to have the first surface facing to a first direction and the second surface facing to a second direction opposite to the first direction. The transparent top cap has an inner surface facing to a third direction perpendicular to the first and second directions. The first and second plurality of light-emitting units are located between the transparent top cap and the base.

16 Claims, 47 Drawing Sheets

(51) Int. Cl.
*F21V 17/18* (2006.01)
*F21Y 115/10* (2016.01)
*F21K 9/90* (2016.01)
*H05B 45/40* (2020.01)

(56) References Cited

U.S. PATENT DOCUMENTS

| | | | |
|---|---|---|---|
| 2004/0150995 A1* | 8/2004 | Coushaine | F21K 9/232 |
| | | | 362/255 |
| 2005/0189557 A1* | 9/2005 | Mazzochette | F21V 29/70 |
| | | | 257/100 |
| 2006/0215422 A1* | 9/2006 | Laizure, Jr. | F21V 31/005 |
| | | | 362/650 |
| 2008/0174224 A1* | 7/2008 | Liao | F21V 3/00 |
| | | | 313/318.01 |
| 2015/0292686 A1* | 10/2015 | Negley | F21V 3/0625 |
| | | | 315/34 |
| 2015/0312983 A1* | 10/2015 | Hu | F21K 9/64 |
| | | | 315/186 |
| 2016/0061388 A1* | 3/2016 | Xiong | F21V 29/70 |
| | | | 362/294 |
| 2016/0131310 A1* | 5/2016 | Lu | F21V 23/06 |
| | | | 362/362 |
| 2016/0290594 A1* | 10/2016 | Thijssen | F21V 5/02 |
| 2016/0298812 A1* | 10/2016 | Chen | F21K 9/1355 |
| 2016/0311363 A1* | 10/2016 | Ferigo | F21S 43/195 |
| 2016/0356428 A1* | 12/2016 | Edmond | F21V 3/02 |
| 2016/0356476 A1 | 12/2016 | Hu et al. | |
| 2018/0128429 A1* | 5/2018 | Bergenek | F21V 5/04 |
| 2019/0101246 A1* | 4/2019 | Wang | F21K 9/233 |

* cited by examiner

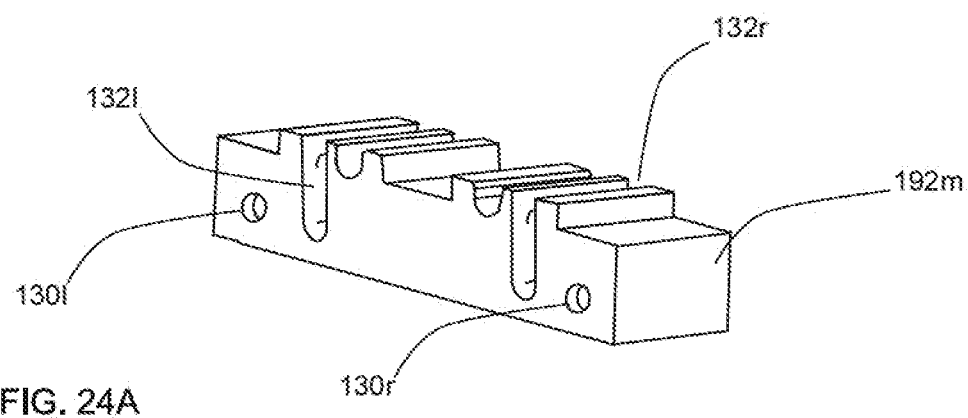
FIG. 24A
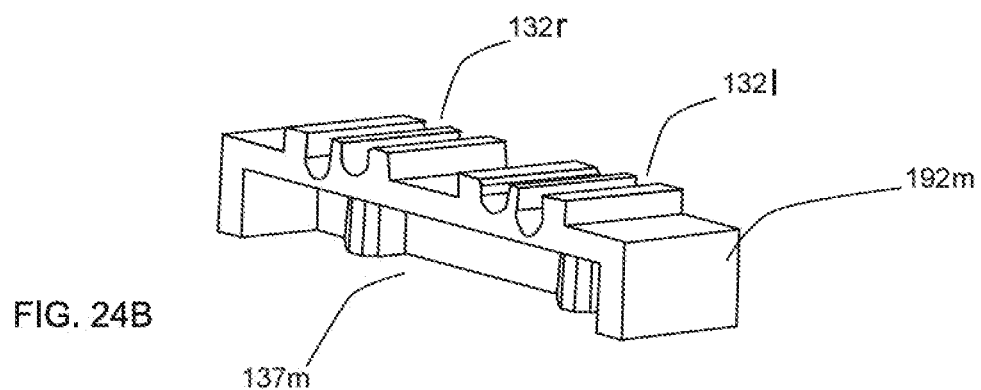
FIG. 24B
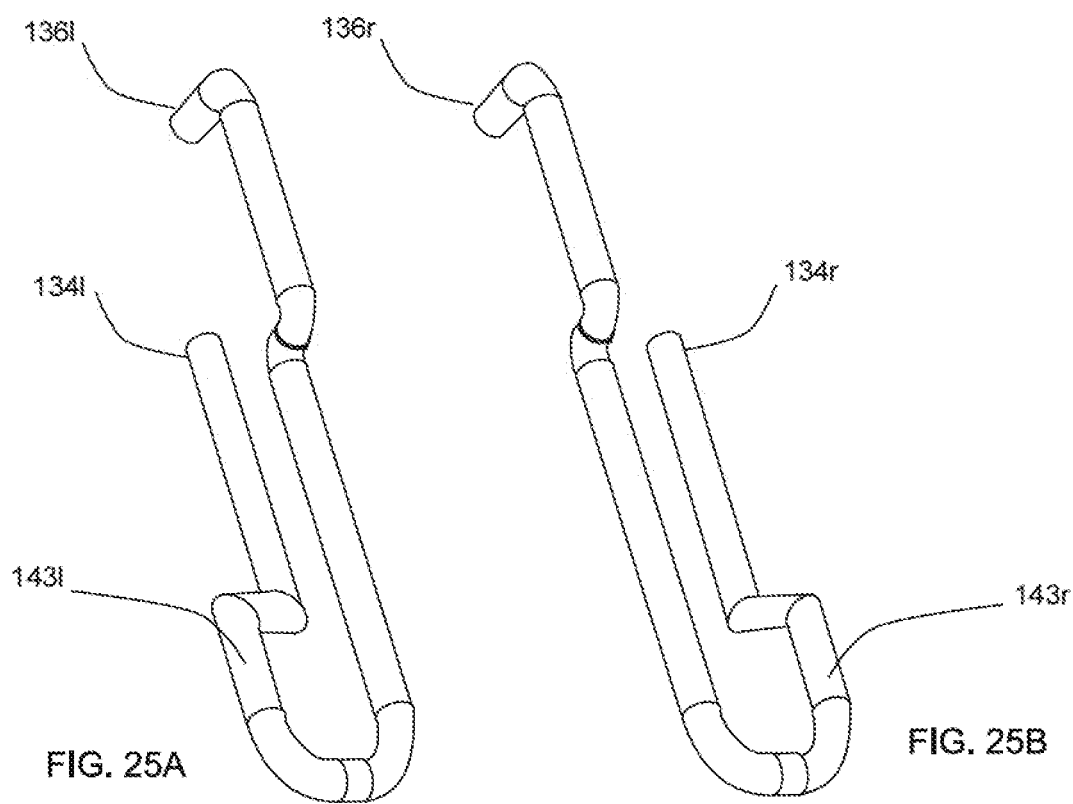
FIG. 25A
FIG. 25B

LIGHT-EMITTING DEVICE

TECHNICAL FIELD

The present disclosure relates to a small lighting bulb using LED as a light source.

DESCRIPTION OF BACKGROUND ART

Because LED has the advantages of saving power, long lifetime, environmental protection, etc., various new LED bulb products are produced to replace traditional incandescent bulb and halogen bulb. Traditional capsule bulb is a small lighting bulb, for example, G4 or G9 bulbs belong to capsule bulb. Taking G9 bulb for example, it is used for modern European crystal chandelier, but the whole weight that the chandelier can take is limited. According to rules of lighting industry international standards BS EN60061-1-1993+A46-2011, there are specific demands for the weight of G9 bulb. In general, the weight of G9 bulb cannot exceed 12 gram.

Most LED bulbs for replacing G9 halogen bulb (hereinafter"G9 LED bulb") in the present market are using direct current (DC) to drive the bulbs, which needs specific driving circuits. In the meanwhile, because of the light-emitting directionality of the LED, G9 LED bulb needs some special mechanical structures for accommodating light source like LED to make LED face different directions to generate omnidirectional light-emission pattern similar to what traditional G9 halogen bulb produces. As a consequence, G9 LED bulb has a larger volume, complicated manufacture and assemble processes, and high cost. Besides, the heat dissipation of LED is also the key factor to determine the quality of G9 LED bulb. If the heat dissipation efficiency is not good, it significantly decreases the lifetime of the product.

Therefore, the issues like the heat dissipation, light-emission pattern, cost of manufacture and the limitation of 12 gram weight need to be considered when making G9 LED bulb. However, based on current technology, it is difficult to resolve everything. For example, current technology usually has no market competitiveness due to high cost of G9 LED bulb, or has the issues about small lighting angle and short lifetime.

SUMMARY OF THE DISCLOSURE

A lighting bulb disclosed in the embodiments in accordance with the present disclosure includes a light source assembly, a base, and a transparent top cap. The light source assembly includes a carrier plate, a first plurality of light-emitting units and a second plurality of light-emitting units. The carrier plate has a first surface and a second surface. The first and second plurality of light-emitting units are respectively mounted on the first surface and the second surface. The base is for fixing the carrier plate such that the first surface faces to a first direction and the second surface faces to a second direction. The first direction is opposite to the second direction. The transparent top cap has an inner surface facing to a third direction perpendicular to the first and second directions. The first and second plurality of light-emitting units are located between the transparent top cap and the base. The transparent top cap refracts or scatters the light emitted from the first and second plurality of light-emitting units.

BRIEF DESCRIPTION OF THE DRAWINGS

FIGS. 14A-1, 14A-2, and 14A-3 respectively show a front view, a perspective view and a side view of an LED bulb disclosed in the embodiments in accordance with the present disclosure.

FIGS. 14B-1, 14B-2 and 14B-3 respectively show the front view, perspective view and side view of an LED bulb disclosed in the embodiments in accordance with the present disclosure.

FIGS. 14C-1 and 14C-2 respectively show the front view and perspective view of an LED bulb disclosed in the embodiments in accordance with the present disclosure.

FIGS. 14D-1 and 14D-2 respectively show the front view and perspective view of an LED bulb disclosed in the embodiments in accordance with the present disclosure.

FIGS. 14E-1 and 14E-2 respectively show the front view and perspective view of an LED bulb disclosed in the embodiments in accordance with the present disclosure.

FIGS. 24A and 24B respectively show two perspective views from different directions of a position component.

FIGS. 25A and 25B respectively show two pins.

DETAILED DESCRIPTION OF THE PRESENT DISCLOSURE

In the present description, some of the same symbols are used to indicate elements having the same or similar structures, functions, and principles, and persons of ordinary skill in the art can infer the present disclosure according to the teaching of this description. For the conciseness of the description, the same symbols will not be repeated.

Figure 1:
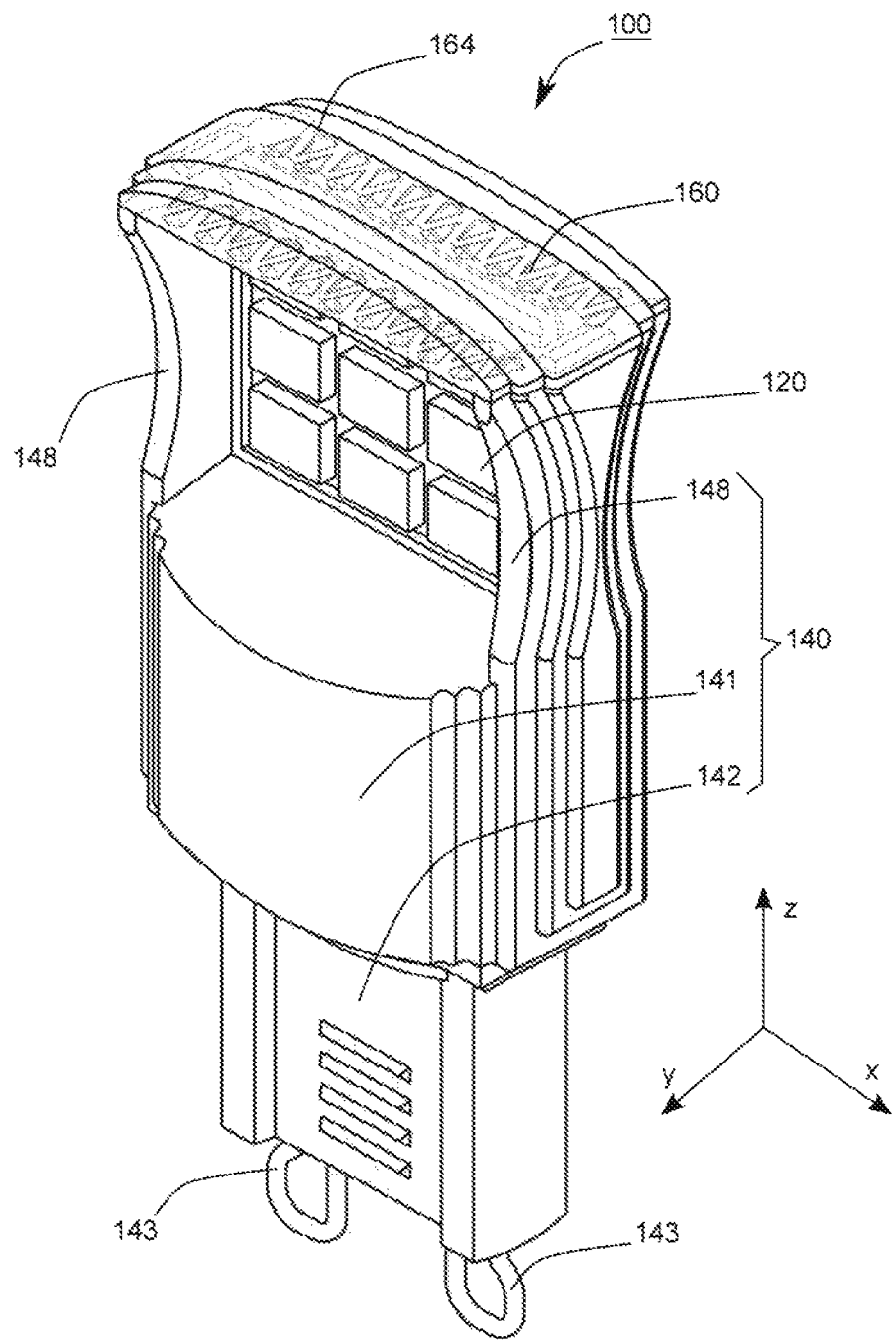
FIGS. 1 through 7 respectively show the perspective view, front view, back view, left view, right view, top view and bottom view of a G9 LED bulb disclosed in the embodiments in accordance with the present disclosure.
Figure 2:
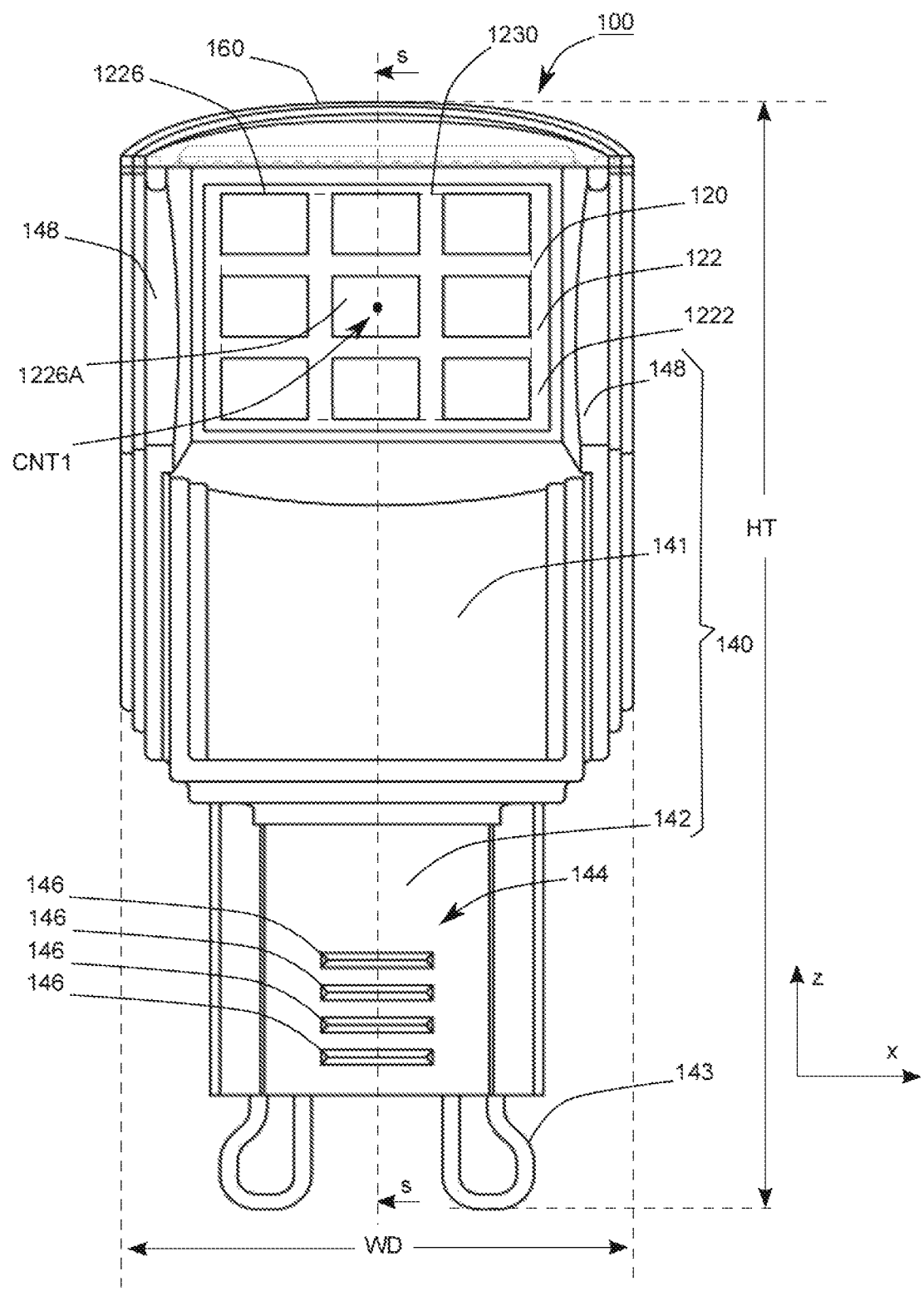
Figure 3:
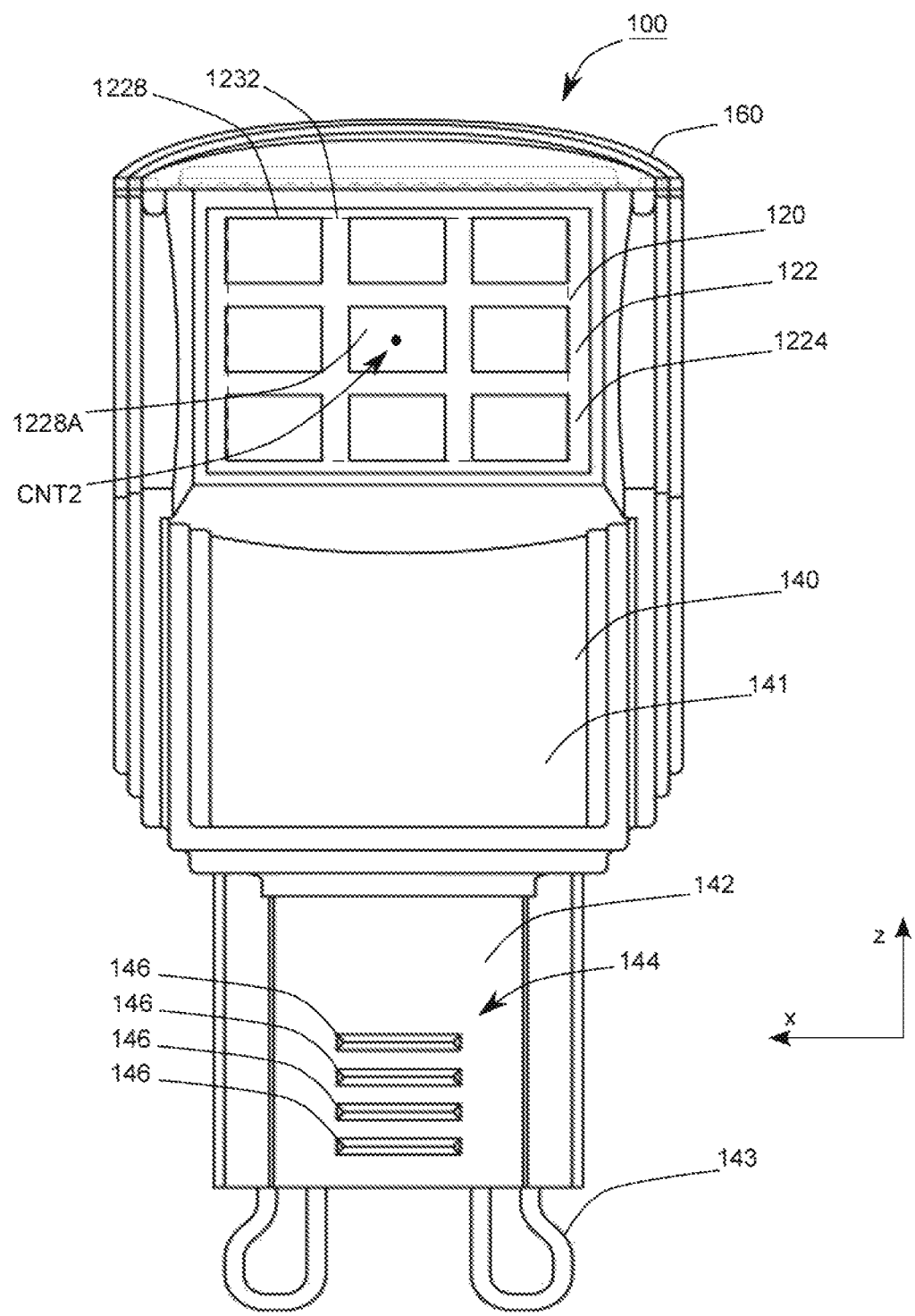
Figure 4:
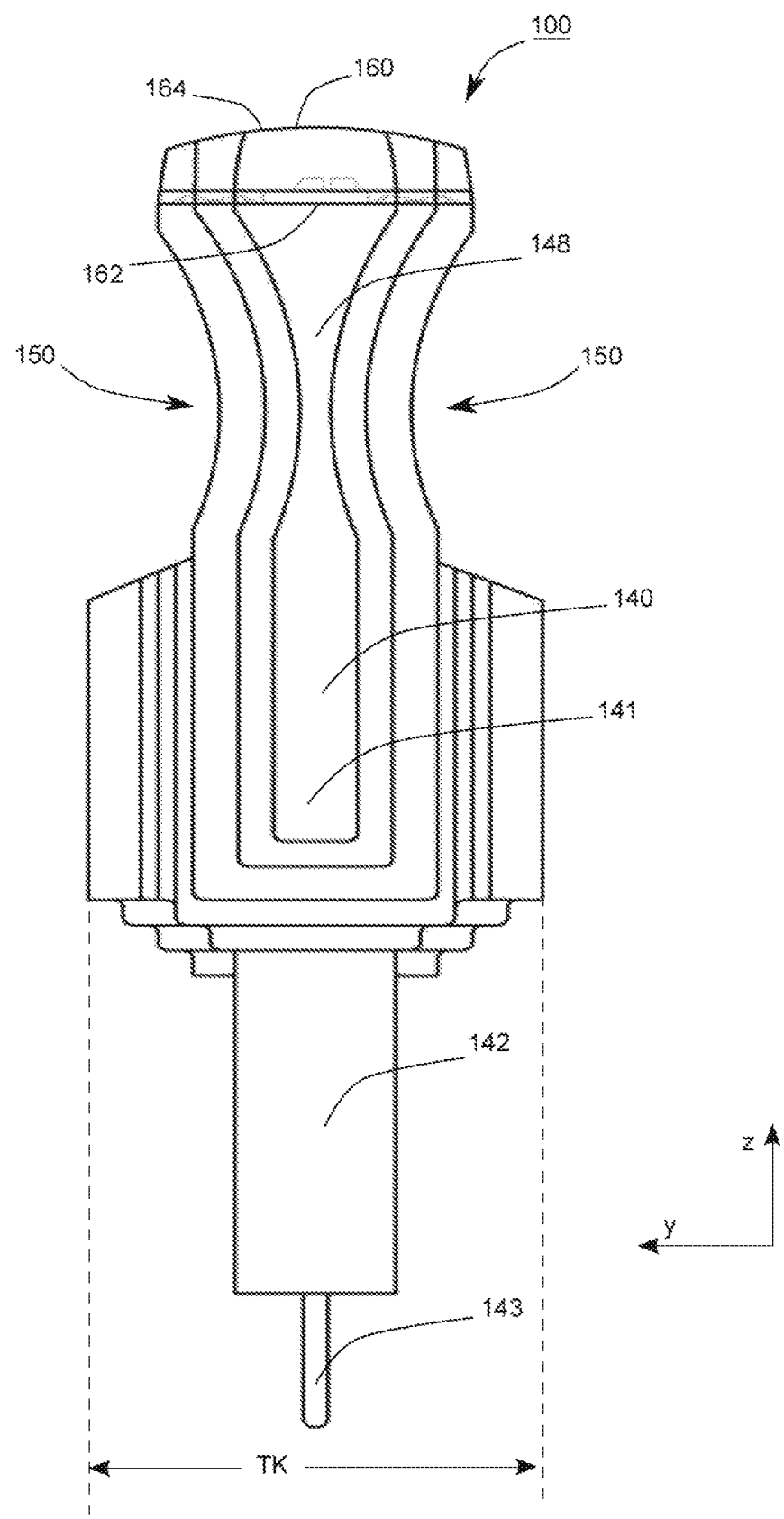

FIGS. 1 through 7 respectively show the perspective view, front view, back view, left view, right view, top view and bottom view of an LED bulb 100 disclosed in the embodiments in accordance with the present disclosure. FIGS. 1 through 7 also show x, y, z coordinate directions perpendicular to each other to illustrate the corresponding relationship of the components of LED bulb 100. As shown in the figures, the LED bulb 100 includes a transparent top cap 160, a light source assembly 120, and a base 140. The width WD and height HT of LED bulb 100 shown in FIG. 2 are 20-25 mm and 50-55 mm, respectively. The thickness TK of LED bulb 100 shown in FIG. 4 is 10-15 mm.

The light source assembly 120 includes a PCB circuit board (printed circuit board) 122 as a carrier plate. The PCB circuit board 122 has a front surface 1222 and a back surface 1224, on which LEDs 1226 and 1228 are set respectively. Each LED is a light-emitting unit. Because of the light-emitting directionality, the main illumination direction of each LED 1226 is set as the positive y-direction, and the main illumination direction of each LED 1228 is set as the negative y-direction. There is no LED in the light source assembly 120 having the main illumination direction of positive or negative z-direction. As shown in FIGS. 1 to 7, the front surface 1222 faces the positive y-direction and the back surface 1224 faces the negative y-direction.

The base 140 includes a main body 141, a bottom body 142 and two side frames 148. There is a pin 143 below the bottom body 142. The pin 143 extends through the bottom body 142. Two flat surfaces of the bottom body 142 have a latch groove 144 for plugging therein, wherein there are four separated protruding strips 146 arranged in parallel with each other. The size of the latch groove 144 is standard so that the LED bulb 100 can be mounted on a standard bulb holder (not shown). In the present embodiment, the pin 143 can meet the standard of G9 bulb. Alternatively, in another embodiment, the pin 143 can meet the standard of G4 and GU10 bulb.

Figure 5:
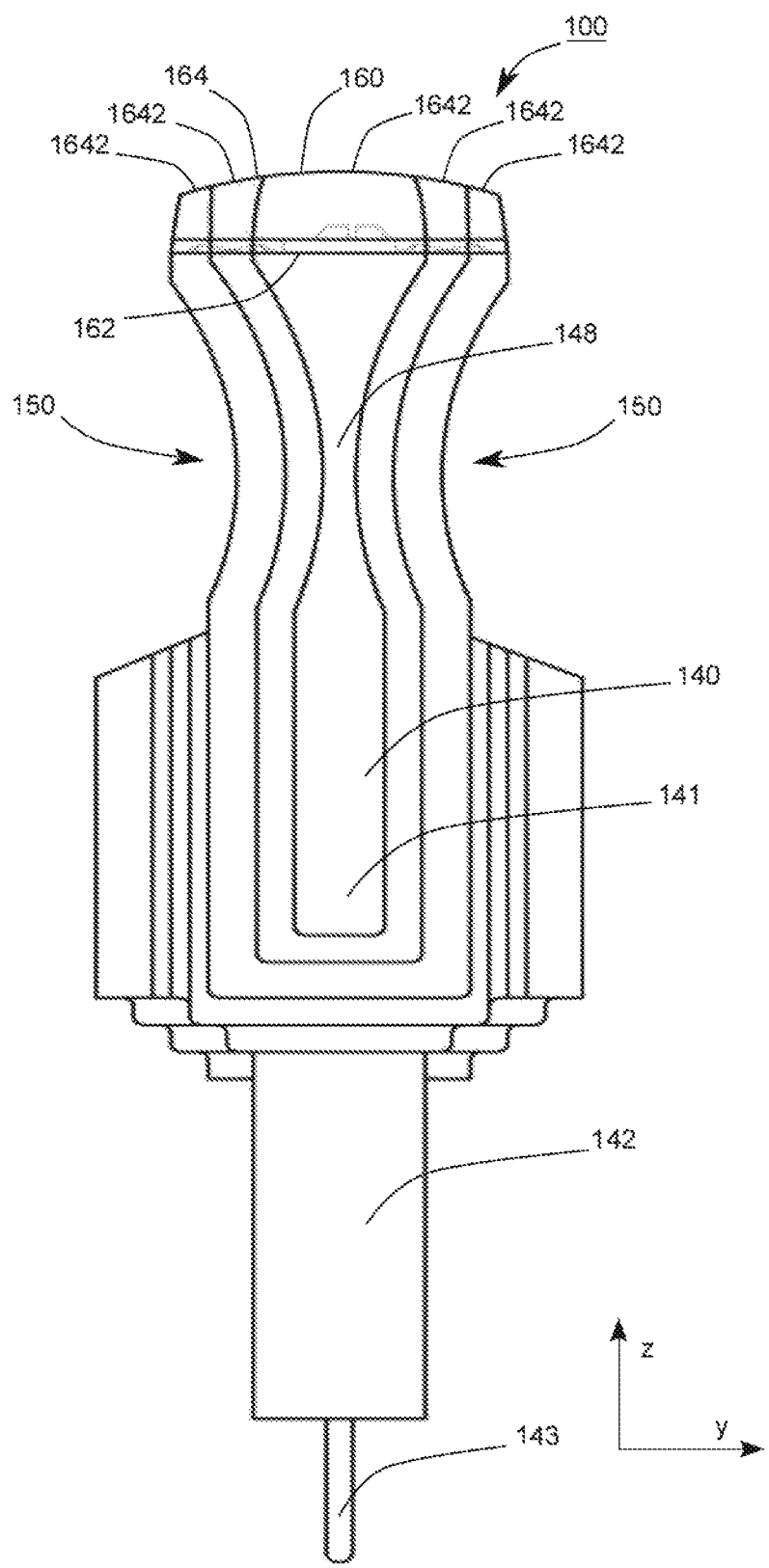

In the production, the main body 141, the side frame 148 and the bottom body 142 may be integrally formed, and all of them are made of thermal conductive plastic. Thermal conductivity of thermal conductive plastic is greater than 1.3 W/mK (for example: 1.4 W/mK, 1.5 W/mK, 1.6 W/mK, 2.0 W/mK). The main body 141 and the side frame 148 can fix the PCB circuit board 122. More specifically, the PCB circuit board 122 can be fixed between the two side frames 148. As shown in FIGS. 4 and 5, the recess 150 is formed in the side frame 148, and the LEDs 1226 and 1228 are disposed in the recess 150. Therefore, the LEDs 1226 and 1228 cannot be seen in FIGS. 4 and 5. A plurality of protruding patterns is also formed on the surfaces of the main body 141 and the side frame 148. In addition to the aesthetic purpose, the surface area can be increased to improve the heat dissipation ability of the LED bulb 100. In this embodiment, the base 140 has a surface area of 2000-3000 $mm^2$ and the LED bulb 100 has a luminous flux greater than or equal to 400 lumens at 110 AVC. The main body 141 and the side frame 148 can fix the PCB circuit board 122. The base 140 is not formed directly above the LEDs 1226 and 1228, which means the base 140 does not cover the LEDs 1226 and 1228.

As shown in FIGS. 1 to 7, in the main illumination direction (positive y-direction) of the LED 1226, there is no transparent or non-transparent mask so unnecessary lighting loss is avoided. Similarly, in the main illumination direction (negative y-direction) of the LED 1228, there is no transparent or non-transparent mask.

The transparent top cap 160 is fixed above the base 140 and the light source assembly 120. As shown in FIGS. 1-6. The transparent top cap 160 has an inner surface 162 and an outer surface 164 facing the negative z-direction and the positive z-direction, respectively. The LEDs 1226 and 1228 are located between the base 140 and the transparent top cap 160. The LEDs 1226 and 1228 are substantially surrounded by the base 140 and the transparent top cap 160 except the positive and negative y directions. In other words, the base 140 and the transparent top cap 160 are not formed directly above the LEDs 1226 and 1228, which means the base 140 and the transparent top cap 160 do not cover the LEDs 1226 and 1228 and the LEDs 1226 and 1228 are directly exposed to the external environment (for example: air). "The LEDs 1226 and 1228 are directly exposed to the external environment" described herein means that the user can directly see and directly contact the LEDs 1226 and 1228. Alternatively, "(t)he LEDs 1226 and 1228 are directly exposed to the external environment" means that the light emitted from the LEDs 1226 or 1228 in the main illumination direction does not pass through a material having a refractive index greater than 1.1 after being emitted into the air (external environment).

The transparent top cap 160 can be transparent plastic to scatter or refract the light emitted from the LEDs 1226 and 1228 so that a part of the light emitted from the LEDs 1226 or 1228 can move towards the positive z-direction. In other words, the transparent top cap 160 can increase the amount of light emitted by the LED bulb 100 in the positive z-direction.

Figure 6:
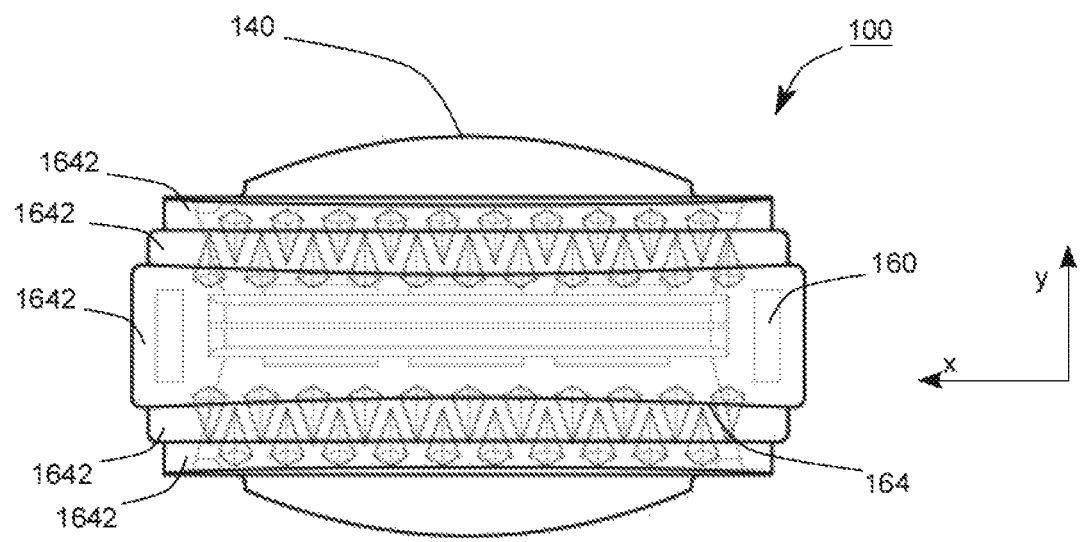
Figure 7:
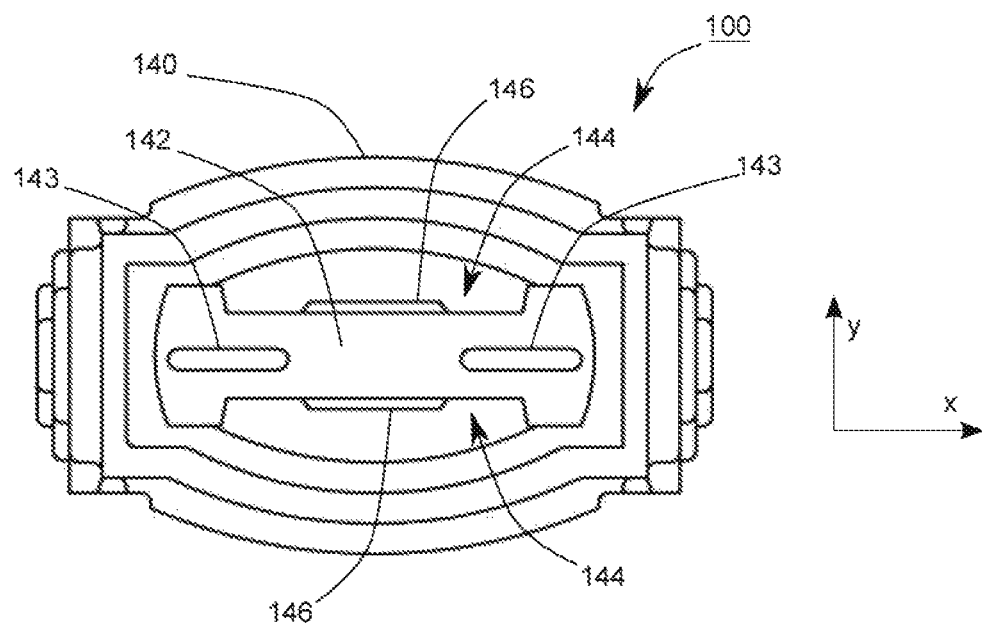

As shown in FIG. 5 and FIG. 6, the outer surface 164 of the transparent top cap 160 is formed with a plurality of optical arc surfaces 1642 to provide refracting or scattering functions.

Figure 8:
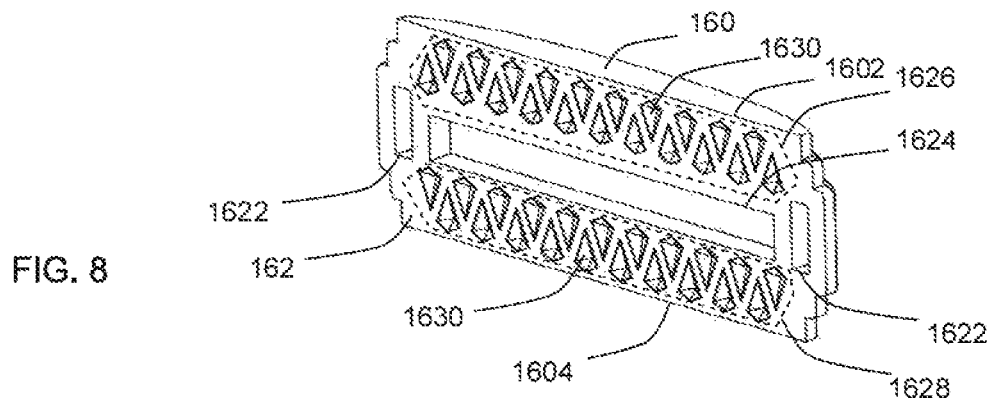
FIG. 8 is a perspective view of a transparent top cap.

FIG. 8 shows a perspective view of the transparent top cap 160. The inner surface 162 of the transparent top cap 160 has a groove 1624 and two fixing holes 1622. The PCB circuit board 122 can be inserted into the groove 1624, and the side frame 148 can stick into the fixing holes 1622 during assembling. The inner surface 162 of the transparent top cap 160 includes two micro-lens areas 1626 and 1628. Each micro-lens area is formed with a plurality of recessed optical structures 1630. The recessed optical structure 1630 is recessed along the inner surface 162 toward the outer surface 164. The recess depth is less than the height (Z direction) of the transparent top cap 160, which means the recessed optical structure 1630 does not penetrate the transparent top cap 160. The micro-lens regions 1626 and 1628 can respectively refract or scatter the light emitted from the LEDs 1226 and 1228 to increase the amount of light in the positive z-direction.

Figure 9A:
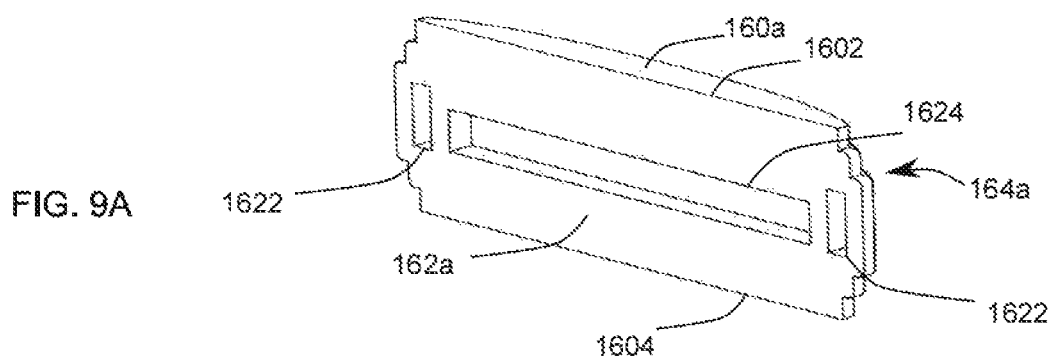
FIGS. 9A, 9B, and 9C are the perspective views of other three transparent top caps.

The present disclosure is not limited to the transparent top cap 160 of FIG. 8. FIG. 9A shows a transparent top cap 160a in another embodiment. The inner surface 162a of the transparent top cap 160a is substantially flat and has no optical structure except for the groove 1624 for the insertion of the PCB circuit board 122 and the fixing holes 1622 for sticking the side frame 148. The transparent top cap 160a still can provide the refracting or scattering functions by the convex optical arc surface of the outer surface 164a (for example, the optical arc surface 1642 in FIG. 6) to a part of the light emitted from the LEDs 1226 and 1228.

Figure 9B:
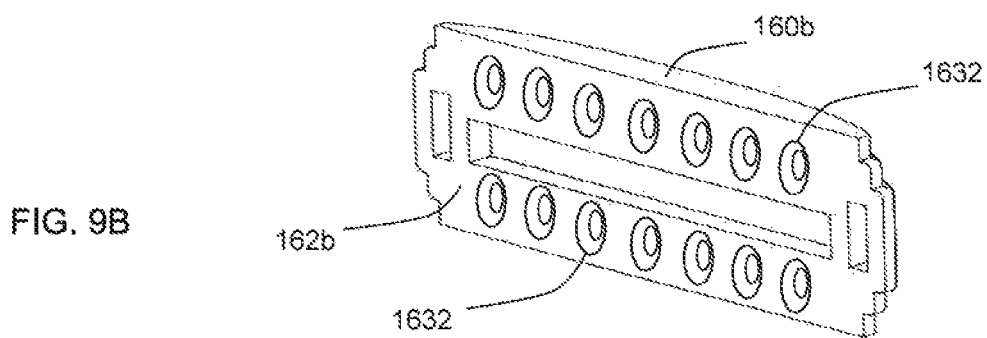
Figure 9C:
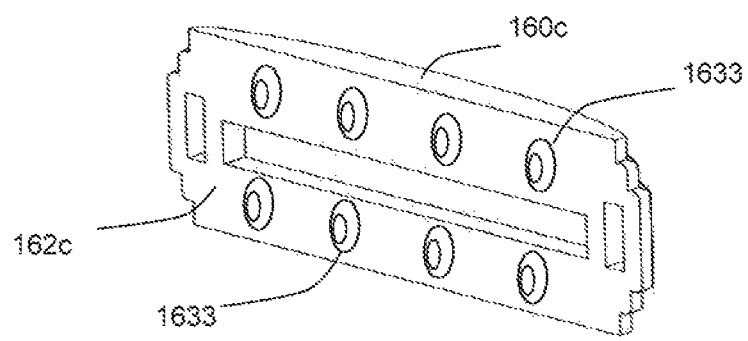

FIGS. 9B and 9C show the transparent top cap 160b and 160c in the other two embodiments. The inner surface 162b of the transparent top cap 160b is formed with a plurality of recessed shallow dish shape optical structures 1632 (recessed from the inner surface 162 toward the outer surface 164. See FIG. 5). The inner surface 162c of the transparent top cap 160c is formed with a plurality of protruding optical structures 1633 (protruded from the outer surface 164 toward the inner surface 162). Both the optical structures 1632 and 1633 can provide the refracting or scattering function.

Referring to FIG. 2, nine LEDs 1226 are arranged in a 3×3 matrix on the front surface 1222. A rectangular light emitting area 1230 is defined around the matrix. The light emitting area 1230 has a light emitting center CNT1 which is located on the outermost surface of the LED 1226A and is the geometric center of the light emitting area 1230. Similarly, the LED 1228 on the back surface 1224 can also define another light emitting area 1232 and a light emitting center CNT2 on the outermost surface of the LED 1228A as shown in FIG. 3. As shown in FIG. 3, the arrangement of the LEDs 1226 and 1228 is not limited to this. For example, in another embodiment, several LEDs are arranged in a 2×4 matrix on a surface. The geometric center of the matrix is the light emitting center. In another embodiment, a plurality of LEDs are substantially arranged in a circle on a surface, and a light emitting area is a minimum circle surrounding these LEDs, and a center of the circle is a light emitting center.

Figure 10:
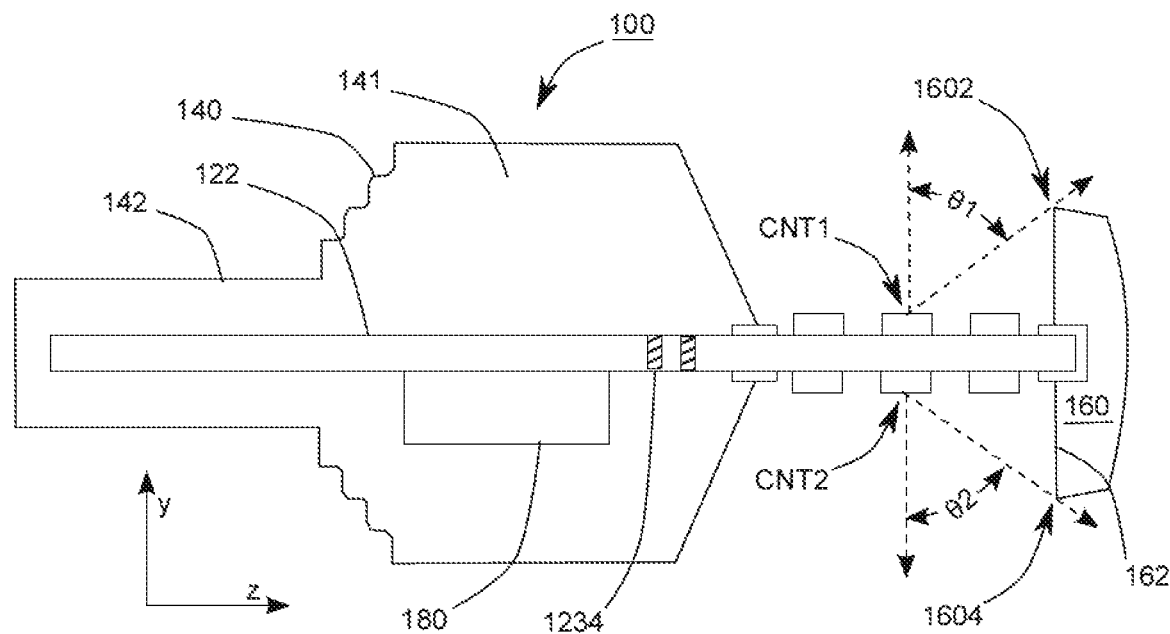
FIG. 10 is a cross-sectional view of the G9 LED bulb along the line ss shown in FIG. 2.

FIG. 10 is a cross-sectional view of the LED bulb 100 along the line ss in FIG. 2. The inner surface 162 of the transparent top cap 160 has two sides 1602 and 1604. As shown in FIG. 10, the light emitting center CNT1 is located on the outermost surface of the LED 1226A. A radiation angle $\theta_1$ can be defined by the positive y direction and a line passing through the light emitting center CNT1 and side 1602. In an embodiment, the radiation angle $\theta_1$ is not greater than 67 degrees, and more specifically, the radiation angle $\theta_1$ is between 61 degrees and 67 degrees. Similarly, a radiation angle $\theta_2$ can be defined by the negative y direction and a line passing through the light emitting center CNT2 and side 1602. In an embodiment, the radiation angle $\theta_2$ is not greater than 67 degrees, and more specifically, the radiation angle $\theta_2$ is between 61 degrees and 67 degrees. In this embodiment, the LED has a light emitting angle of about 120 degrees (for example, 115 to 122 degrees). If the radiation angle $\theta_1$ or $\theta_2$ is greater than 67 degrees, it means the thickness of the transparent top cap 160 along the y direction is smaller. A part of the light emitted from the LED cannot be emitted into the transparent top cap 160. Therefore, the transparent top cap 160 cannot refract or scatter light, and cannot increase the amount of light emitted in the positive z-direction. Alternatively, if the LED is designed to have a larger or smaller light emitting angle, the radiation angle $\theta_1$ or $\theta_2$ may be larger or smaller. The definition of light-emitting angle and the detailed description can be found in Taiwan Application Number 104103105.

FIG. 10 shows a light source driving circuit 180 disposed on the PCB circuit board 122 and covered in the main body 141. The PCB circuit board 122 may be a high thermal conductivity ceramic substrate with printed circuits on both sides and has a plurality of conductive vias 1234. The light source driving circuit 180 can drive the LEDs 1226 and 1228 through the conductive vias 1234. The heat generated by the light source driving circuit 180 and the LEDs 1226 and 1228 can be dissipated through the PCB circuit board 122 and the base 140 so the temperatures of the LEDs 1226 and 1228 are reduced.

Figure 11A:
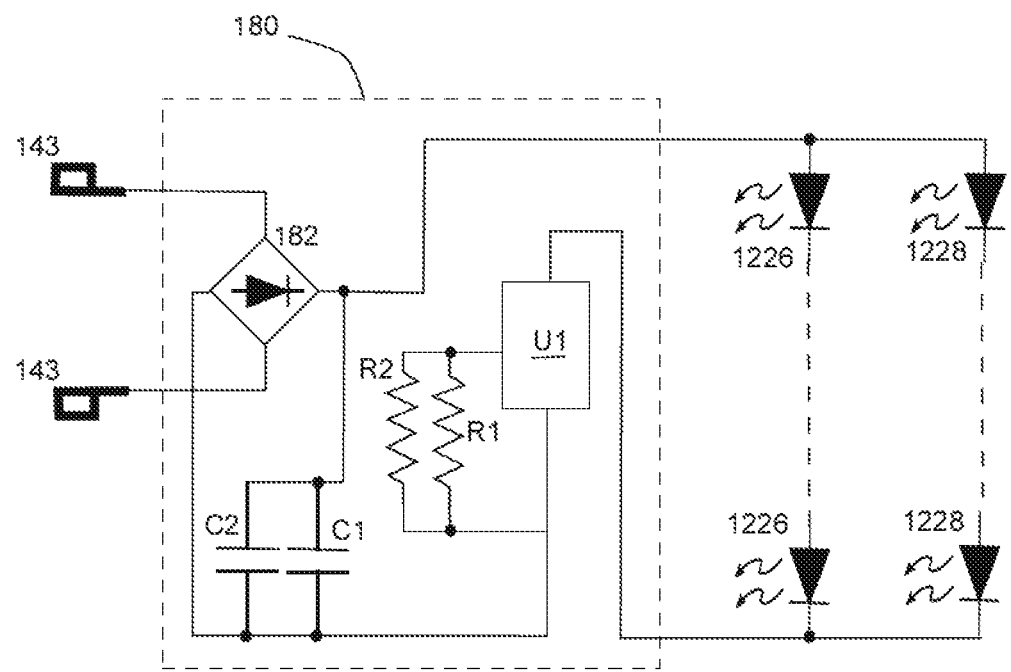
FIGS. 11A through 11C illustrate circuit diagrams of three light source driving circuits.

FIG. 11A is a circuit diagram of a light source driving circuit 180 in one embodiment of the present disclosure. The light source driving circuit 180 can be electrically connected to the commercial power through the pins 143. The light source driving circuit 180 includes a bridge rectifier 182, an integrated circuit U1, resistors R1 and R2, and capacitors C1 and C2. The integrated circuit includes a metal-oxide-semiconductor (MOS) transistor. The LEDs 1226 and 1228 may be surface mount device (SMD) packages with 2835 lead frame having a length, width and thickness of 2.8 mm, 3.5 mm and 0.8 mm, respectively. As can be understood from FIG. 11A, the light source driving circuit 180 is a single-stage linear driver with simple and reliable circuits and a power factor (PF)≥0.85, without additional electro-magnetic interference (EMI) circuit to meet the necessary EMI standard.

In assembling of the light source assembly 120, all the components of the light source driving circuit 180 and the LEDs 1226 and 1228 may be SMD packages, and thus can be soldered once and quickly to the front surface 1222 or back surface 1224 of PCB circuit board 122 through the Reflow process.

Figure 11B:
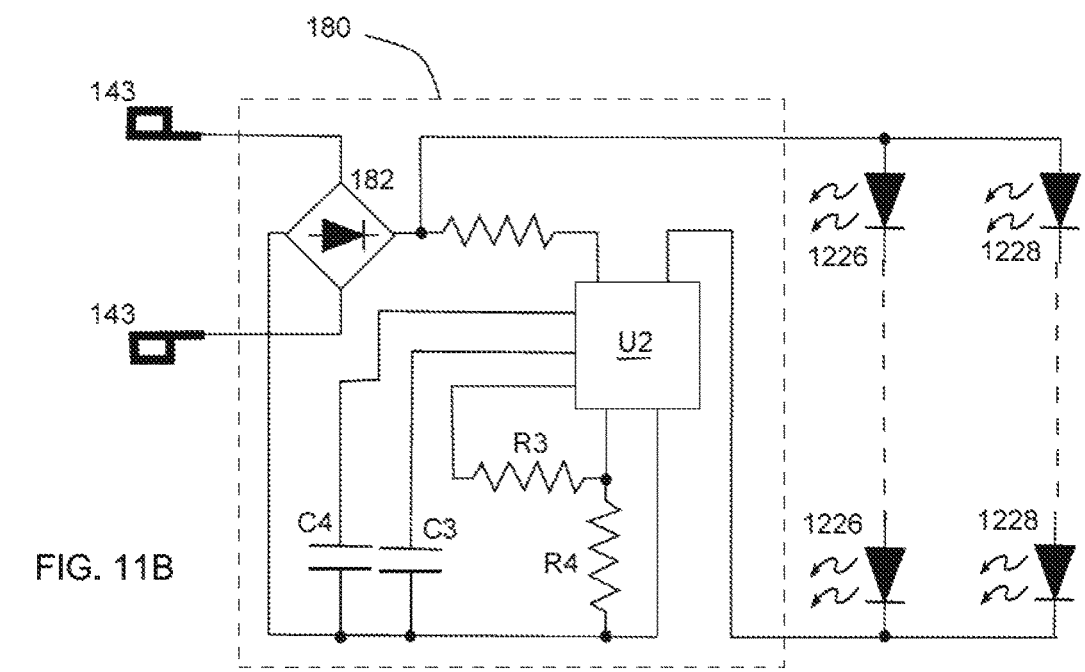

FIG. 11B shows a circuit diagram of a light source driving circuit 180 in another embodiment of the present disclosure. The light source driving circuit 180 includes a bridge rectifier 182, an integrated circuit U2, resistors R3 and R4, and capacitors C3 and C4. Integrated circuit U2 has the switch capability for the dimming function. For example, a user can determine the luminous flux emitted from the LEDs 1226 and 1228 by switching a switch (not shown) to connect or disconnect a commercial power with the light source driving circuit 180. When the commercial power is electrically connected to the light source driving circuit 180 through the pins 143 at the first time, the light source driving circuit 180 drives the LEDs 1226 and 1228 to emit 400 lumens of luminous flux. When the commercial power is disconnected and be electrically connected to the light source driving circuit 180 through the pins 143 at the second time, the light source driving circuit 180 drives the LEDs 1226 and 1228 to emit 200 lumens of luminous flux. When the commercial power is disconnected and be electrically connected to the light source driving circuit 180 through the pins 143 at the third time, the light source driving circuit 180 drives the LEDs 1226 and 1228 to emit 40 lumens of luminous flux. When the commercial power is disconnected and be electrically connected to the light source driving circuit 180 through the pins 143 at the fourth time, the light source driving circuit 180 drives the LEDs 1226 and 1228 to emit 400 lumens of luminous flux, which is the same with the luminous flux of the first electrical connection time. In this way, the luminous flux emitted from the LEDs 1226 and 1228 changes cyclically as the commercial power and the light source driving circuit 180 are disconnected and connected. In this embodiment, the LEDs 1226 and 1228 as a whole may be considered as a single light-emitting element that emits light together or not simultaneously; and the light source driving circuit 180 controls the driving current flowing through the LEDs 1226 and 1228 to change the luminous flux produced by the LEDs 1226 and 1228.

Figure 11C:
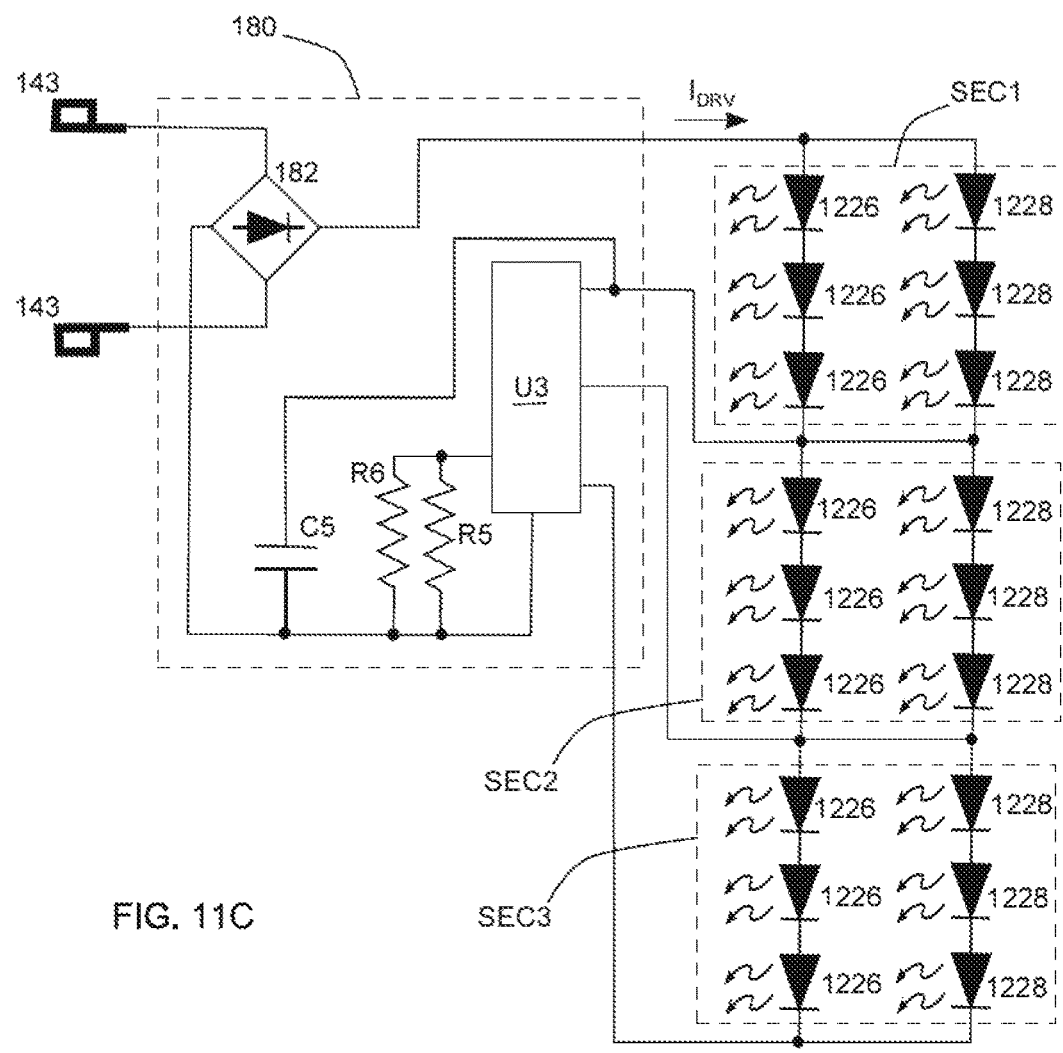

FIG. 11C shows a circuit diagram of a light source driving circuit 180 in another embodiment of the present disclosure. The light source driving circuit 180 includes a bridge rectifier 182, an integrated circuit U3, resistors R5 and R6, and a capacitor C5. The connection of the LEDs 1226 and 1228 is shown in FIG. 11C, which includes three LED sections SEC1, SEC2 and SEC3 connected in series with each other. Integrated circuit U3 may provide adaptively sectioned drive. For example, when the commercial power electrically connected to pins 143 is below 45V (assuming a driving voltage of 15V for each of the LEDs 1226 and 1228), no LED section emits light. When the commercial power electrically connected to pins 143 is between 45V and 90V, only LED section SEC1 emits light. When the commercial power is between 90V and 135V, only LED sections SEC1 and SEC2 emit light. When the commercial power is larger than 135V, all LED sections SEC1, SEC2 and SEC3 emit light. In one embodiment, the driving current IDRV is a fixed constant greater than 0 as long as the LED sections emit light (for example, SEC1 or/and SEC2 or/and SEC3). In another embodiment, the driving current IDRV may be increased when a new LED section (for example, SEC2) is added to emit light (at this time, both SEC1 and SEC2 emit light). Alternatively, when an LED section (for example, SEC2) changes to not emitting light (only SEC1 emits light at this time), the driving current IDRV decreases, whereby the PF can be made closer to the ideal value of 1.

Figure 12:
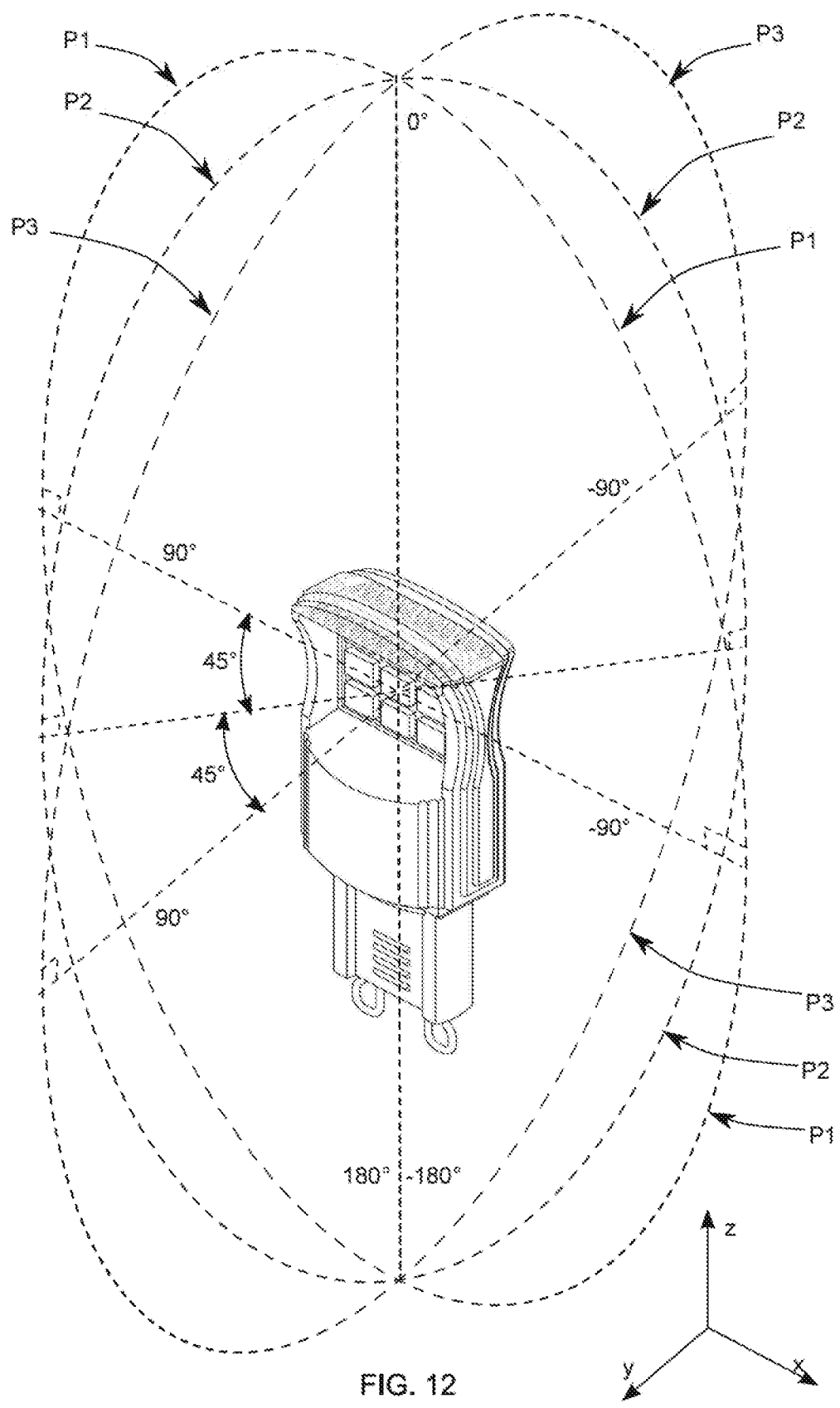
FIG. 12 shows a schematic diagram of a measurement method for G9 LED bulb disclosed in FIG. 1.

FIG. 12 shows a schematic diagram of a measurement method for the LED bulb 100. When the LED bulb 100 emits light, the luminous intensity of each point on the P1, P2, P3 circles at a distance of 10 meters can be measured by taking the light emitting centers CNT1, CNT2 (as shown in FIG. 10) as a circle center. The P1, P2, P3 circles intersect each other across the z-axis of the LED bulb 100. Further, the luminous intensity at each point on the circles is plotted with the angle to obtain the light distribution curves CP1, CP2, and CP3 in FIG. 13, respectively. For a related description of the LED bulb 100, reference may be made to the aforementioned embodiment.

Figure 13:
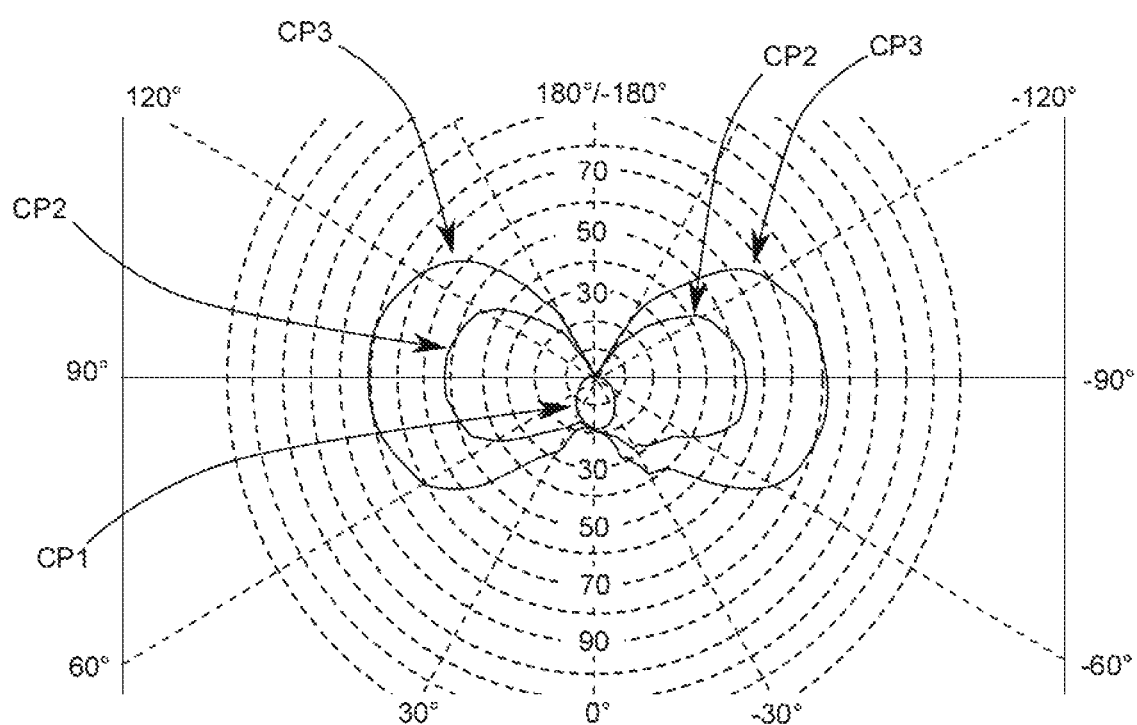
FIG. 13 shows the light distribution curve according to the measurement shown in FIG. 12.

Referring to FIGS. 12 and 13, the P1 circle corresponds to the xz plane passing through the LED bulb 100. Since the main illumination directions of the LEDs 1226 and 1228 are along positive and negative y directions and are perpendicular to the xz plane, the light distribution curve CP1 has the lowest luminous intensity comparing with those of the light distribution curves CP1, CP2 and CP3. In the vicinity of 180 degrees or −180 degrees (negative z-direction), the luminous intensity is about 0 cd because of the shielding effect of the base 140 and the light-emitting directionality of the LEDs 1226 and 1228. For the light distribution curve CP1, the luminous intensity at 0 degree (positive z-direction) is about 20 cd.

The P3 circle corresponds to the yz plane passing through the LED bulb 100. Since the positive and negative y directions are the main illumination directions for the LEDs 1226 and 1228, the light distribution curve CP3 has the maximum luminous intensity around approximately 90 degrees and −90 degrees, which is approximately 80 cd in FIG. 13. In the vicinity of 180 degrees or −180 degrees (negative z-direction), the luminous intensity is about 0 cd because of the shielding effect of the base 140 and the light-emitting directionality of the LEDs 1226 and 1228. In the light distribution curve CP3, the luminous intensity at 0 degree (positive z-direction) is about 20 cd.

As shown in FIG. 12, the angle formed by the P2 circle and the P1 circle is about 45 degrees, and the angle formed by the P2 circle and the P3 circle is about 45 degrees. Therefore, the light distribution curve CP2 is located between the light distribution curves CP1 and CP3 as shown in FIG. 13.

As shown in FIG. 13, regardless of the light distribution curves CP1, CP2 or CP3, the luminous intensity in the positive z direction is about 20 cd and the luminous intensity in the negative z-direction is almost 0 cd. Due to the light-emitting directionality (positive and negative y directions) of the LEDs 1226 and 1228, the luminous intensity in the positive z direction is relatively weak. However, a part of the light emitted from the LEDs 1226 and 1228 can be redirected by the transparent top cap 160 to improve the luminous intensity in the positive z-direction.

In the previously described embodiments, the LEDs 1226 and 1228 are exposed to the external environment without any transparent or non-transparent mask in the main illumination direction, but the present disclosure is not limited thereto. Exposed LEDs 1226 and 1228 are easily contacted and abraded, or are with dust and dirty. Therefore, in some other embodiments, the LED may be covered with a transparent plastic with a high refractive index or with a light guide plate. Transparent plastic or light guide plate is not only used to protect the LED, but also to increase the positive and negative z-direction luminous intensity. The materials of transparent plastic can include polycarbonate, polymethyl methacrylate, silicone or epoxy. The materials of the light guide plate can include acrylic resin, polycarbonate, epoxy resin or glass.

As mentioned above, the surface of the main body 141 and the side frame 148 can be changed or formed with some patterns. In addition to the aesthetic purposes, it can also increase the surface area and improve the heat dissipation ability of the LED bulb 100. The present disclosure is not limited to the main body 141 and the side frame 148 of the LED bulb 100. In other embodiments, the main body 141 and the side frame 148 may be changed according to the designer's preference.

FIGS. 14A-1, 14A-2, and 14A-3 respectively show a front view, a perspective view and a side view of an LED bulb 100a disclosed in the embodiments in accordance with the present disclosure. In FIGS. 14A-1, 14A-2, and 14A-3, the LED bulb 100a includes a transparent top cap 160, a light source assembly 120, and a base 140a. The light source assembly 120 has a PCB circuit board 122 as a carrier plate, on which the LED 1226 is disposed. Certainly, the LED 1228 is disposed on the carrier plate in a backside view (not shown) of the LED bulb 100a. The base 140a includes a main body 141a, a bottom body 142, and two side frames 148a. There is a pin 143 below the bottom body 142. Unlike LED bulb 100, the main body 141a of the LED bulb 100a has a wide top and a narrow bottom with less angularity in FIGS. 14A-1, 14A-2, and 14A-3. The surface is simple and the curve is graceful.

FIGS. 14B-1, 14B-2, and 14B-3 respectively show a front view, a perspective view and a side view of an LED bulb 100b disclosed in the embodiments in accordance with the present disclosure. In FIGS. 14B-1, 14B-2, and 14B-3, the LED bulb 100b includes a transparent top cap 160, a light source assembly 120, and a base 140b. The light source assembly 120 has a PCB circuit board 122 as a carrier plate, on which the LED 1226 is disposed. Certainly, the LED 1228 is disposed on the carrier plate in a backside view (not shown) of the LED bulb 100b. The base 140b includes a main body 141b, a bottom body 142, and two side frames 148b. There is a pin 143 below the bottom body 142. The LED bulb 100b is similar to the LED bulb 100a. However, a recess 1412b is formed on the surface of the main body 141b, and a protruding strip 1414b is formed near the LED 1226. This is convenient for picking and pushing by fingers.

Figures 1, 14A:
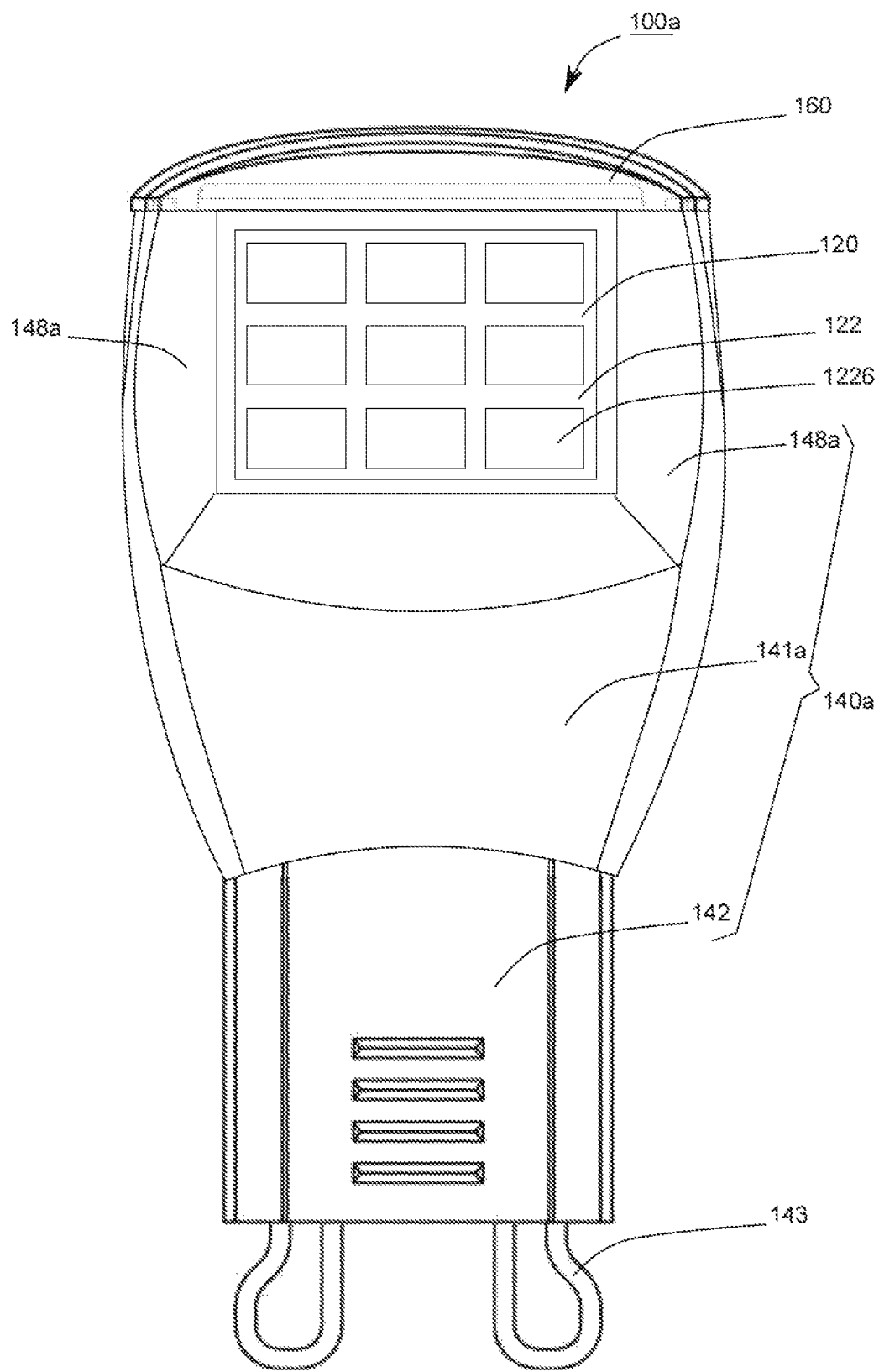
Figures 2, 14A:
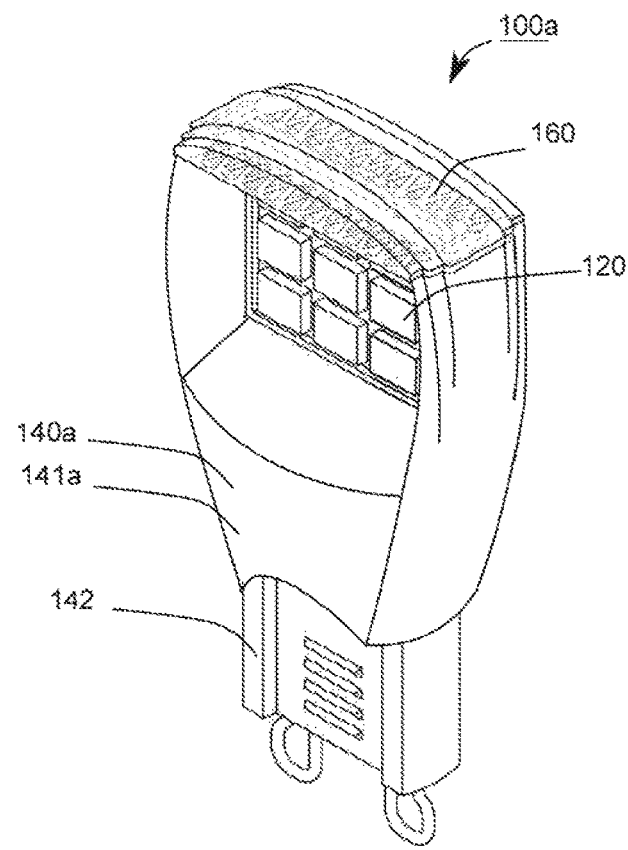
Figures 3, 14A:
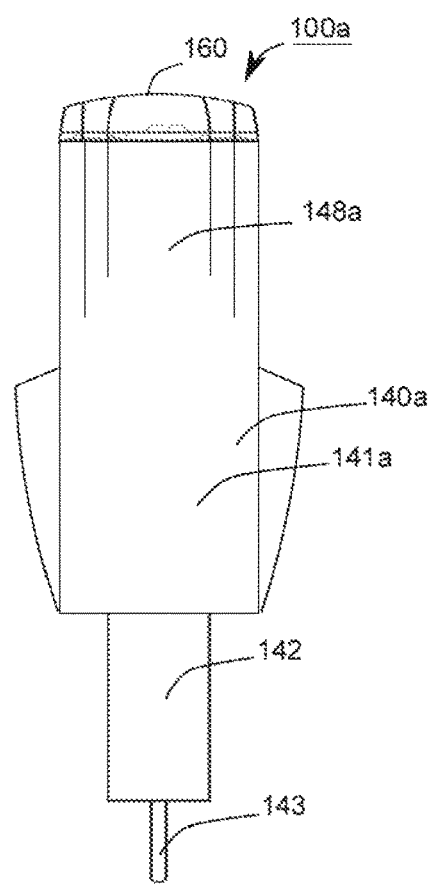
Figures 1, 14B:
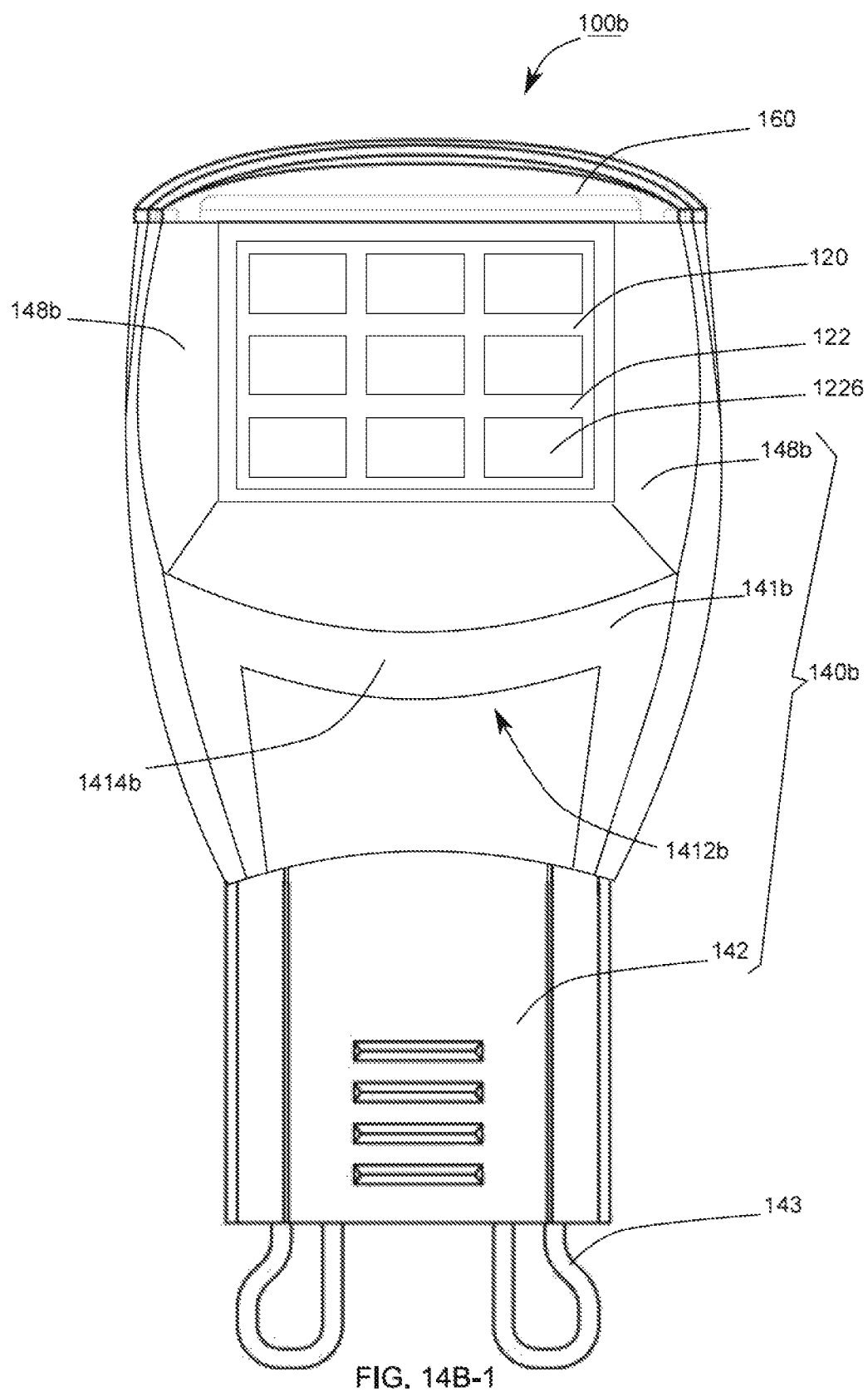
Figures 2, 14B:
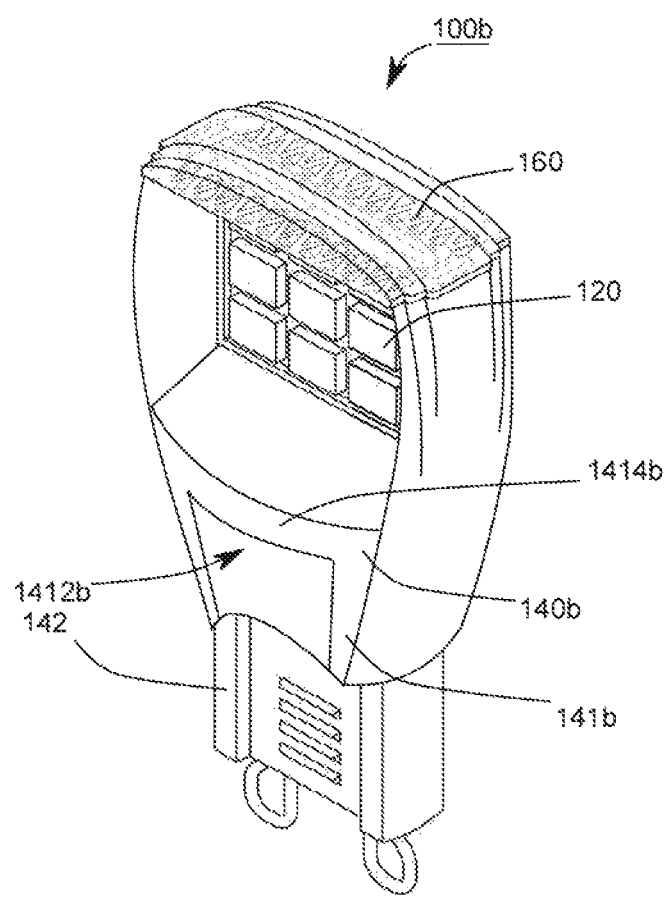
Figures 3, 14B:
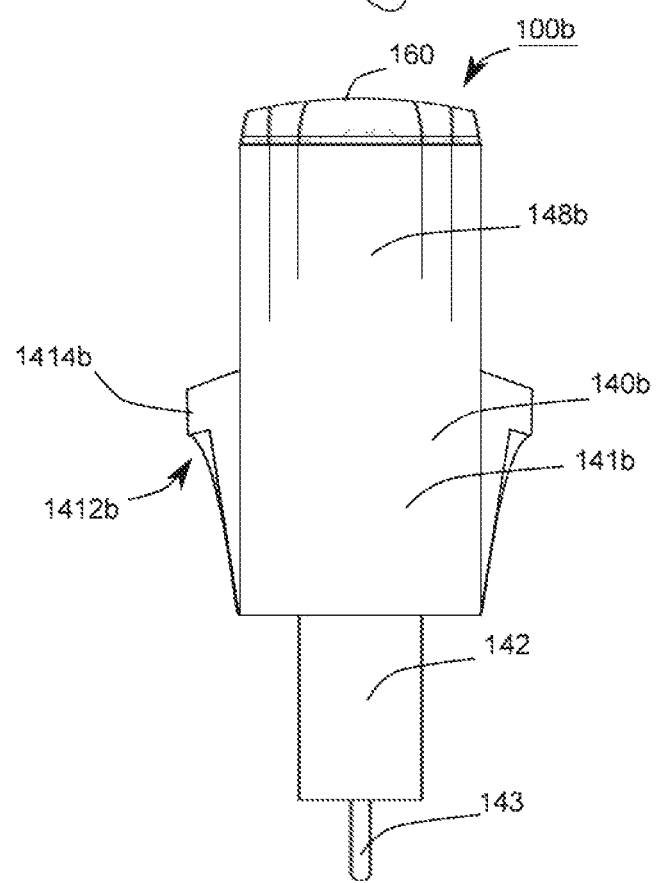
Figures 1, 14C:
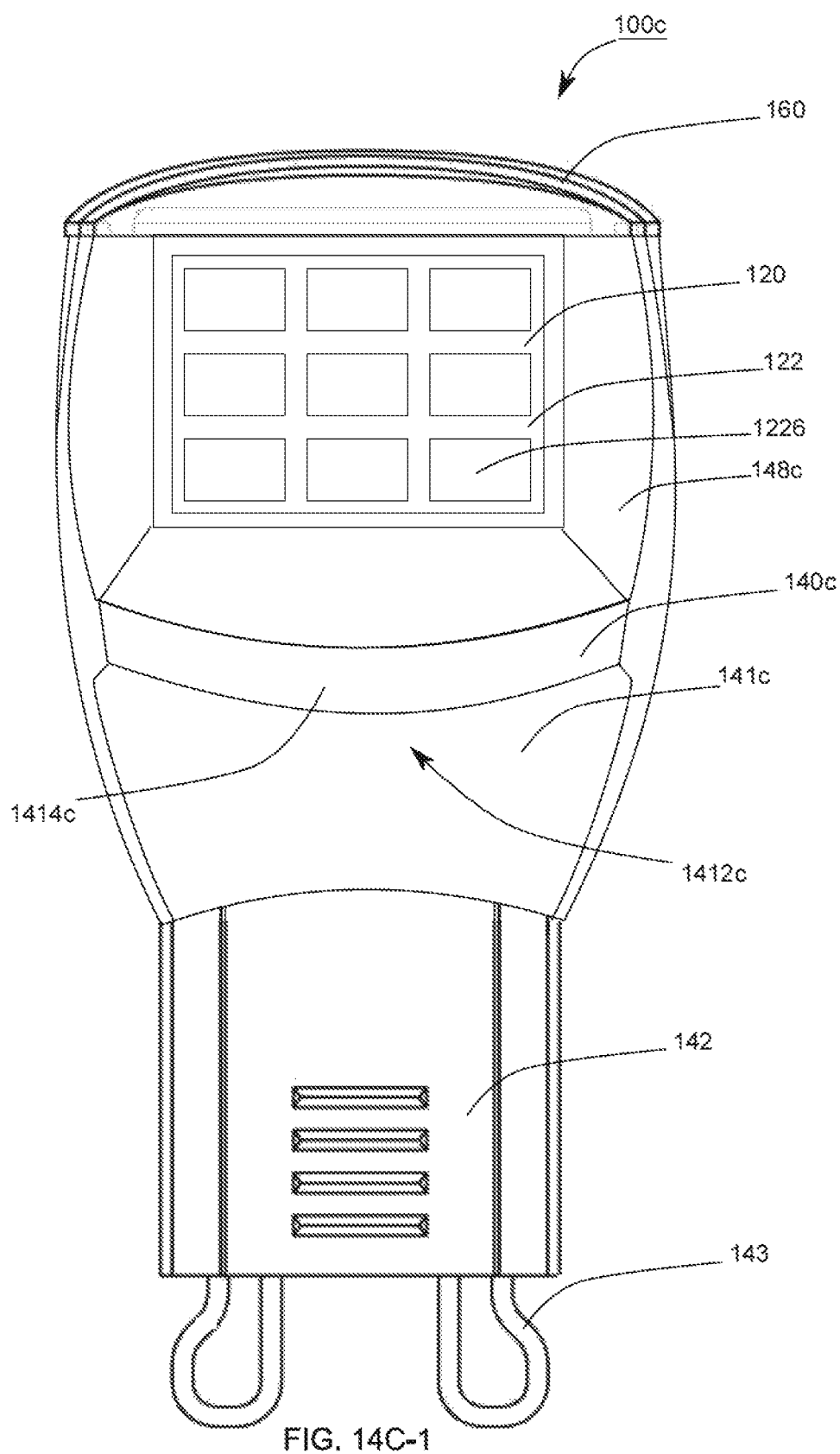
Figures 2, 14C:
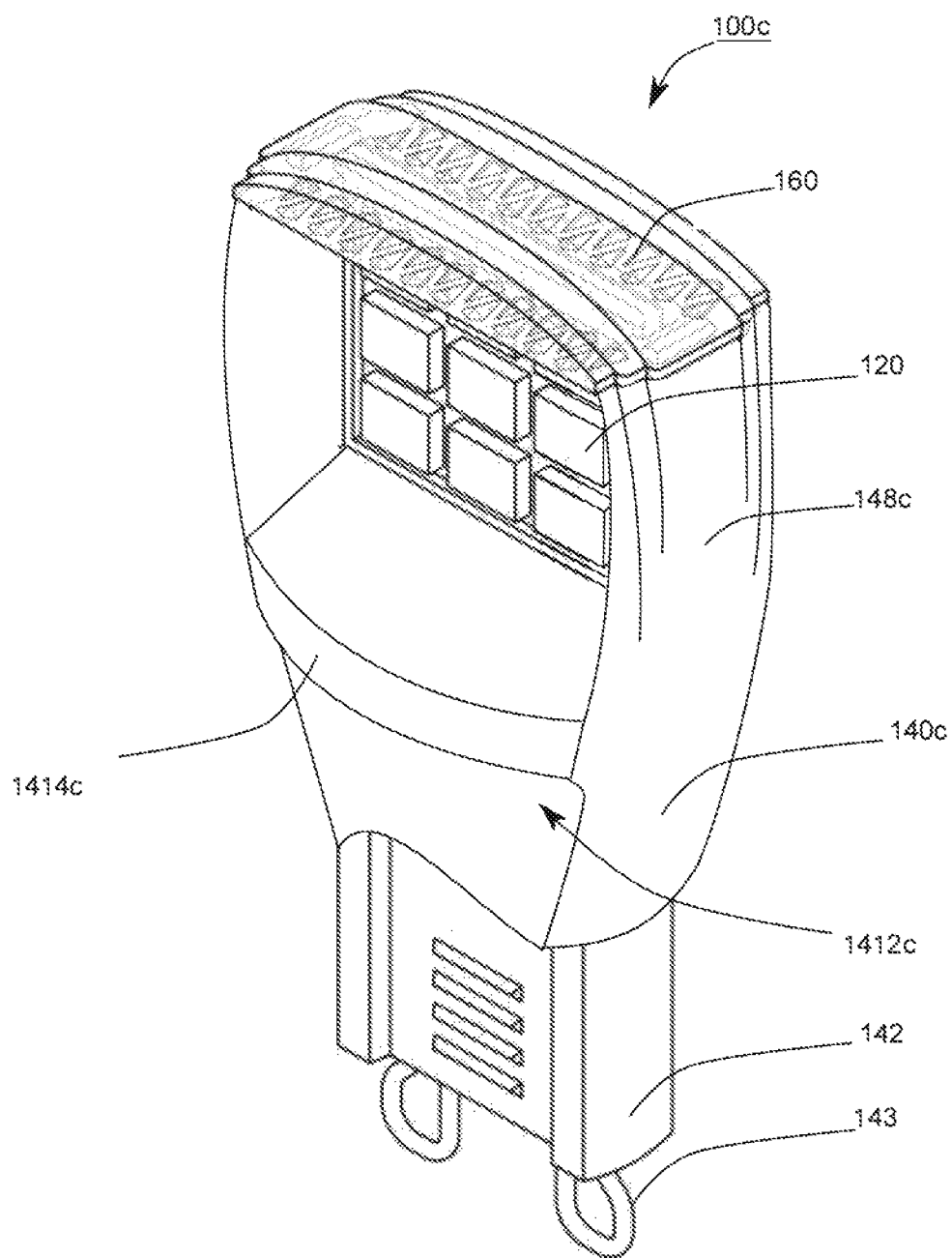

FIGS. 14C-1 and 14C-2 respectively show a front view and a perspective view of an LED bulb 100c disclosed in the embodiments in accordance with the present disclosure. In FIGS. 14C-1 and 14C-2, the LED bulb 100c includes a transparent top cap 160, a light source assembly 120, and a base 140c. The light source assembly 120 has a PCB circuit board 122 as a carrier plate, on which the LED 1226 is disposed. Certainly, the LED 1228 is disposed on the carrier plate in a backside view (not shown) of the LED bulb 100c. The base 140c includes a main body 141c, a bottom body 142, and two side frames 148c. There is a pin 143 below the bottom body 142. The LED bulb 100c in FIGS. 14C-1 and 14C-2 is similar to the LED bulb 100b in FIGS. 14B-1, 14B-2 and 14B-3. In comparison with the recess 1412b in the LED bulb 100b, the recess 1412c in the LED bulb 100c extends to the left and right, resulting in a relatively long protruding strip 1414c.

Figures 1, 14D:
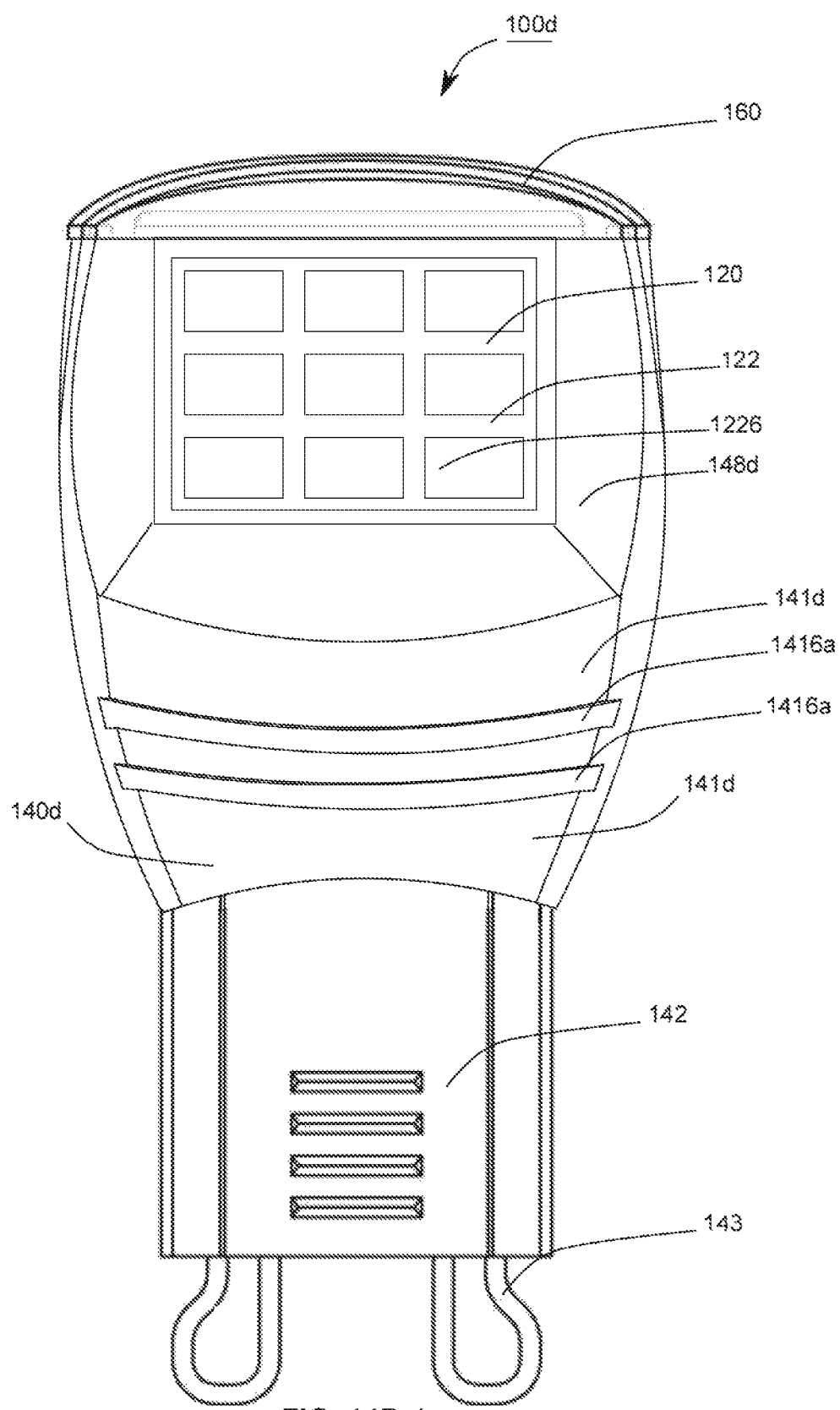
Figures 2, 14D:
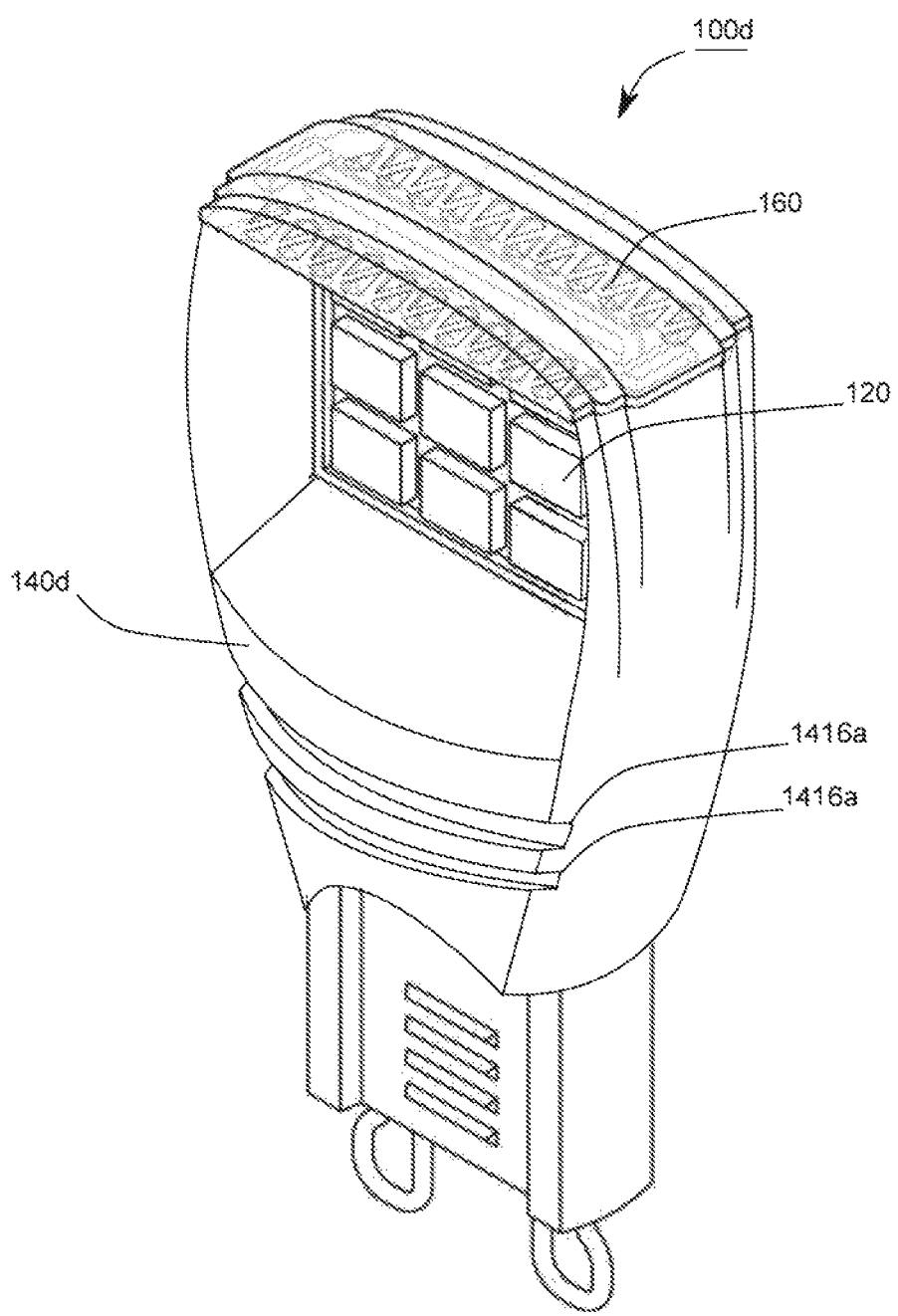

FIGS. 14D-1 and 14D-2 respectively show a front view and a perspective view of an LED bulb 100d disclosed in the embodiments in accordance with the present disclosure. In FIGS. 14D-1 and 14D-2, the LED bulb 100d includes a transparent top cap 160, a light source assembly 120, and a base 140d. The light source assembly 120 has a PCB circuit board 122 as a carrier plate, on which the LED 1226 is disposed. Certainly, the LED 1228 is disposed on the carrier plate in a backside view (not shown) of the LED bulb 100d. The base 140d includes a main body 141d, a bottom body 142, and two side frames 148d. There is a pin 143 below the bottom body 142. In comparison with the LED bulb 100a of FIGS. 14A-1, 14A-2 and 14A-3, the LED bulb 100d of FIGS. 14D-1 and 14D-2 has two more grooves 1416a in the main body 141d.

Figures 1, 14E:
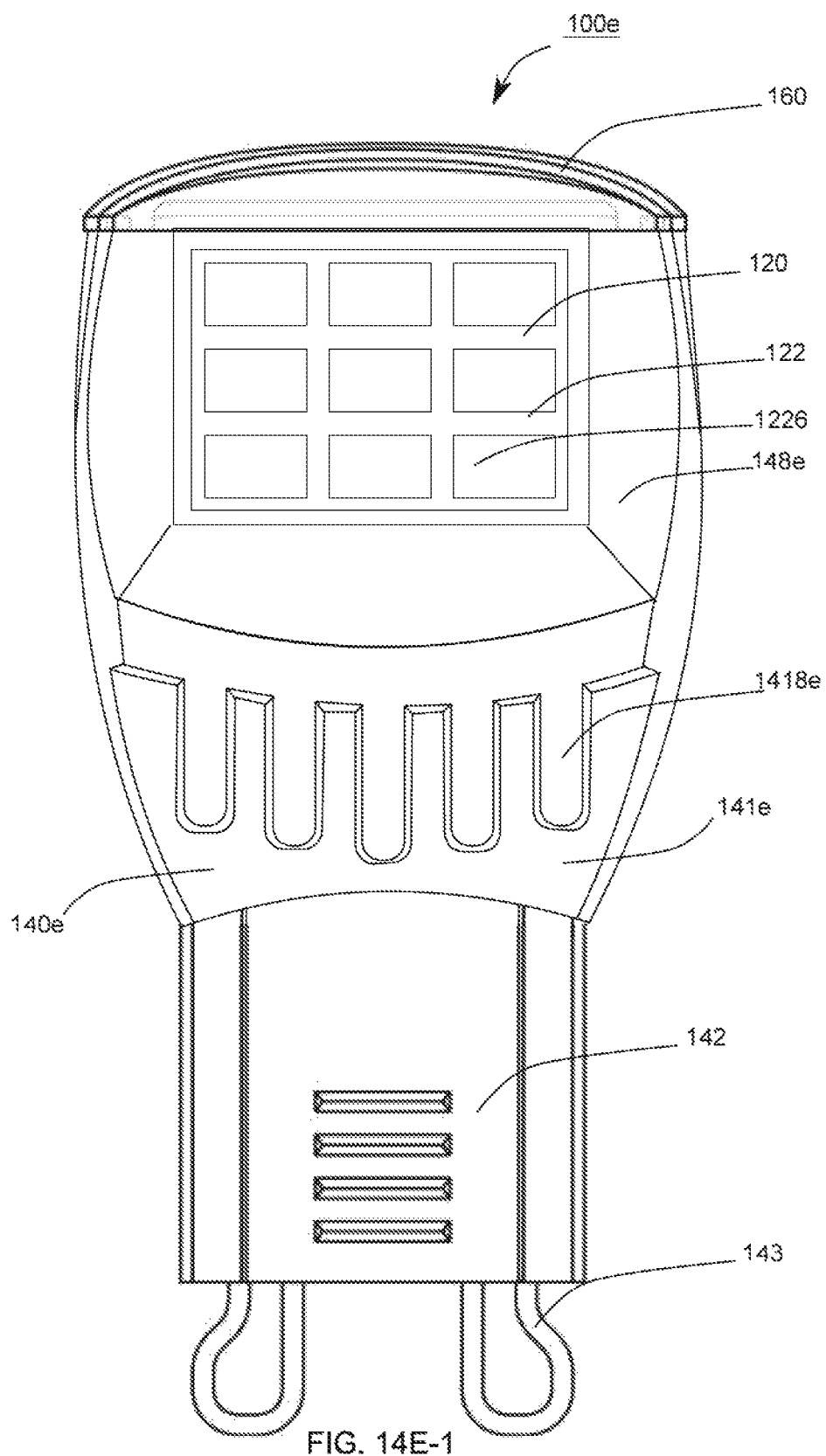
Figures 2, 14E:
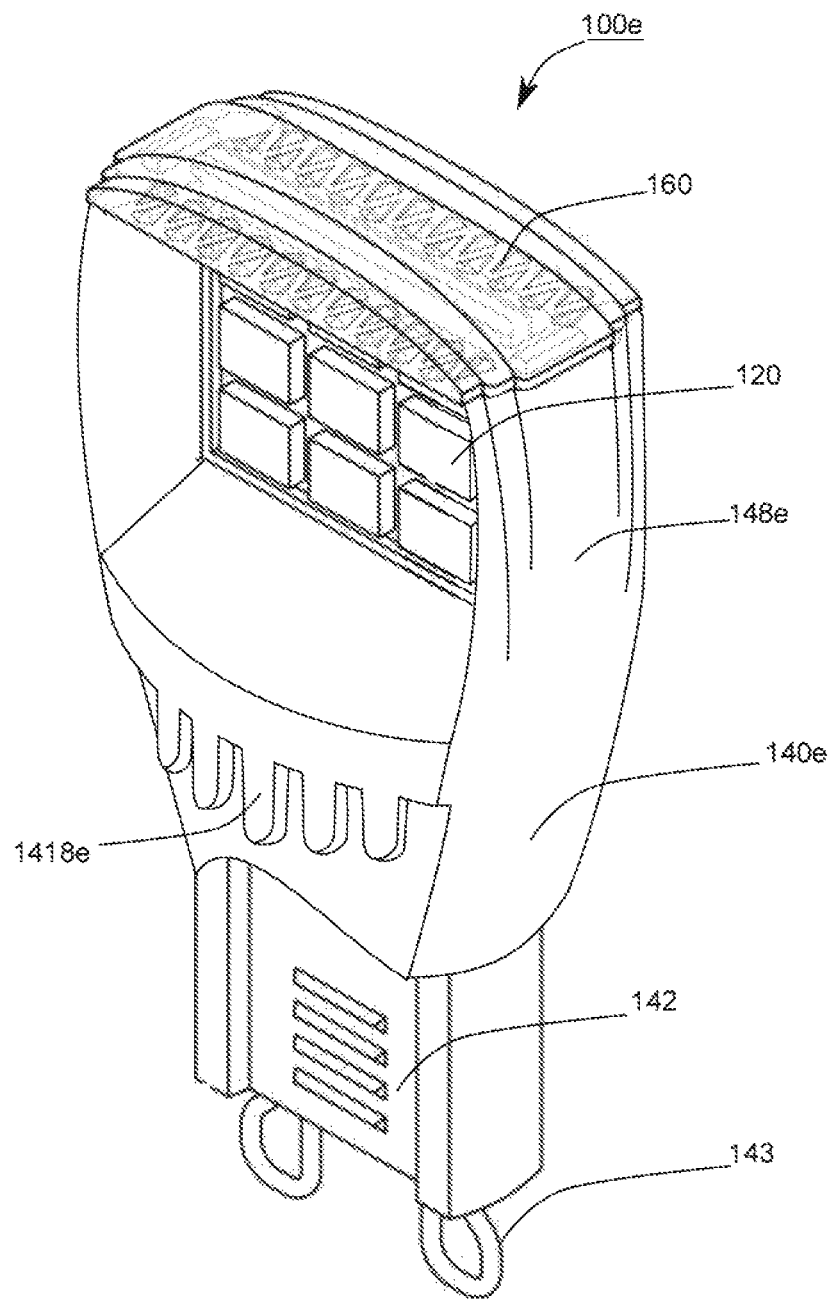

FIGS. 14E-1 and 14E-2 respectively show a front view and a perspective view of an LED bulb 100e disclosed in the embodiments in accordance with the present disclosure. In FIGS. 14E-1 and 14E-2, the LED bulb 100e includes a transparent top cap 160, a light source assembly 120, and a base 140e. The light source assembly 120 has a PCB circuit board 122 as a carrier plate, on which the LED 1226 is disposed. Certainly, the LED 1228 is disposed on the carrier plate in a backside view (not shown) of the LED bulb 100e. The base 140e includes a main body 141e, a bottom body 142, and two side frames 148e. There is a pin 143 below the bottom body 142. The LED bulb 100e of FIGS. 14E-1 and 14E-2 is similar to the LED bulb 100c of FIGS. 14C-1 and 14C-2. The protruding strip 1414c is replaced by the protruding pattern 1418e on the main body 141e.

Figure 14F:
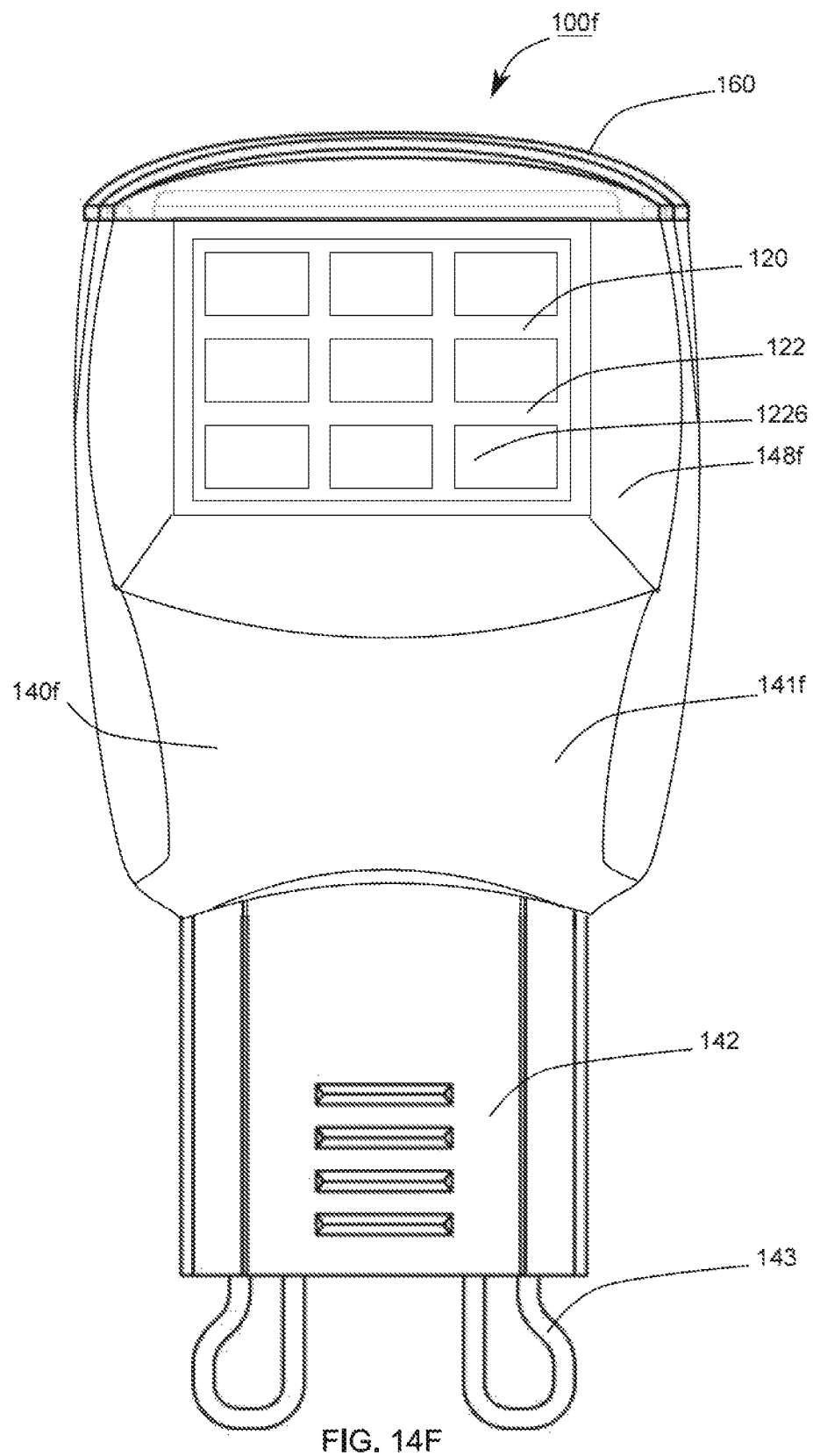
FIG. 14F shows a G9 LED bulb disclosed in the embodiments in accordance with the present disclosure.

FIG. 14F shows an LED bulb 100f disclosed in the embodiments in accordance with the present disclosure. In FIG. 14F, the LED bulb 100f includes a transparent top cap 160, a light source assembly 120, and a base 140f. The light source assembly 120 has a PCB circuit board 122 as a carrier plate, on which the LED 1226 is disposed. Certainly, the LED 1228 is disposed on the carrier plate in a backside view (not shown) of the LED bulb 100f. The base 140f includes a main body 141f, a bottom body 142, and two side frames 148f. There is a pin 143 below the bottom body 142. The LED bulb 100f of FIG. 14F is similar to the LED bulb 100a of FIGS. 14A-1, 14A-2, and 14A-3. A main body 141f is produced in a modified appearance of the main body 141a.

Figure 15:
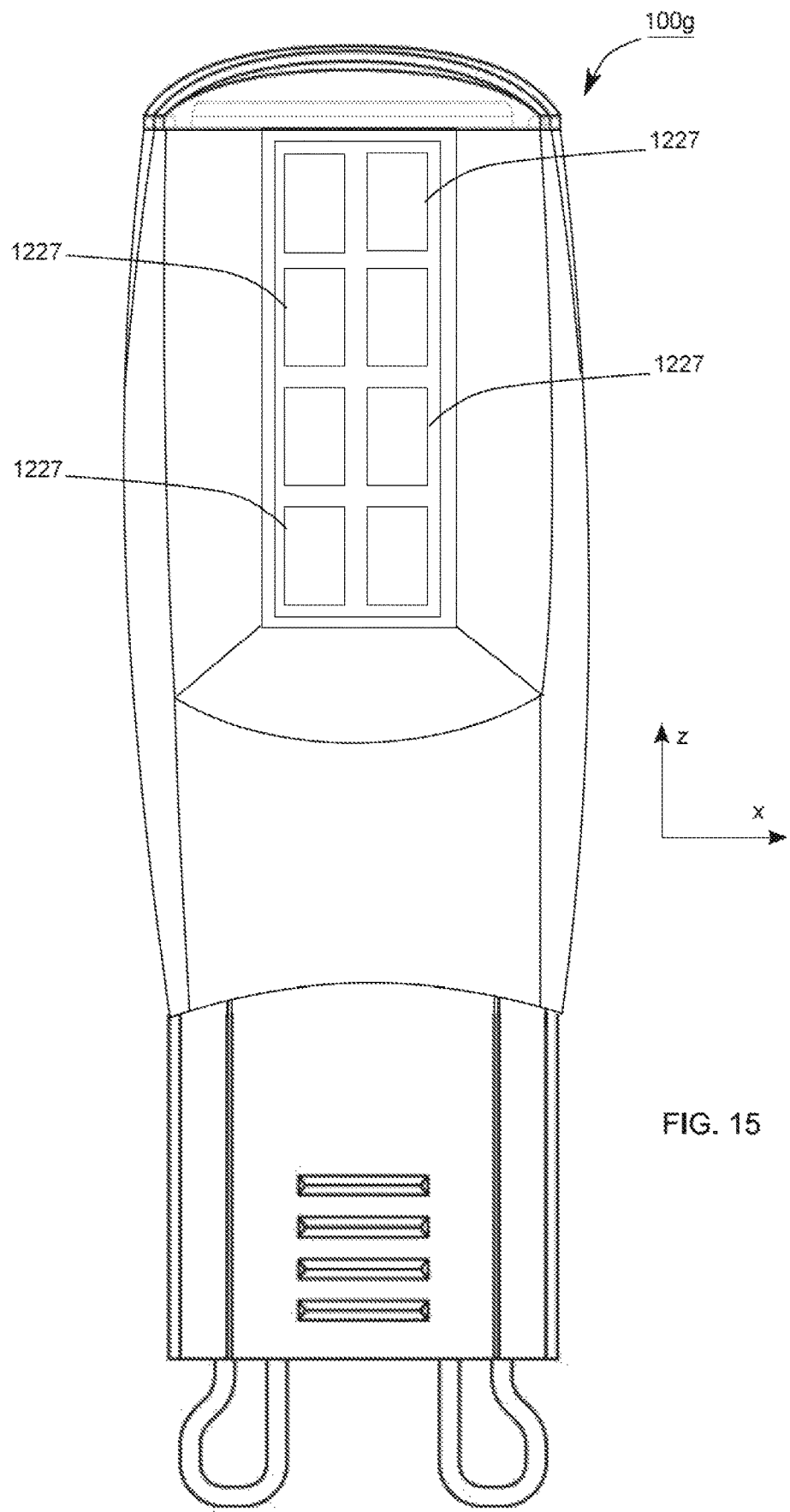
FIG. 15 shows the front view of an LED bulb disclosed in the embodiments in accordance with the present disclosure.

In the previous embodiments, both length and width of the LEDs are respectively parallel to the z and x directions, but the present disclosure is not limited thereto. FIG. 15 shows a front view of an LED bulb 100g disclosed in the embodiments in accordance with the present disclosure, wherein eight LEDs 1227 are arranged in a 4×2 array. Each LED 1227 is a SMD package with 2835 frame and has a length, a width and thickness of 2.8 mm, 3.5 mm and 0.8 mm, respectively. In FIG. 15, the length and width of the LED 1227 are respectively parallel to the x and z directions.

In FIG. 10, the PCB circuit board 122 may be a high thermal conductivity ceramic substrate with printed circuits on both sides, but the present disclosure is not limited thereto.

Figure 16:
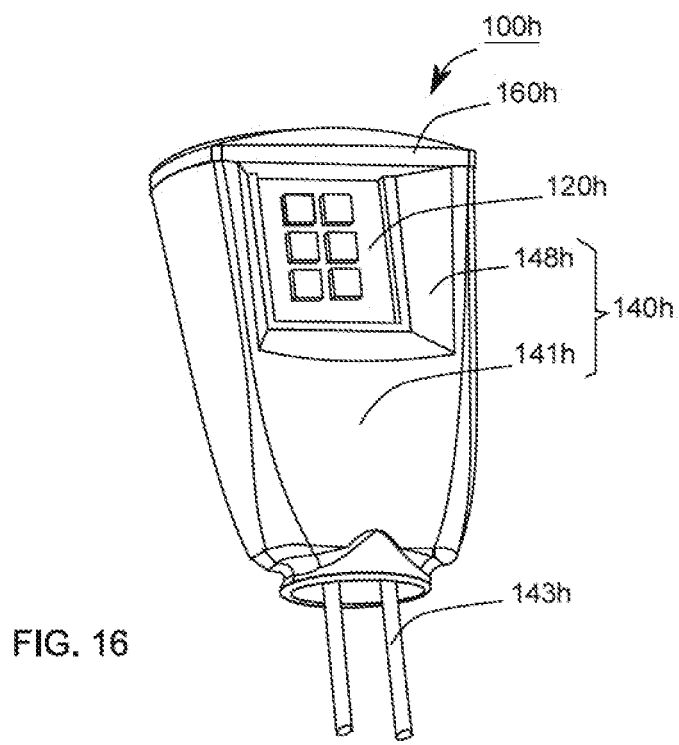
FIG. 16 shows an LED bulb disclosed in the embodiments in accordance with the present disclosure.
Figure 17:
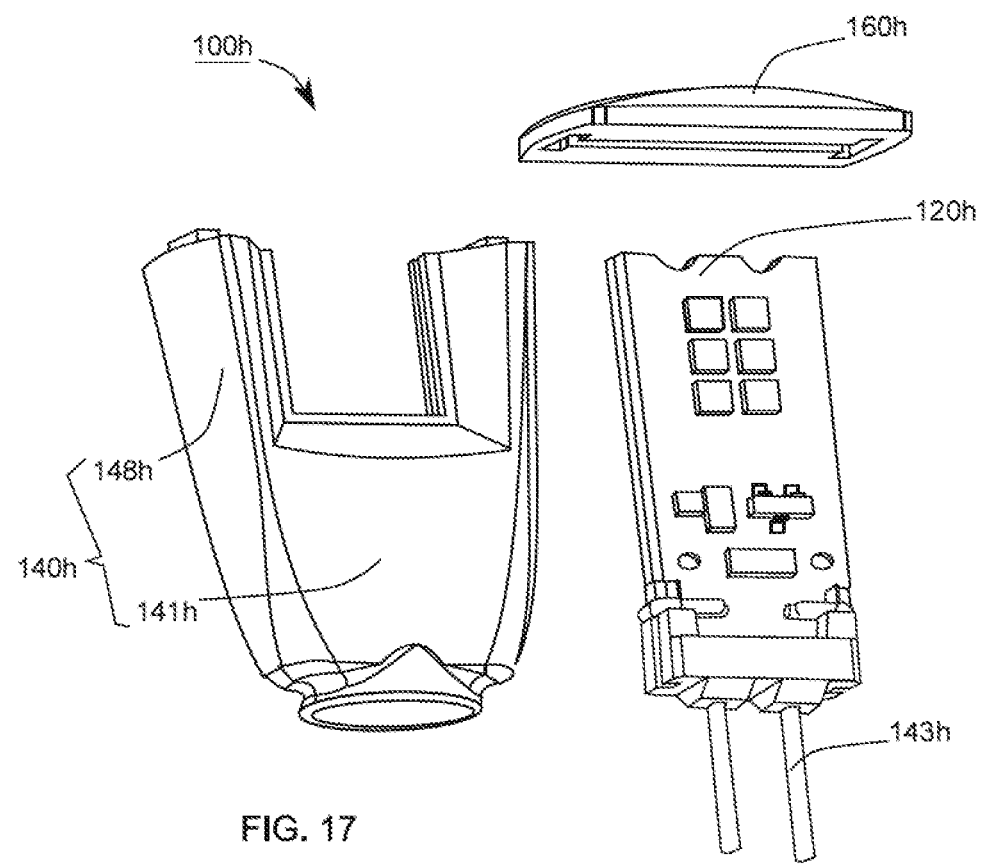
FIG. 17 shows an exploded view of LED bulb shown in FIG. 16.

FIG. 16 shows an LED bulb 100h disclosed in the embodiments in accordance with the present disclosure. Similar to the previous embodiment, the LED bulb 100h includes a transparent top cap 160h, a light source assembly 120h, and a base 140h. The base 140h includes a main body 141h and a side frame 148h. The pin 143h is located below the main body 141h, and pierces from the main body 141h. FIG. 17 shows an exploded view of the LED bulb 100h.

Figure 18:
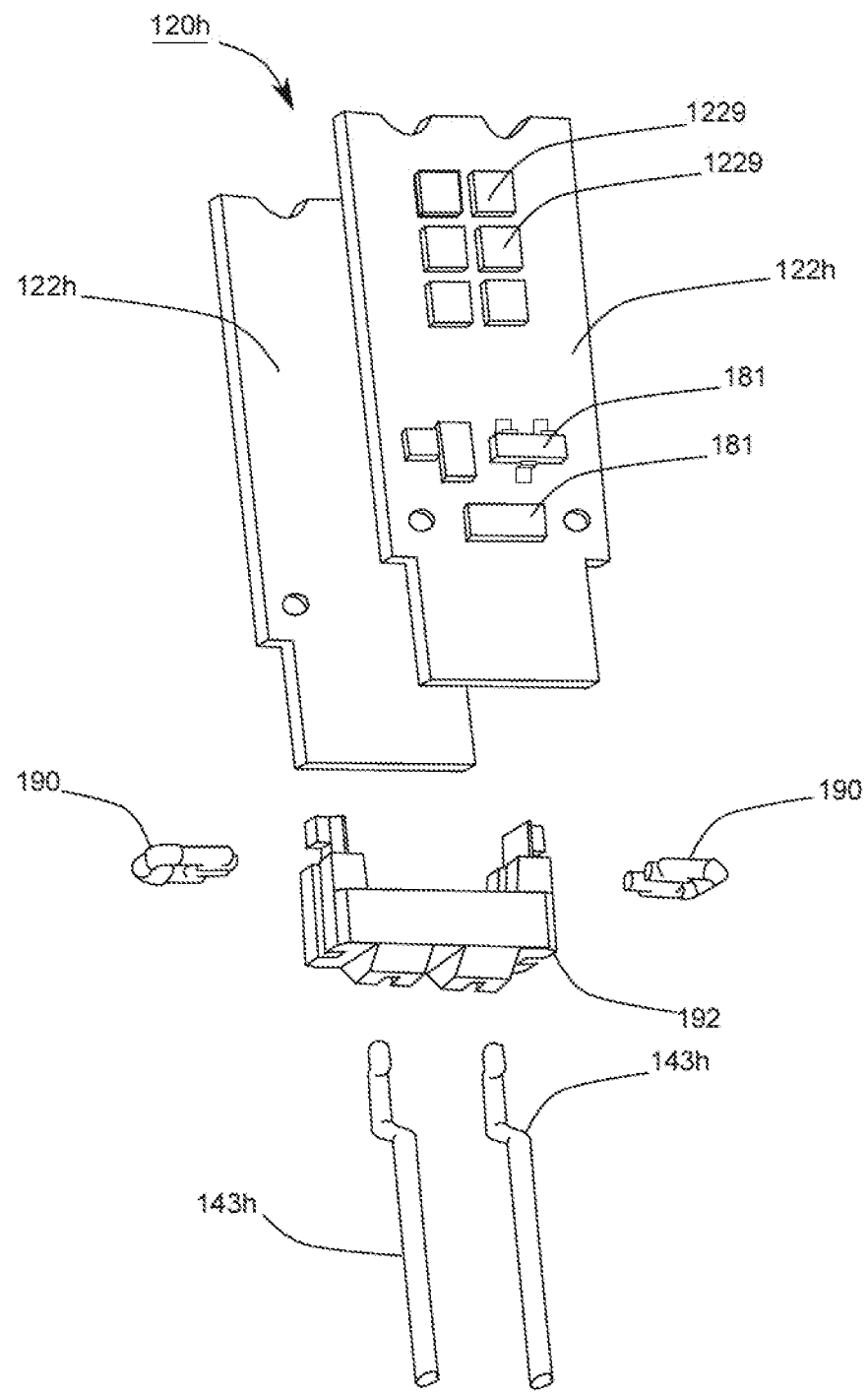
FIG. 18 shows an exploded view of light source assembly shown in FIG. 17.

FIG. 18 shows an exploded view of the light source assembly 120h. The light source assembly 120h includes two PCB circuit boards 122h. Each PCB circuit board 122h is a single-sided printed high thermal conductivity ceramic substrate. It means only one side has a printed circuit. An LED 1229 and electronic parts 181 can be disposed on the side of the PCB circuit board 122h with the printed circuit for implementing the light source driving circuit 180 in FIG. 11A, 11B or 11C. Two PCB circuit boards are close together by the side with no printed circuit as a carrier plate. The non-conductive position component 192 can fix the two PCB circuit boards 122h. Two conduction components 190 are located on two sides of the position component 192 to further fasten the two PCB circuit boards 122h. In addition, the electric-conductive conduction components 190 may also provide an electrical connection between the two PCB circuit boards 122h. The pin 143h can be fixed on the position component 192 and soldered to the PCB circuit board 122h to electrically connect the LED and the light source driving circuit 180. Pin 143 meets the standard of G4 bulb.

Figure 19:
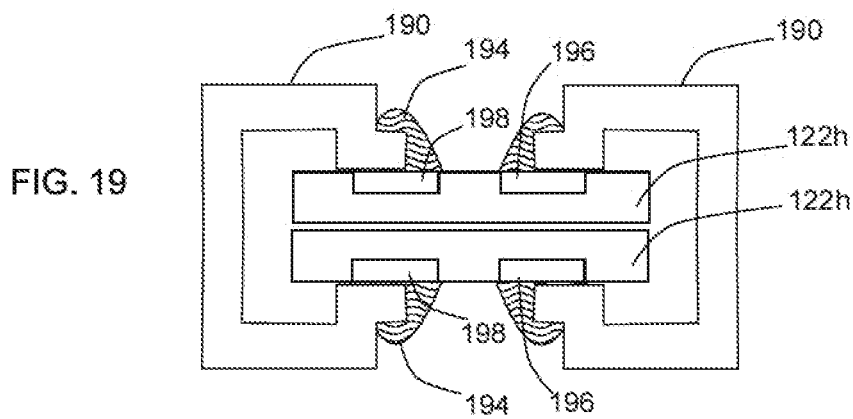
FIGS. 19 and 20 show two assembly results of conduction component and two PCB circuit boards.

FIG. 19 shows the assembly diagram of the conduction components 190 and the two PCB circuit boards 122h. In this embodiment, the printed circuits on the two PCB circuit boards 122h are different and the two conduction components 190 are the same. The conduction components 190 are soldered to the two PCB circuit boards 122h through a solder paste 194 and electrically connect the contact points 198 and 196. For example, the contact point 198 may be electrically connected to a positive electrode of the LED 1229, and the contact point 196 may be electrically connected to a negative electrode of the LED 1229. Therefore, the conduction components 190 make the LEDs 1229 on the two PCB circuit boards 122h connected together in parallel. As shown in FIG. 19, since the contact points 198 of the two PCB circuit boards 122*h* are on the left side of FIG. 19, the printed circuits on the two PCB circuit boards 122*h* in FIG. 19 are not the same.

Figure 20:
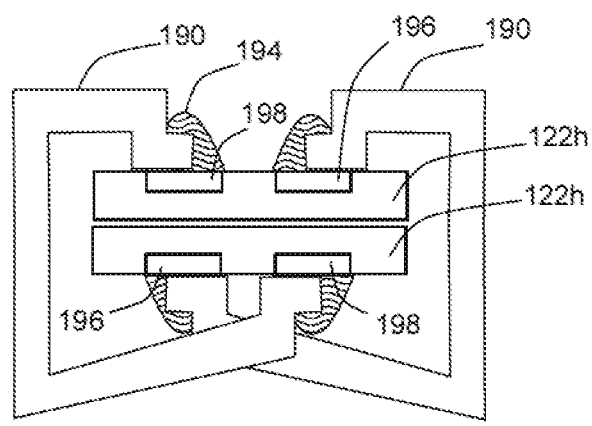
Figure 21:
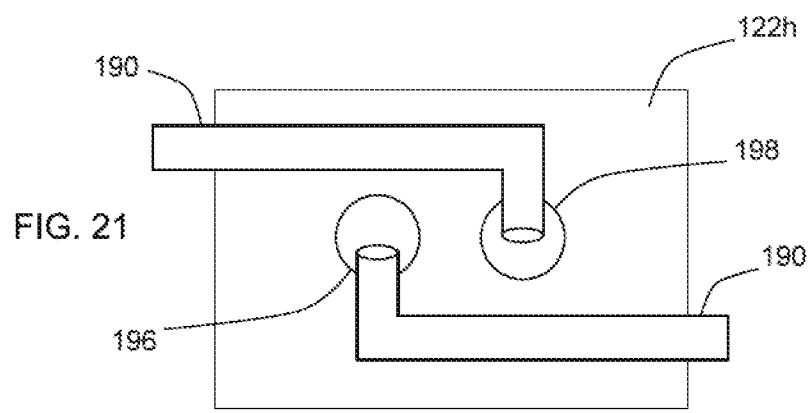
FIG. 21 shows the bottom view of the assembly result shown in FIG. 20.

FIG. 20 shows another assembly diagram of the conduction components 190 and the two PCB circuit boards 122*h*. In this embodiment, the printed circuits on the two PCB circuit boards 122*h* are the same, and the two conduction components 190 have different structures. The conduction components 190 are soldered on the two PCB circuit boards 122*h* through a solder paste 194 to electrically connect the two contact points 198. FIG. 21 shows a bottom view of FIG. 20. A conduction component 190 electrically connects the two contact points 198 and the other conduction component 190 electrically connects the two contact points 196. Similarly, the contact point 198 may be electrically connected to a positive electrode of the LED 1229, and the contact point 196 may be electrically connected to a negative electrode of the LED 1229. In this way, the conduction components 190 make the LEDs 1229 on the two PCB circuit boards 122*h* to be connected together in parallel. As FIG. 20 indicates, since the contact point 198 of one PCB circuit board 122*h* is on the left of FIG. 20 and the contact point 198 of the other PCB circuit board 122*h* is on the right of FIG. 20, both printed circuits on the PCB circuit boards 122*h* in FIG. 20 can be totally the same.

Figure 22:
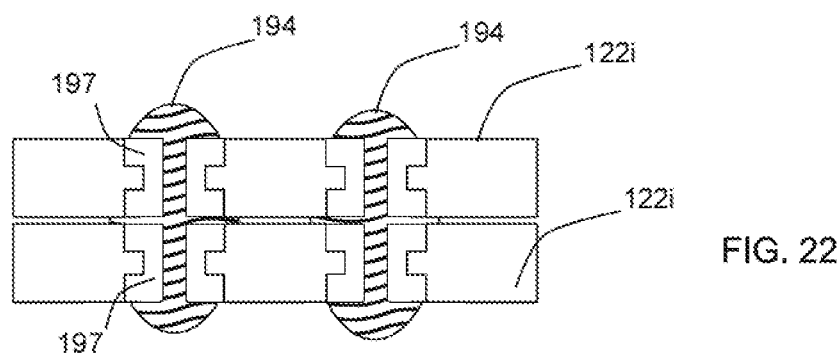
FIG. 22 shows one assembly result of two PCB circuit boards.

FIG. 22 shows an assembly diagram of two PCB circuit boards 122*i* in another embodiment. Each PCB circuit board 122*i* has a via 197. Hot melt solder paste 194 can be filled into the via 197. The solidified solder paste 194 not only can fix the two PCB circuit boards 122*i* together but also provides the electrical connection between the two PCB circuit boards 122*i*.

In general, the price of a high thermal conductivity ceramic substrate with printed circuits on both sides is higher than a high thermal conductivity ceramic substrate with printed circuits on single side. Therefore, using two single-sided high thermal conductivity ceramic substrates to form a carrier plate can be relatively save the cost.

Figure 23A:
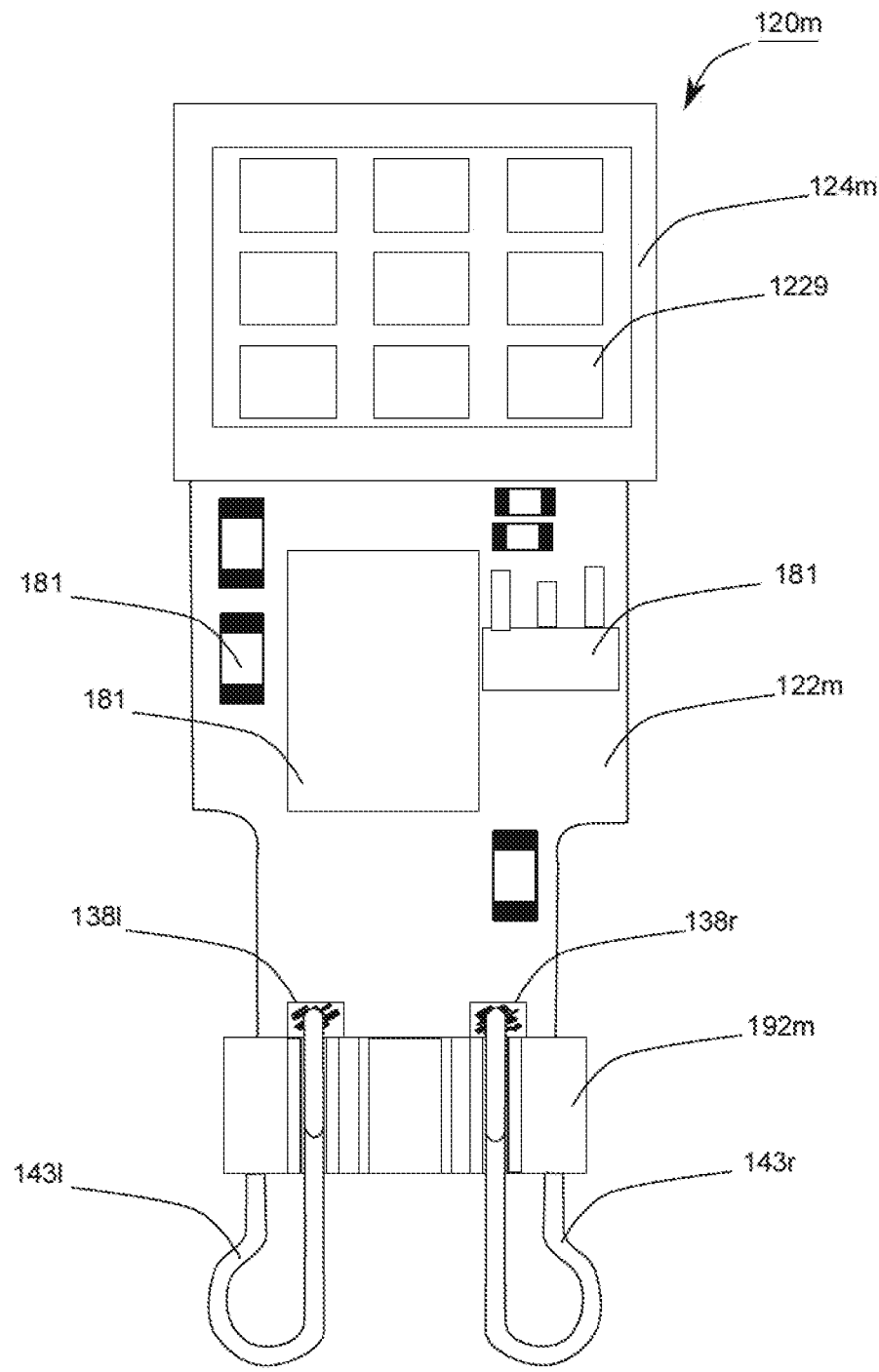
FIGS. 23A and 23B respectively show a front view and a back view of a light source assembly.
Figure 23B:
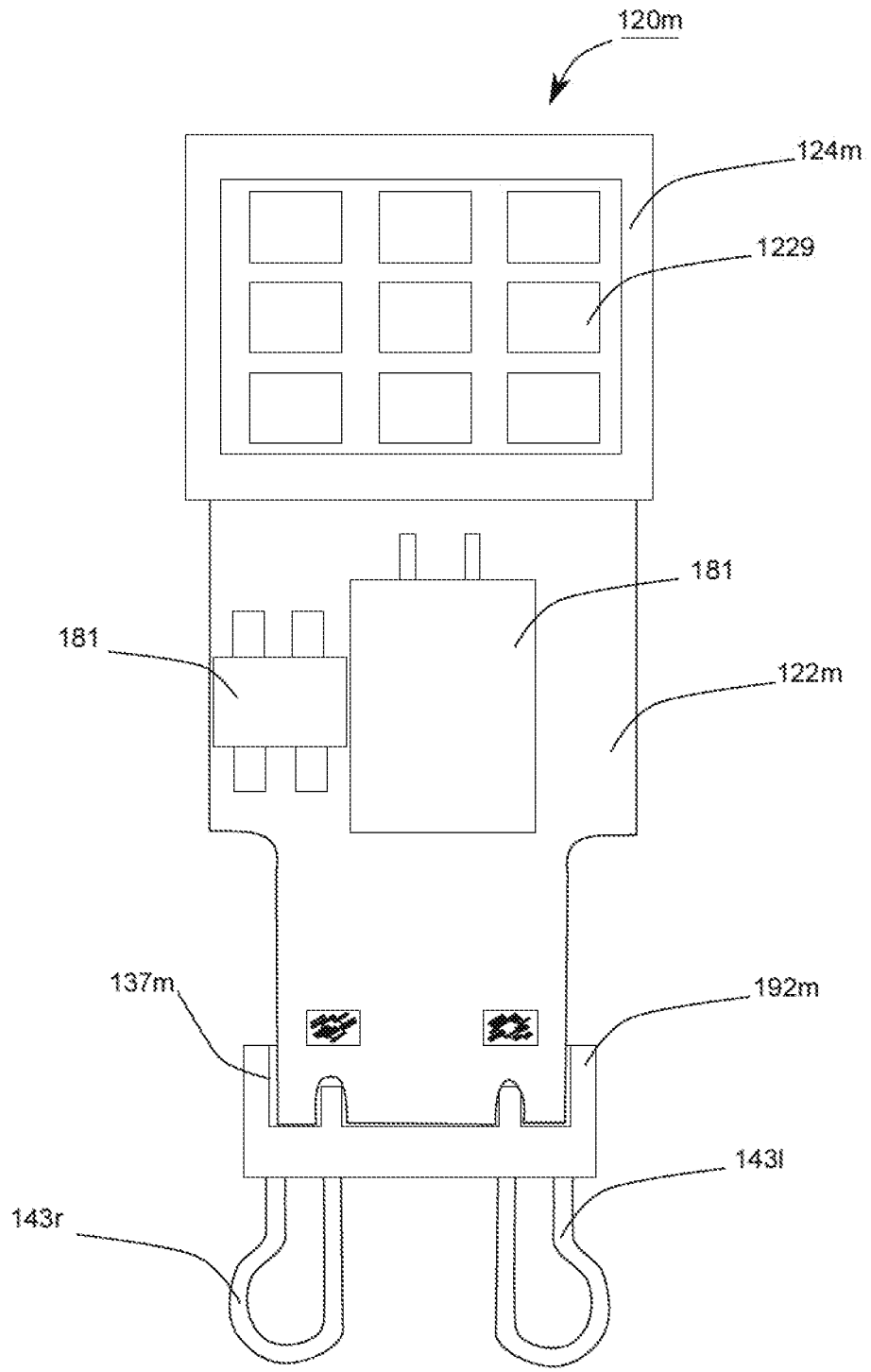

FIG. 23A and FIG. 23B respectively show a front view and a back view of a light source assembly 120*m*. The light source assembly 120*m* includes a protection ring 124*m*, a PCB circuit board 122*m*, a position component 192*m*, and pins 143*l* and 143*r*. A plurality of LEDs 1229 and an electronic part 181 are soldered on the front and back sides of the PCB circuit board 122*m*.

FIGS. 24A and 24B respectively show different perspective views of the position component 192*m*. FIGS. 25A and 25B respectively show two pins 143*l* and 143*r*. The position component 192*m* can be made of plastic, and has two blind holes of position holes 130*l*, 130*r* and two fixing grooves 132*l*, 132*r*. The pins 143*l* and 143*r* are fixed to the fixing grooves 132*l* and 132*r*. In FIG. 24B, the position component 192*m* has a groove 137*m* for receiving the PCB circuit board 122*m*. The position component 192*m* can fix the pins 143*l* and 143*r* to the relative positions of the PCB circuit board 122*m* while avoiding short-circuit between the pins 143*l* and 143*r* and the edge of the PCB circuit board 122*m*.

Figure 26:
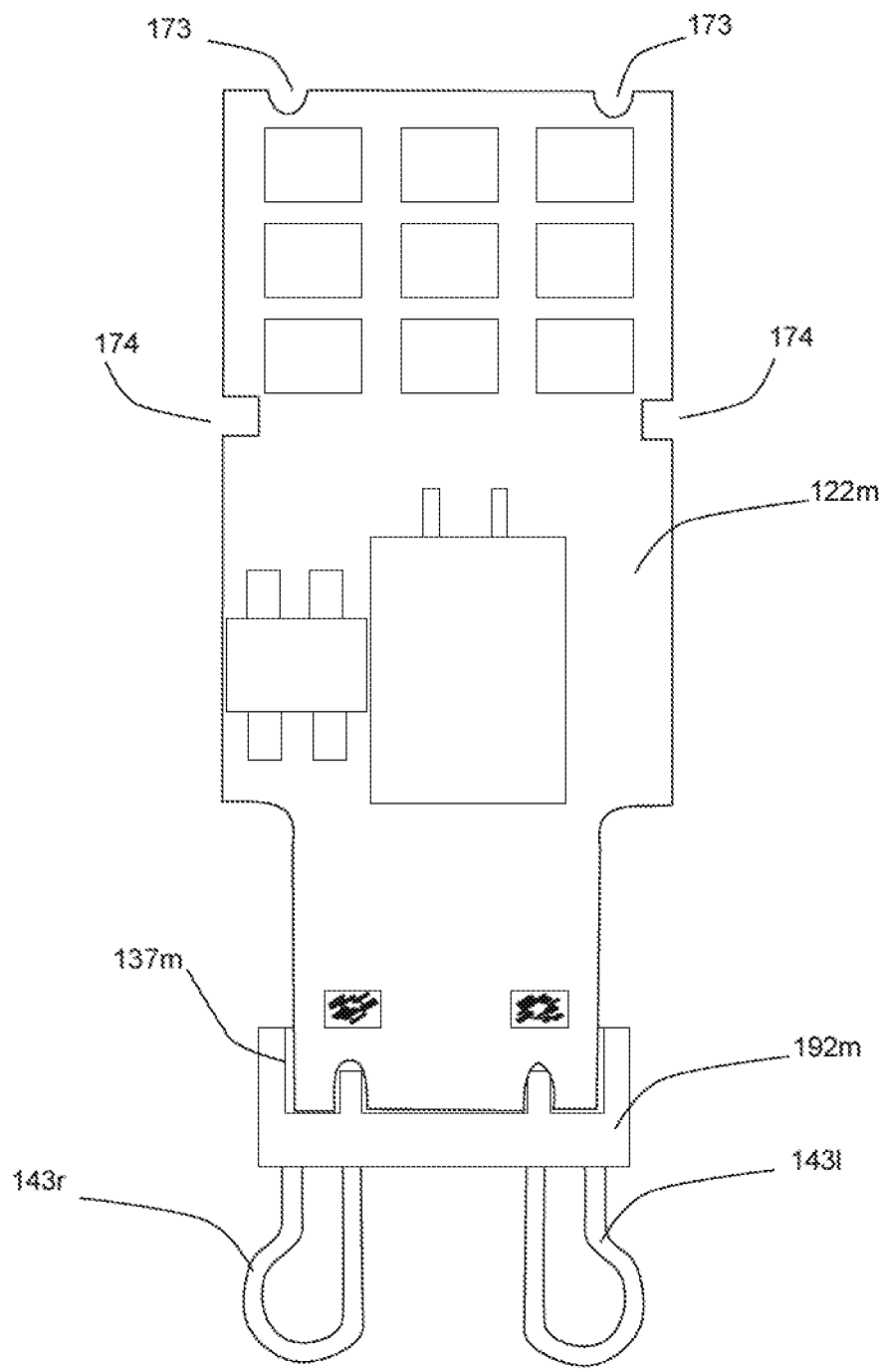
FIG. 26 shows a non-completed light source assembly.

One end 134*l* of the pin 143*l* is inserted into the position hole 130*l* of the position component 192*m* during assembling. After that, the position hole 130*l* is taken as the center of the circle and the pin 143*l* is rotated so that a part of the pin is stuck in the fixing groove 132*l*. The assembly of the pin 143*r* and one end 134*r* with position component 192*m* can be done in a similar fashion. Next, the PCB circuit board 122*m* is inserted into the groove 137*m*, and one end 136*l* of the pin 143*l* and one end 136*r* of the pin 143*r* are soldered and fixed on the bonding pads 138*l* and 138*r*, respectively. The light source assembly 120*m* can be completed in this way, as shown in FIG. 26.

Figure 27:
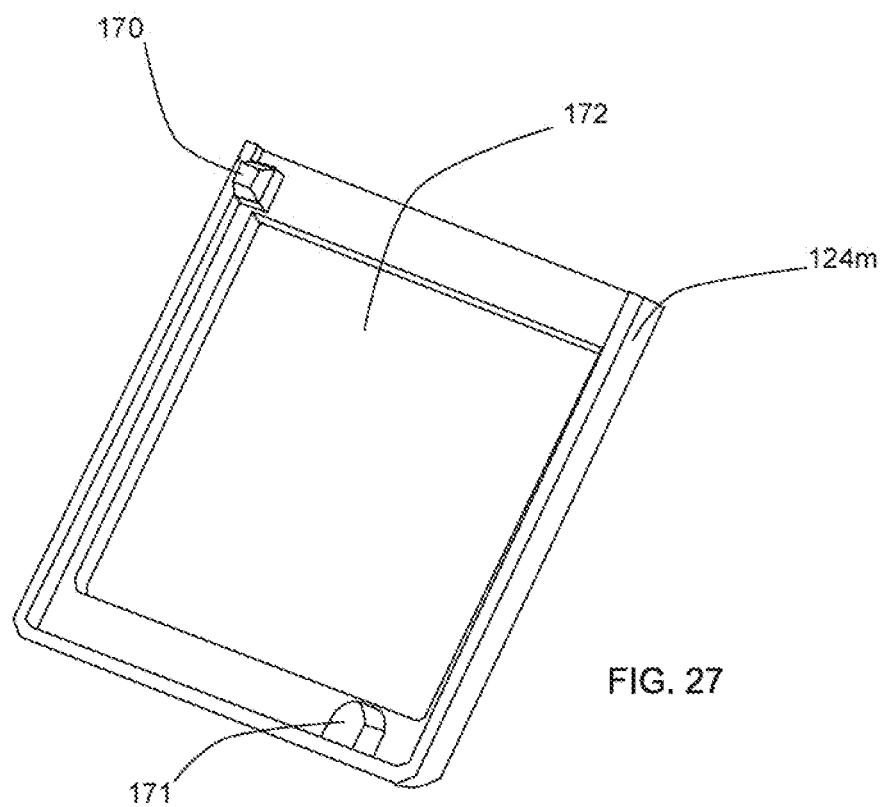
FIGS. 27 and 28 show two protection rings.

FIG. 27 shows a perspective view of a protection ring 124*m*. When the main body, the side frame and the bottom body are formed by injection molding, the colloid may be formed on the LED 1229 (refer to FIG. 23A) during injection process, thereby affecting the luminance of the light source assembly 120*m*. Therefore, the protection ring 124*m* provides a buffer to prevent the colloid from being formed on the LED 1229. Protection ring 124*m* can be made of plastic material. As shown in FIGS. 23A and 23B, two protection rings 124*m* are respectively provided on the front and back sides of the PCB circuit board 122*m* and the PCB circuit board 122*m* is sandwiched in between two protection rings 124*m*.

As shown in FIGS. 23A, 23B, 26 and 27, each protection ring 124*m* has an empty window 172 for exposing a light emitting area where the LED 1229 is located. Each protection ring 124*m* has two position plugs 170, 171. When the protection ring 124*m* is fixed on the PCB circuit board 122*m*, the position plug 171 substantially corresponds to the groove 173 of the PCB circuit board 122*m* and the position plug 170 substantially corresponds to the groove 174 of the PCB circuit board 122*m*.

Figure 28:
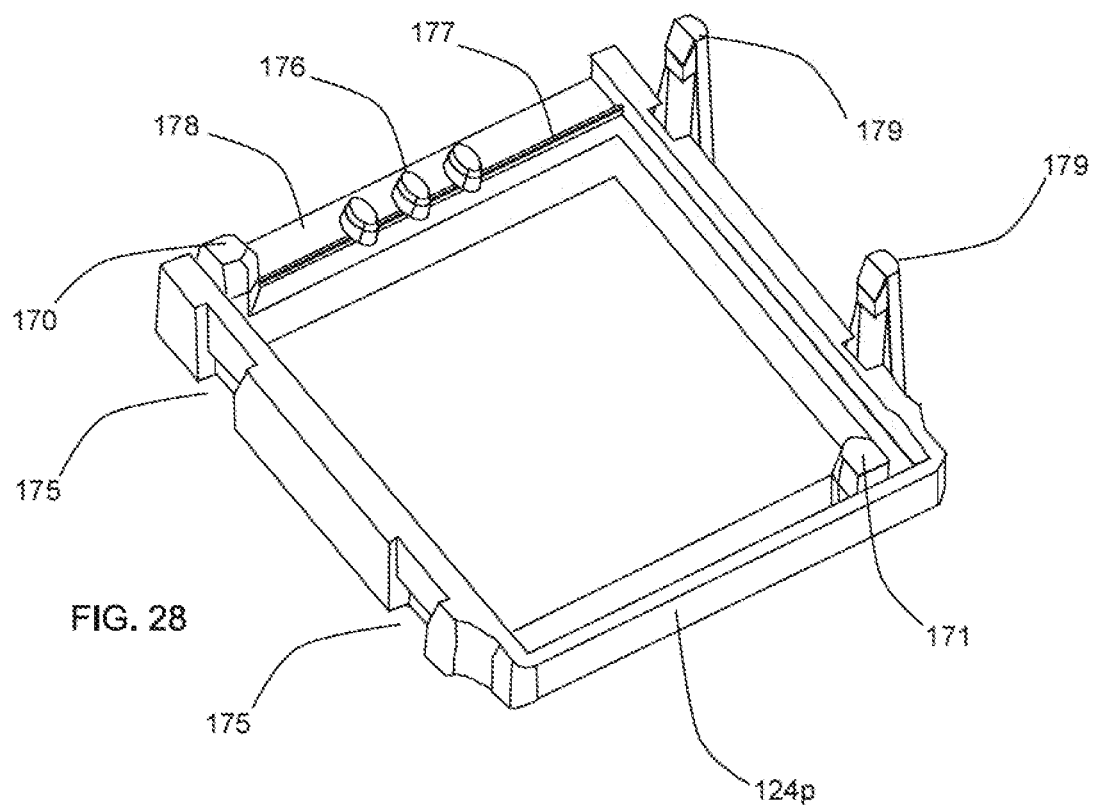
Figure 29:
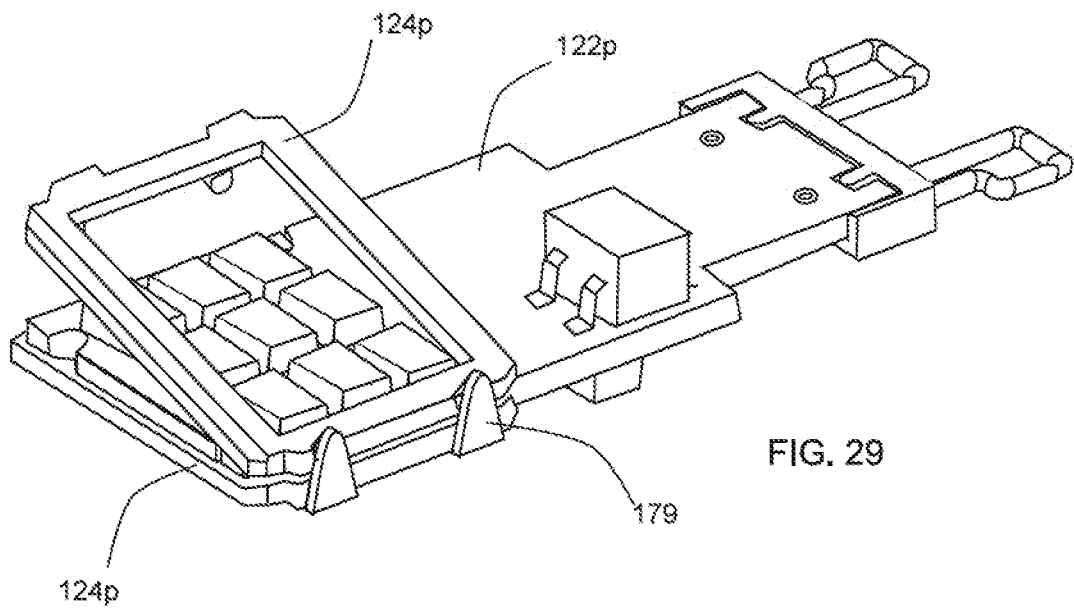
FIG. 29 shows the two assembling protection rings that clamp a PCB circuit board.

The protection ring 124*m* in FIG. 27 is merely an example and the present disclosure is not limited to this. FIG. 28 shows a perspective view of another protection ring 124*p*. FIG. 29 shows a perspective view of the two protection rings 124*p* not assembled. In comparison with the protection ring 124*m* in FIG. 27, the protection ring 124*p* is further provided with a bolt 179, a latch groove 175, a fixing protrusion 176 and a small protruding strip 177.

As shown in FIG. 28 and FIG. 29, when the two protection rings 124*p* are assembled, the two bolts 179 of one protection ring 124*p* can buckle the two latch grooves 175 of the other protection ring 124*p* to form a stable buckle structure. In addition, when the two protection rings 124*p* are assembled, the fixing protrusion 176 can be inserted into a corresponding hole (not shown) on the PCB circuit board 122*p* to prevent the frame 178 from being deformed or drifted during the injection molding process. Moreover, the small protruding strip 177 can close the gap between the protection ring 124*p* and the PCB circuit board 122*p* to prevent the colloid from spilling into the light-emitting area.

Figure 30:
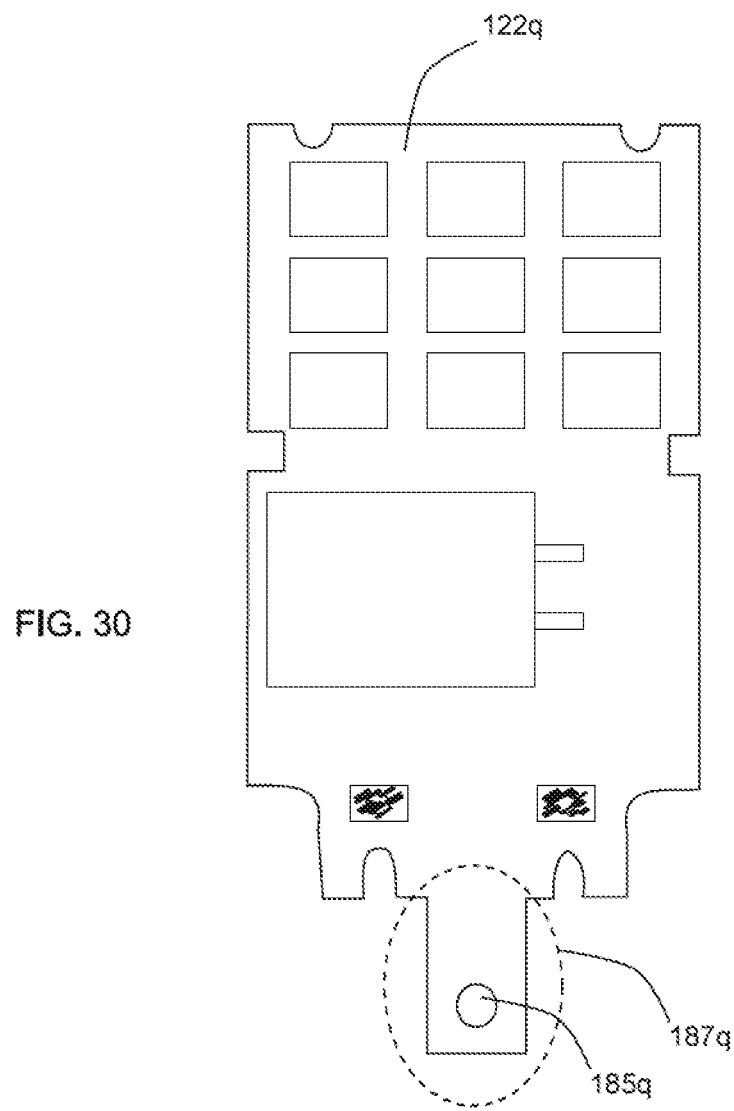
FIG. 30 shows another PCB circuit board.
Figure 31A:
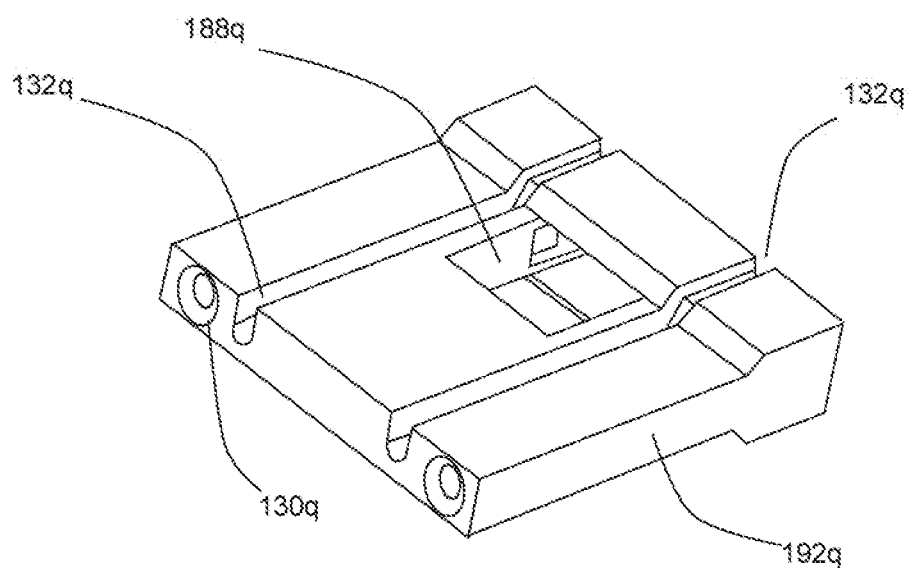
FIG. 31A shows a perspective view of a position component.
Figure 31B:
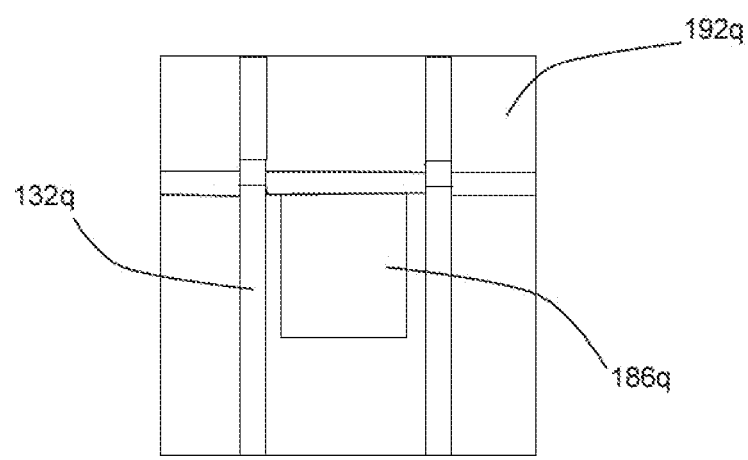
FIG. 31B shows a top view of a position component.

FIG. 30 shows another PCB circuit board 122*q*. In comparison with the PCB circuit board 122*m* in FIG. 26, the PCB circuit board 122*q* has one extension portion 187*q* and the extension portion 187*q* has one via 185*q*. FIG. 31A shows a perspective view of position component 192*q* adaptable for PCB circuit board 122*q* and FIG. 31B shows a top view of position component 192*q* of FIG. 31A. As shown in FIGS. 31A and 31B, in comparison with the position component 192*m*, the position component 192*q* has a receiving groove 188*q*, which forms an opening window 186*q* in FIG. 31B.

Figure 32:
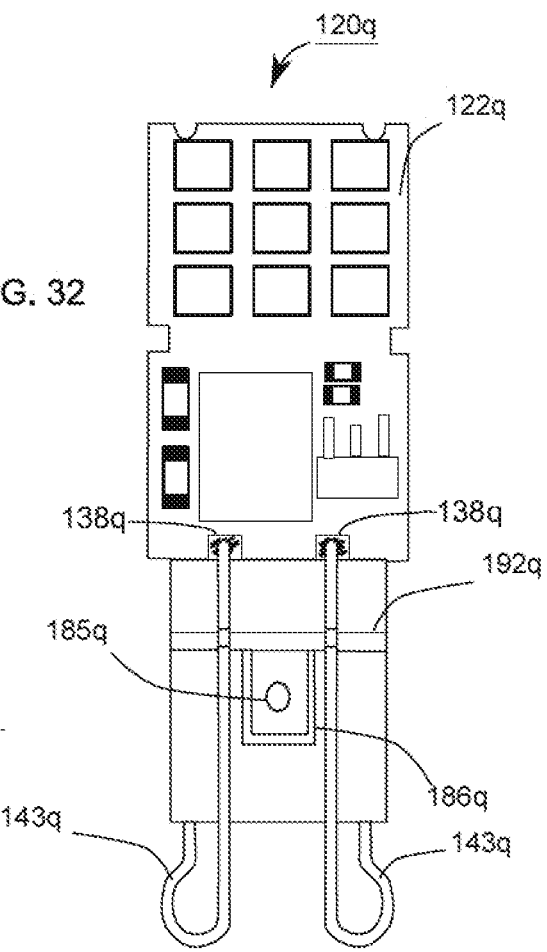
FIG. 32 shows a light source assembly.

FIG. 32 shows a front view of a light source assembly 120*q* after the position component 192*q* and the PCB circuit board 122*q* are assembled. The two pins 143*q* can be assembled on the position component 192*q*, inserted in the position hole 130*q*, and stunk in the fixing groove 132*q*. The extension portion 187*q* of the PCB circuit board 122*q* can be inserted into the receiving groove 188*q* and the two pins 143*q* are respectively soldered and fixed on the bonding pads 138*q* to complete the light source assembly 120*q* shown in FIG. 32. In FIG. 32, the opening window 186*q* exposes the extension portion 187*q* and the via 185*q* therein.

Figure 33:
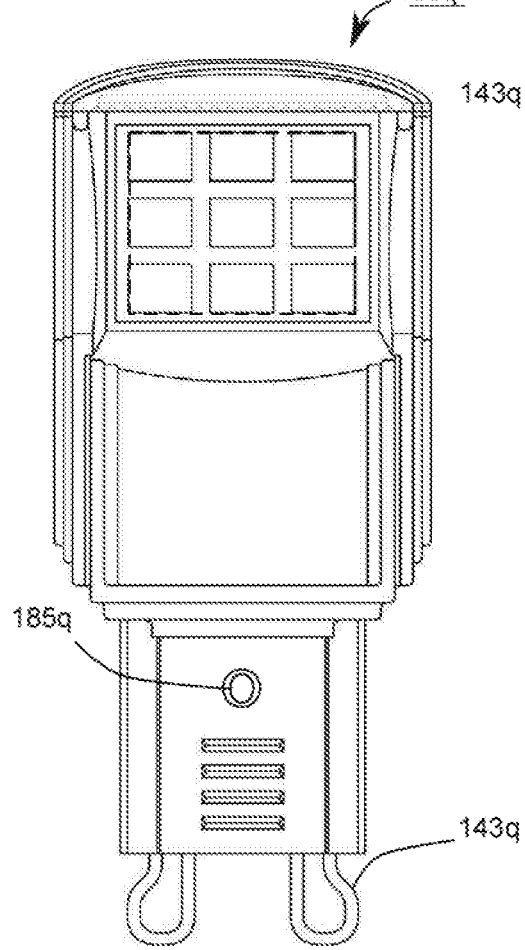
FIG. 33 shows a LED bulb.

FIG. 33 shows the LED bulb 100q after the light source assembly 120q in FIG. 32 is processed in injection molding to form the main body, the side frame and the bottom body. The mold used in the injection molding may be designed with a plug insertion via 185q for fixing the light source assembly 120q to prevent it from being moved by the impact of the colloid. Therefore, via 185q is still exposed after injection molding without being covered by the colloid, as shown in FIG. 33.

In an embodiment, the pins are made of metal wires. In some embodiments, the pins are bent to the desired shape and then connected to a position component and a PCB circuit board. In another embodiment, the pins can be connected to a PCB circuit board and then bent to the desired shape.

Figure 34:
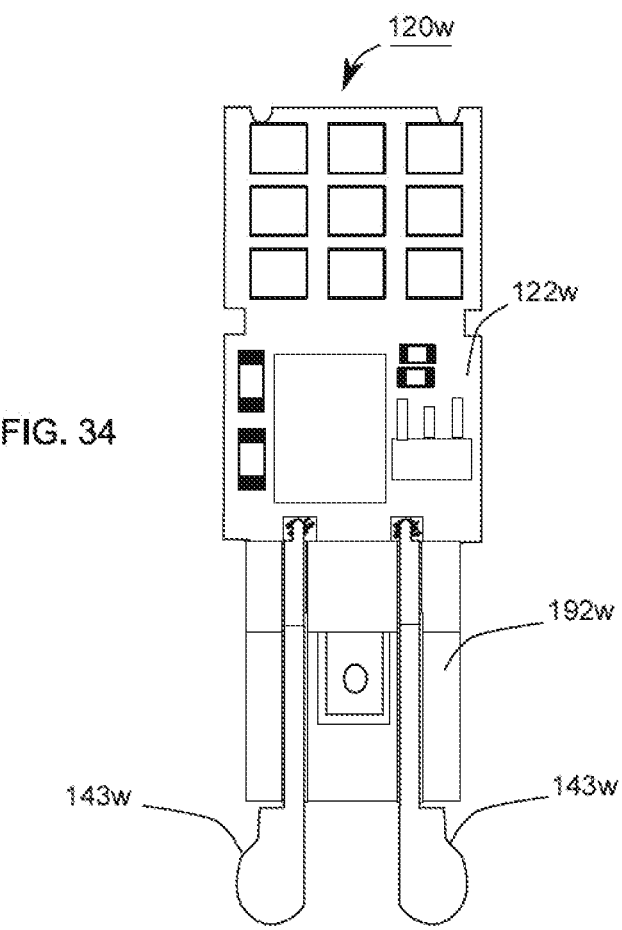
FIG. 34 shows another light source assembly.
Figure 35:
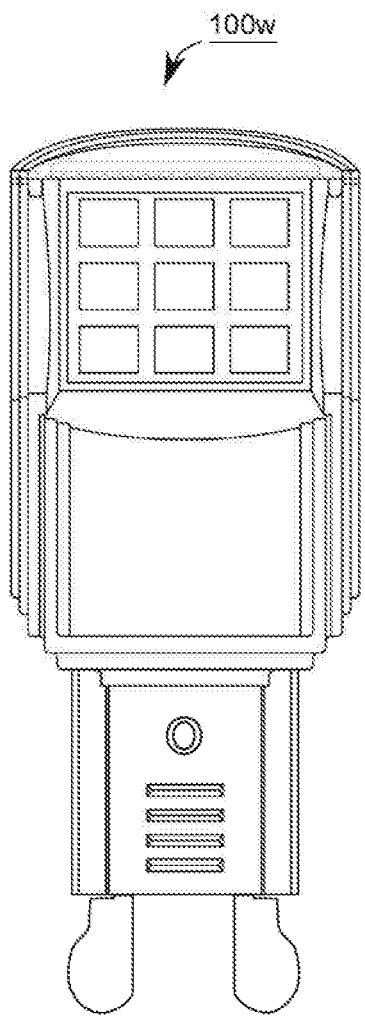
FIG. 35 shows another LED bulb.

In the embodiment of the present disclosure, the pin is not limited to a metal wire. FIG. 34 shows another light source assembly 120w, which is different from the light source assembly 120q of FIG. 32. The difference is that the light source assembly 120w has two pins 143w which are made of metal plates. The pins 143w are stunk on the position component 192w and soldered to the PCB circuit board 122w. FIG. 35 shows the LED bulb 100w after the light source assembly 120w is processed in injection molding.

Figure 36:
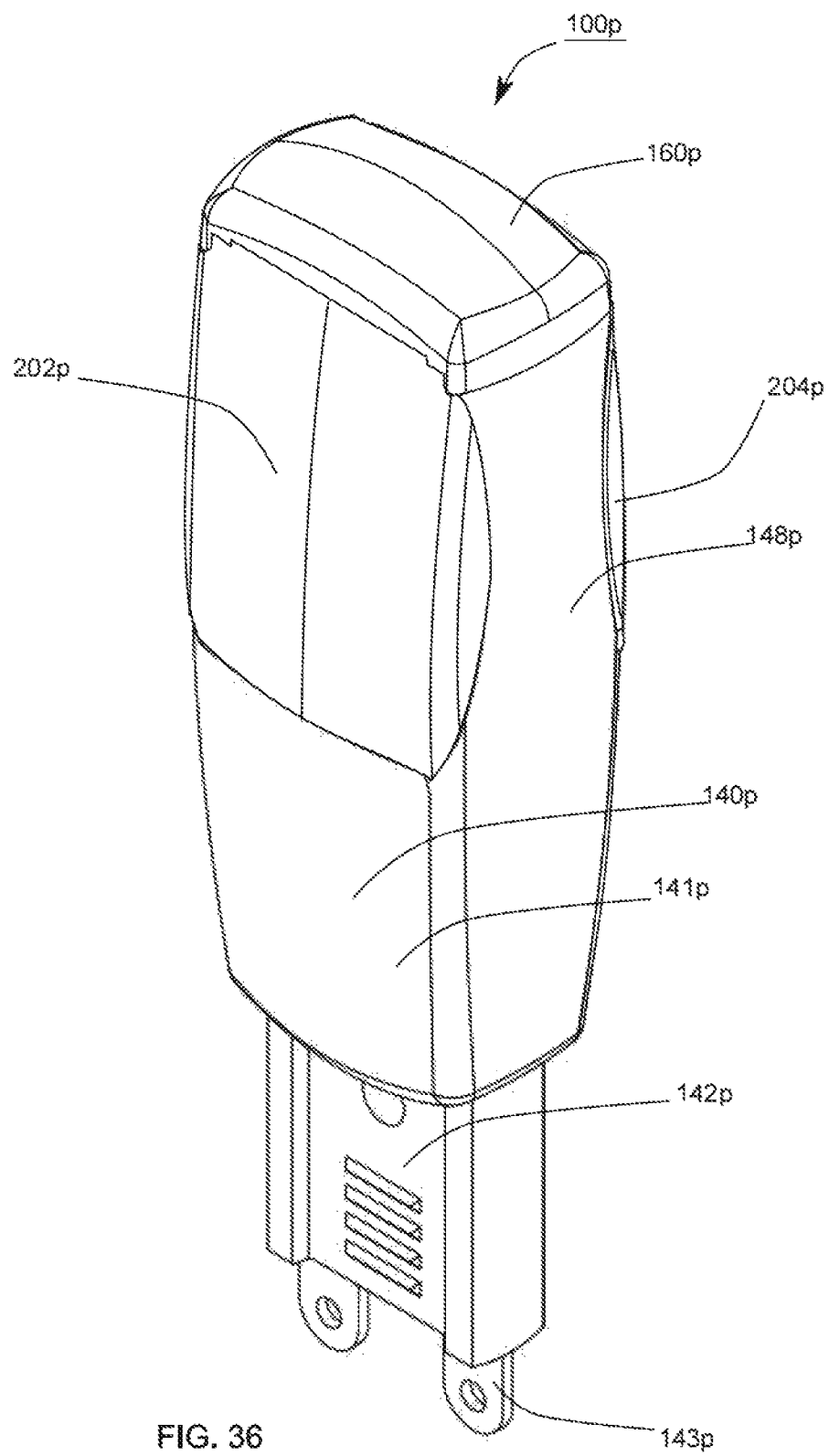
FIG. 36 shows another LED bulb.
Figure 37:
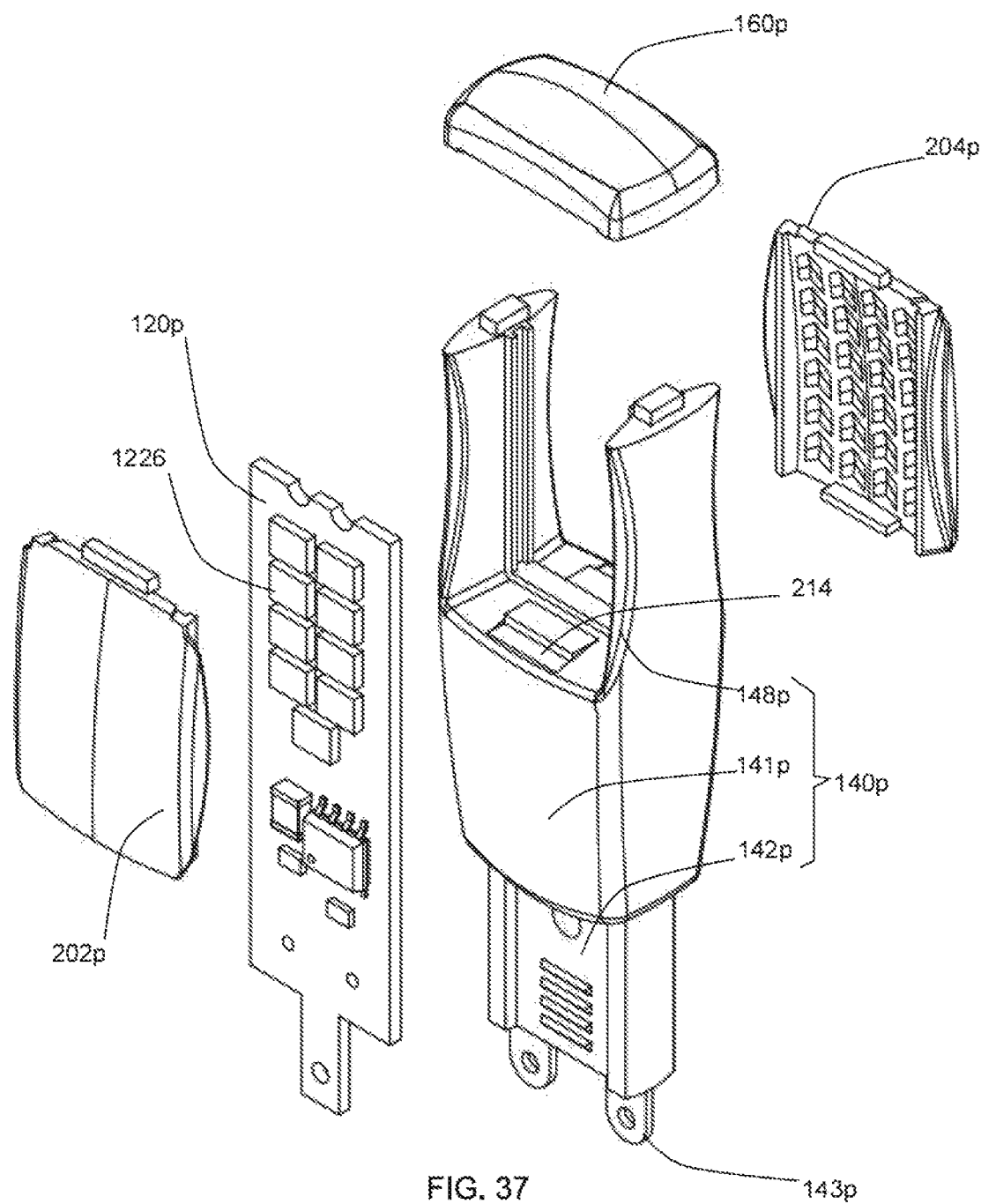
FIG. 37 shows an exploded view of LED bulb shown in FIG. 36.

FIG. 36 shows an LED bulb 100p disclosed in the embodiments in accordance with the present disclosure. FIG. 37 shows an exploded view of the LED bulb 100p. Similar to the previous embodiment, the LED bulb 100p includes a transparent top cap 160p, a light source assembly 120p, and a base 140p. The base 140p includes a main body 141p, a side frame 148p, and a bottom body 142p. The bottom body 142p includes pins 143p. Different from the previous embodiment, the LED bulb 100p includes transparent side covers 202p and 204p respectively located on the front and the back sides of the LED bulb 100p to cover the LEDs 1226 and 1228 of the light source assembly 120p. In other words, the LEDs 1226 and 1228 are not directly exposed to the external environment, air, for example. The transparent side covers 202p and 204p, the main body 141p of the base 140 and the side frame 148p together form a substantially flat outer surface for convenient taking of user. FIGS. 36 and 37 are depicted according to a presumption that the transparent top cap 160p and the transparent side covers 202p and 204p are non-transparent so that the light source assembly 120p and the possible transparent patterns are not shown in FIG. 36. For the actual object, the human eye may be able to see a part of the light source assembly 120p inside the LED bulb 100p through the transparent top cap 160p, the transparent side cover 202p or 204p. The transparent side covers 202p, 204p scatter the light emitted from the LEDs 1226, 1228, so that the light emitted from the LED bulb 100p is more uniform at all angles. When the LED bulb 100p has been operated for a long time, the transparent side covers 202 p and 204 p also prevent the luminous flux of the LED bulb 100p from being reduced due to dust falling on the LEDs 1226 and 1228.

Figure 38:
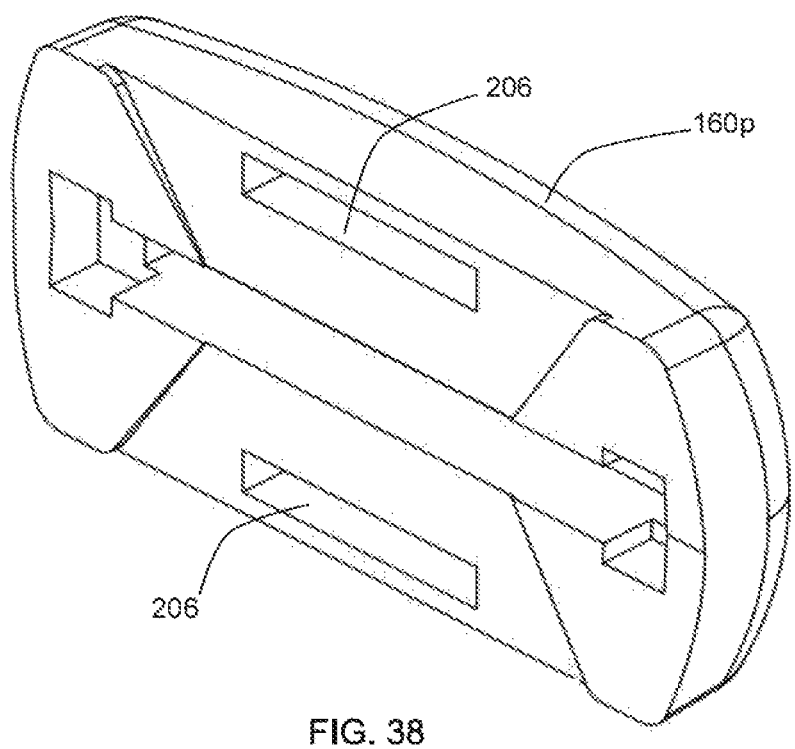
FIG. 38 shows a transparent top cap shown in FIG. 36.
Figures 39A, 39B:
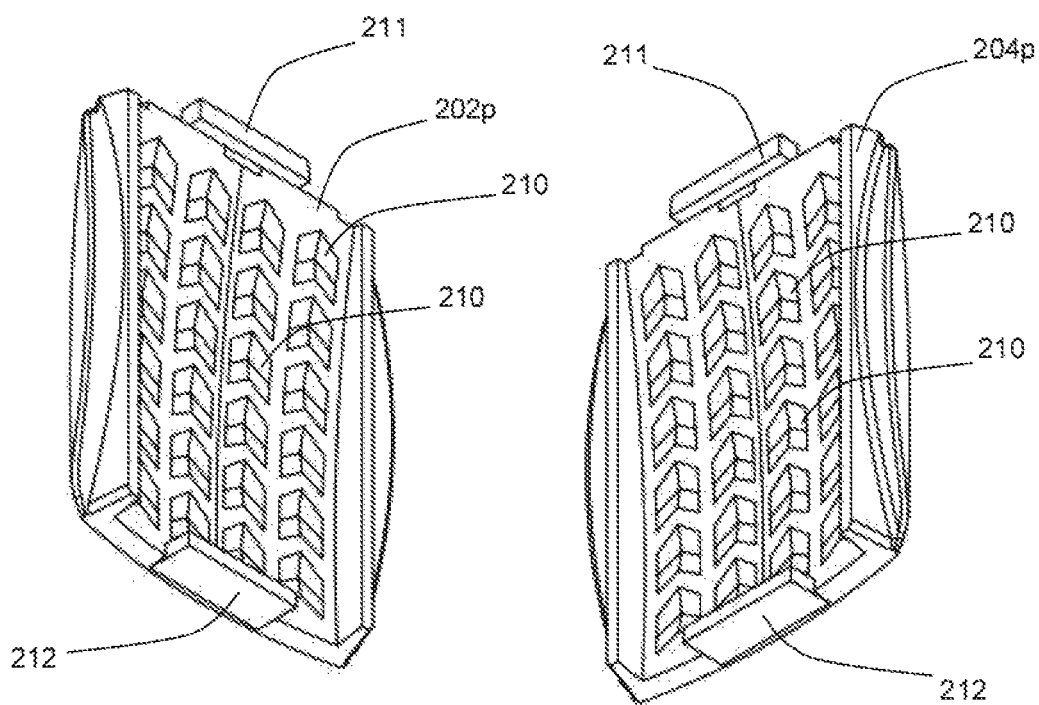
FIGS. 39A and 39B respectively show two transparent side caps.

FIG. 38 shows the transparent top cap 160p in FIG. 36. FIGS. 39A and 39B respectively show the transparent side covers 202p and 204p. The transparent side covers 202p and 204p can be identical in structure. The transparent top cap 160p, the transparent side covers 202p and 204p can respectively be integrally formed of transparent heat-resistant plastic. Different from the transparent top cap described above, a latch groove 206 is added to the transparent top cap 160p for receiving and fixing the protrusion 211 of the transparent side covers 202p and 204p. Each of the transparent side covers 202p and 204p is also provided with a bolt 212. For example, when assembling the transparent side cover 202p on the base 140p, the protrusion 211 of the transparent side cover 202p is inserted into a latch groove 206 of the transparent top cap 160p and then the transparent side cover 202p is pressed to make the bolt 212 be buckled in the groove 214 of FIG. 37.

The inner surfaces of the transparent side covers 202p and 204p include many convex or concave floral patterns 210. The floral patterns 210 can provide aesthetic or recognition of the product. The floral patterns 210 can also scatter or refract the light emitted from the light source assembly 120p to reduce the difference in luminous intensity in different directions of the LED bulb 100p, so that the LED bulb 100p can be a full perimeter light fixture. In Comparison with the smooth inner surface, the floral patterns 210 can reduce the light loss from the transparent side covers 202p and 204p and increase the luminous flux of the LED bulb 100p.

FIGS. 39A and 39B show the transparent side covers by way of example only, but the disclosure is not limited thereto. In other embodiments of the present disclosure, the transparent side covers 202p and 204p may have different shapes or patterns according to aesthetic or personal preference.

Moreover, in another embodiment, the transparent top cap 160p, the transparent side covers 202p and 204p are not three separated parts, but a transparent part which is integrally formed.

Figure 40:
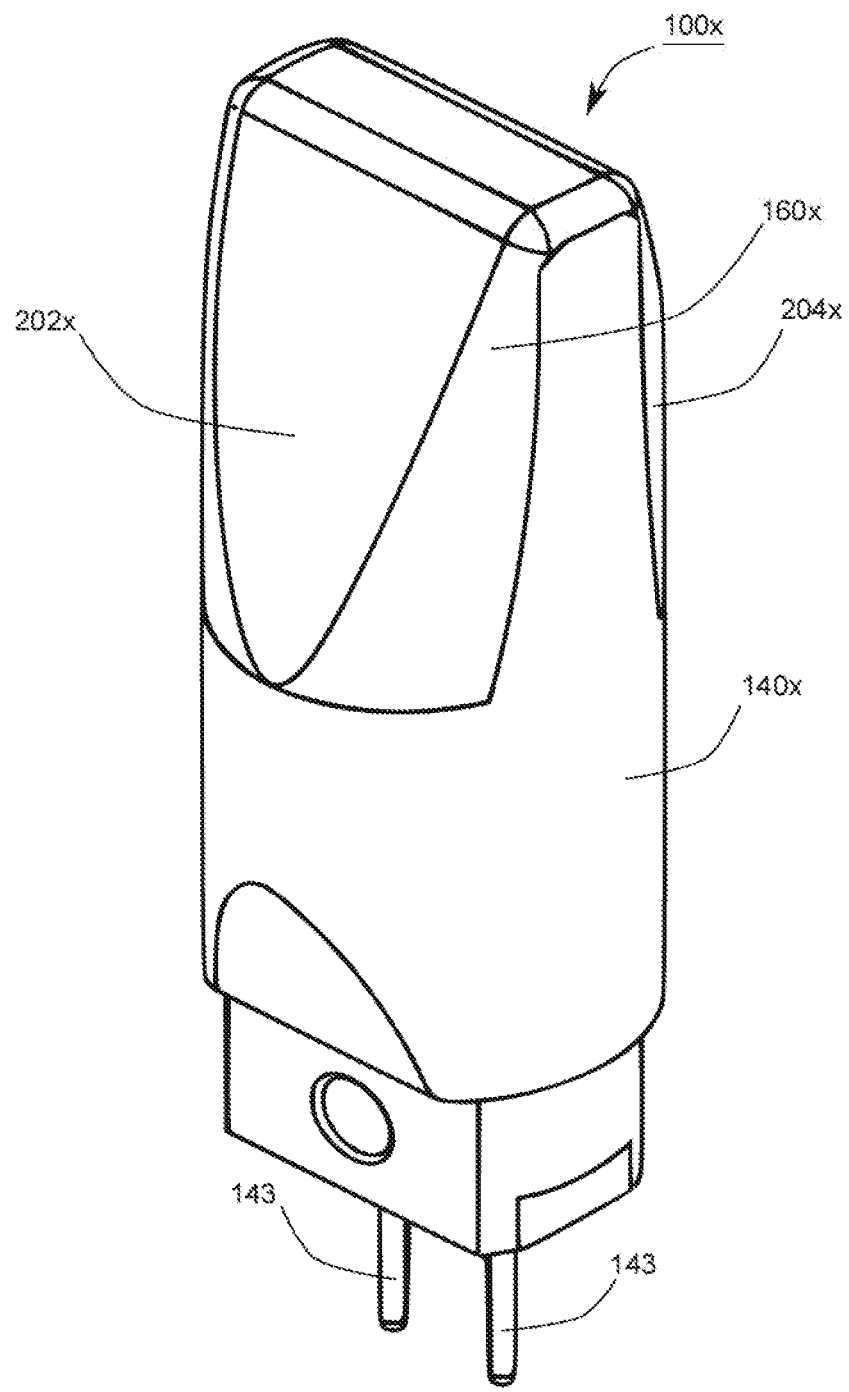
FIG. 40 shows another LED bulb.
Figure 41:
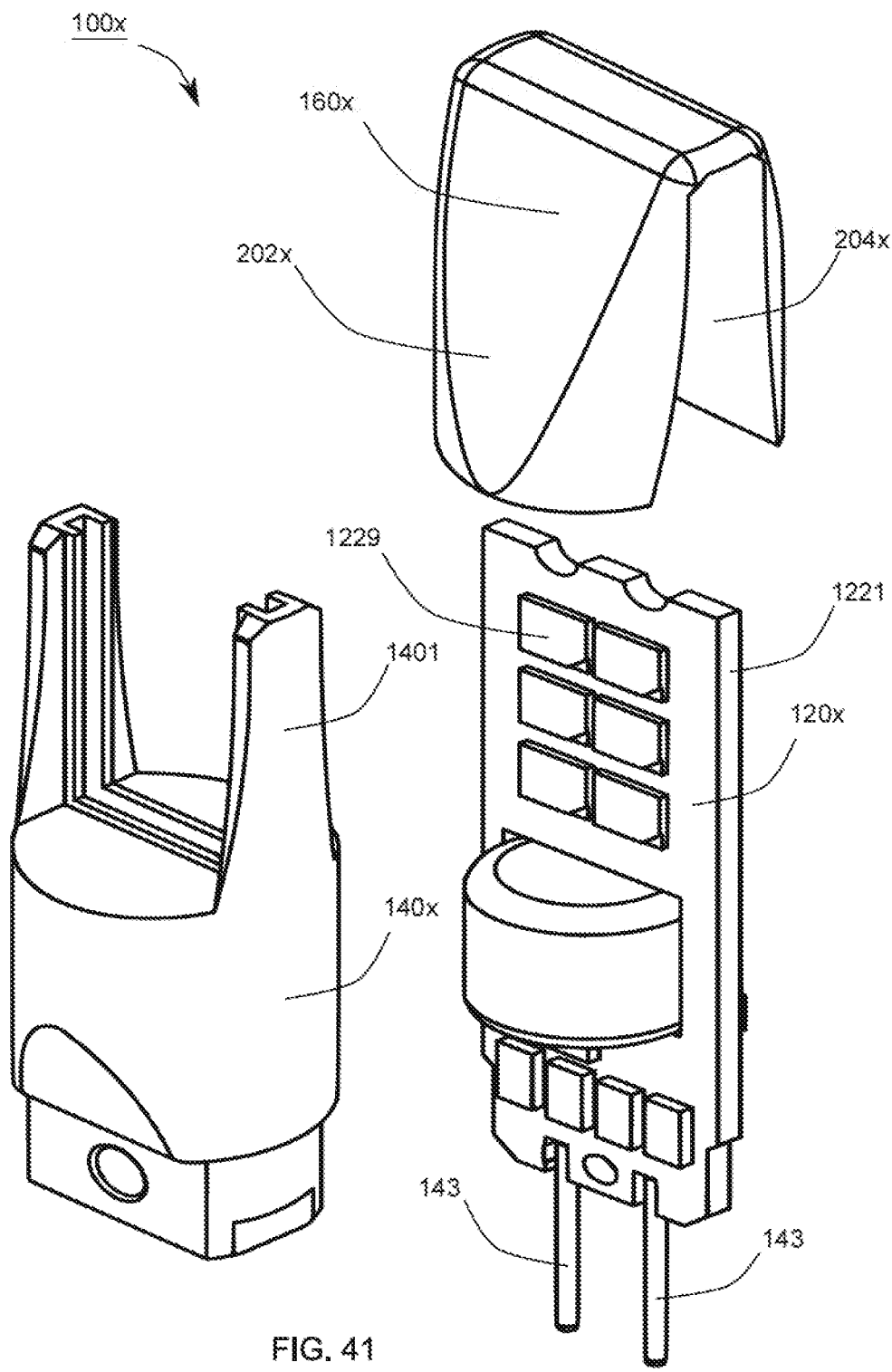
FIG. 41 shows an exploded view of LED bulb shown in FIG. 40.

FIG. 40 shows an LED bulb 100x disclosed in the embodiments in accordance with the present disclosure and FIG. 41 shows an exploded view of the LED bulb 100x. LED bulb 100x is an LED bulb. Similar to the previous embodiment, the LED bulb 100x includes a transparent top cap 160x, a light source assembly 120x, a base 140x, and pins 143. The light source assembly 120x includes a plurality of LEDs 1229. The base 140x can be made by an injection molding process and has a side frame 1401 covering the side wall 1221 of the light source assembly 120x, thereby increasing the contact area between the light source assembly 120x and the base 140x to further enhance the heat dissipation effect. Different from the previous embodiment, the transparent top cap 160x is an integrally formed transparent part and includes two extension portions 202x and 204x. After being fixed with the base 140x, the two extension portions 202x and 204x are equivalent to the two transparent side covers, so as to prevent dust from falling onto the LED 1229 of the light source assembly 120x. In this embodiment, pins 143 can meet the standard of G4 bulb.

Figure 42A:
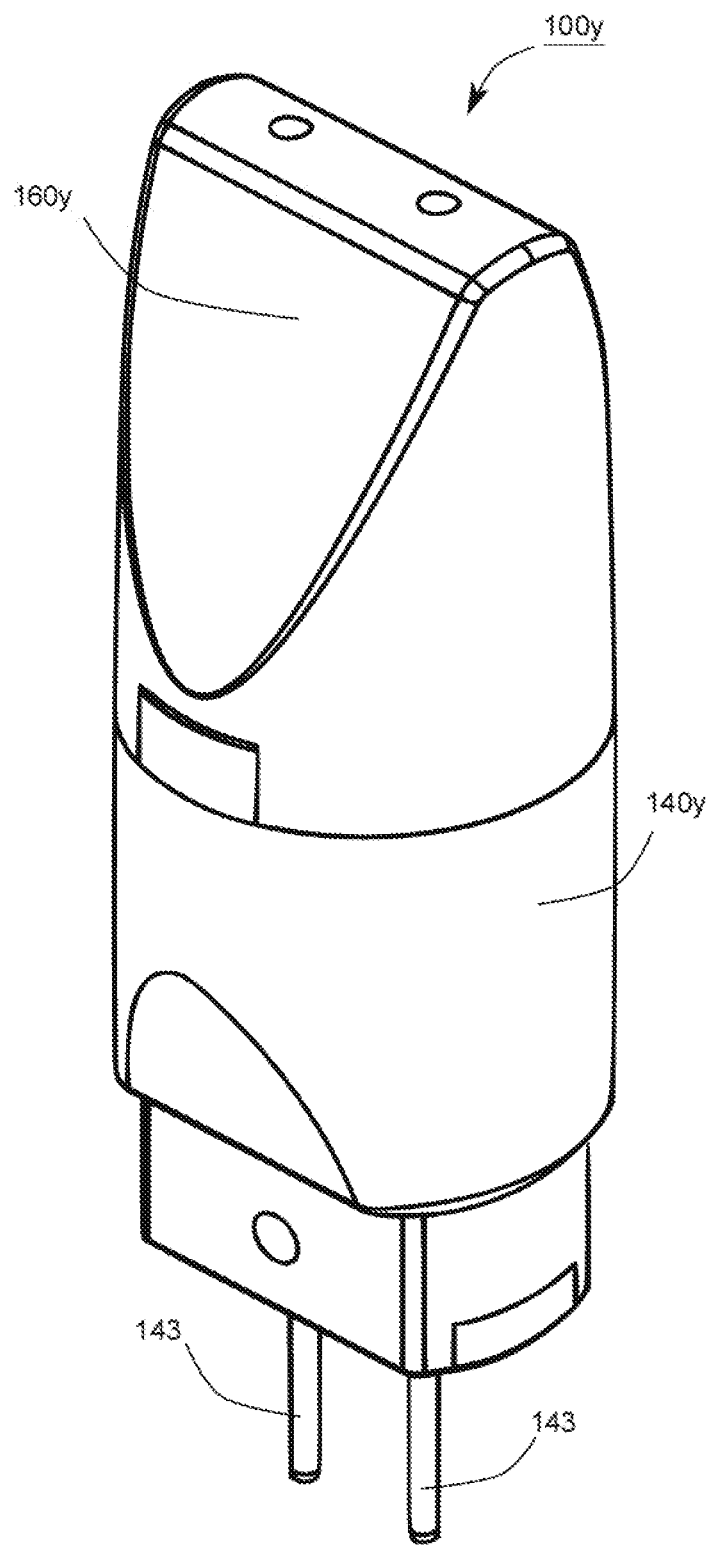
FIG. 42A shows another LED bulb.
Figure 42B:
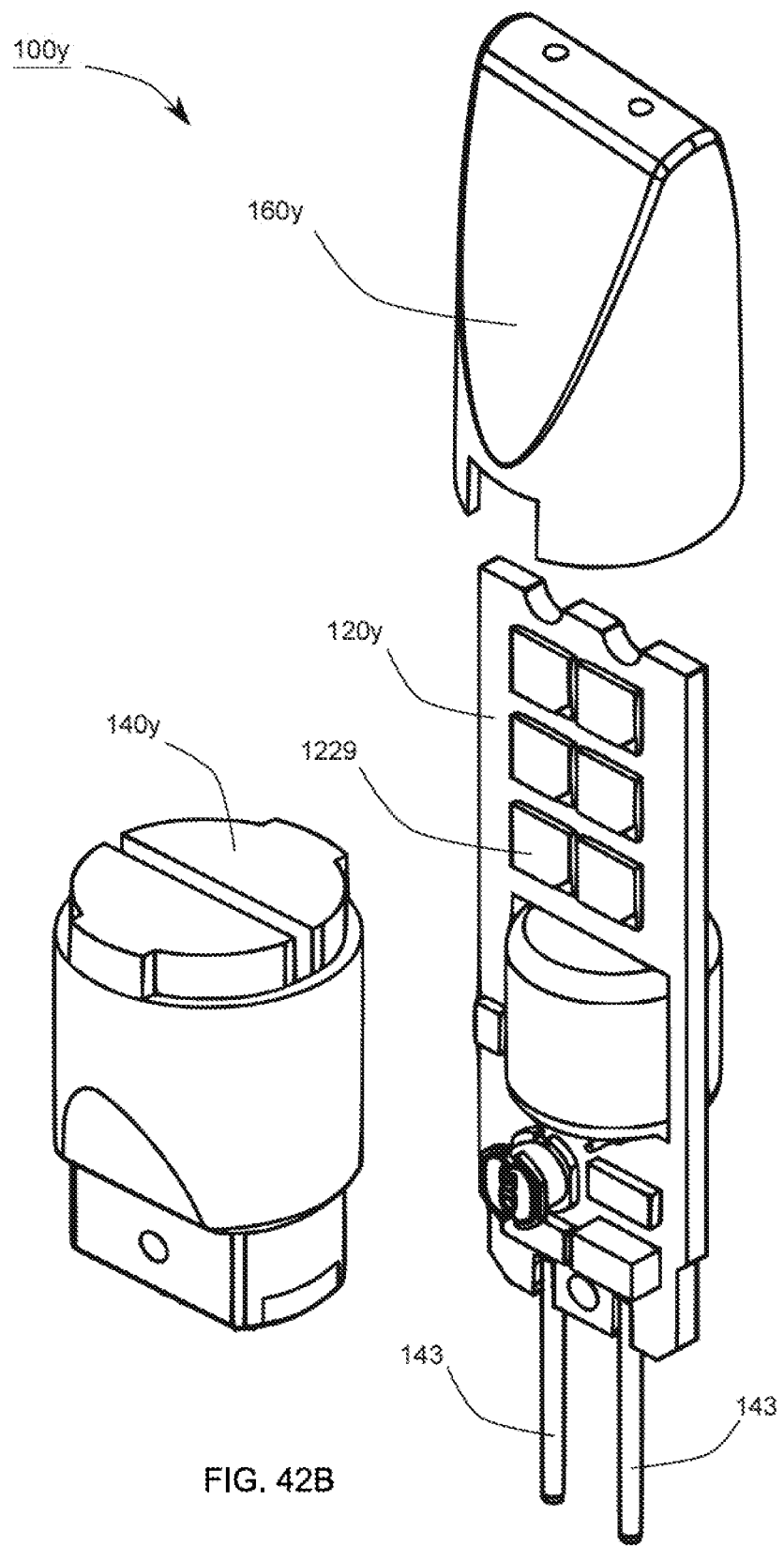
FIG. 42B shows an exploded view of LED bulb shown in FIG. 42A.

FIG. 42A shows an LED bulb 100y disclosed in the embodiments in accordance with the present disclosure and FIG. 42B shows an exploded view of the LED bulb 100y. LED bulb 100y is an LED bulb. Similar to the previous embodiment, the LED bulb 100y includes a transparent top cap 160y, a light source assembly 120y, a base 140y, and pins 143. The light source assembly 120y includes a plurality of LEDs 1229. The base 140y can be made by an injection molding process. Similar to the LED bulb 100x of FIG. 41, but the base 140y of the LED bulb 100y has no side frame (refer to FIG. 41). The transparent top cap 160y is integrally formed and has a pen-cap shape structure. When the transparent top cap 160y is buckled on the base 140y, the transparent top cap 160y can cover the light source assembly 120y, so as to prevent dust from falling onto the LED 1229 of the light source assembly 120y. In this embodiment, pins 143 can meet the standard of G4 bulb.

Figure 43:
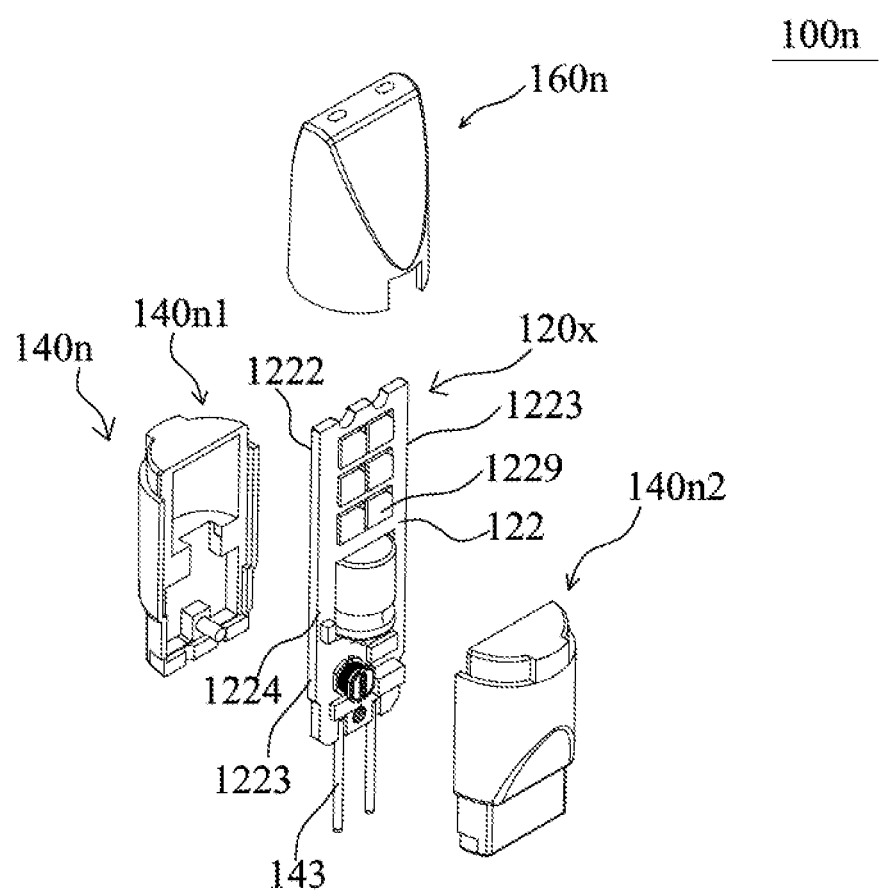
FIG. 43 shows an exploded view of another LED bulb.

FIG. 43 shows an exploded view of the LED bulb 100n. The LED bulb 100n includes a transparent top cap 160n, a light source assembly 120x, a base 140n, and pins 143. The light source assembly 120x includes a PCB circuit board 122 as a carrier plate. The PCB circuit board 122 has a front surface 1222, a back surface 1224 and two side surfaces 1223, on which LEDs 1229 are set respectively. A plurality of electronic parts is also set on the PCB circuit board 122. The transparent top cap 160n covers and surrounds the light source assembly 120x and a portion of the base 140n.

The base 140n includes a first base portion 140n1 and a second base portion 140n2. The first base portion 140n1 and the second base portion 140n2 only cover the electronic parts and do not cover the LEDs 1229. The structure of the second base portion 140n2 is substantially the same or similar with the first base portion 140n1, and the first base portion 140n1 and the second base portion 140n2 are symmetrical to each other with respect to the light source assembly 120x. The LED bulb 100n can be manufactured by referring to the LED bulb 100m and will be described later.

Figure 44:
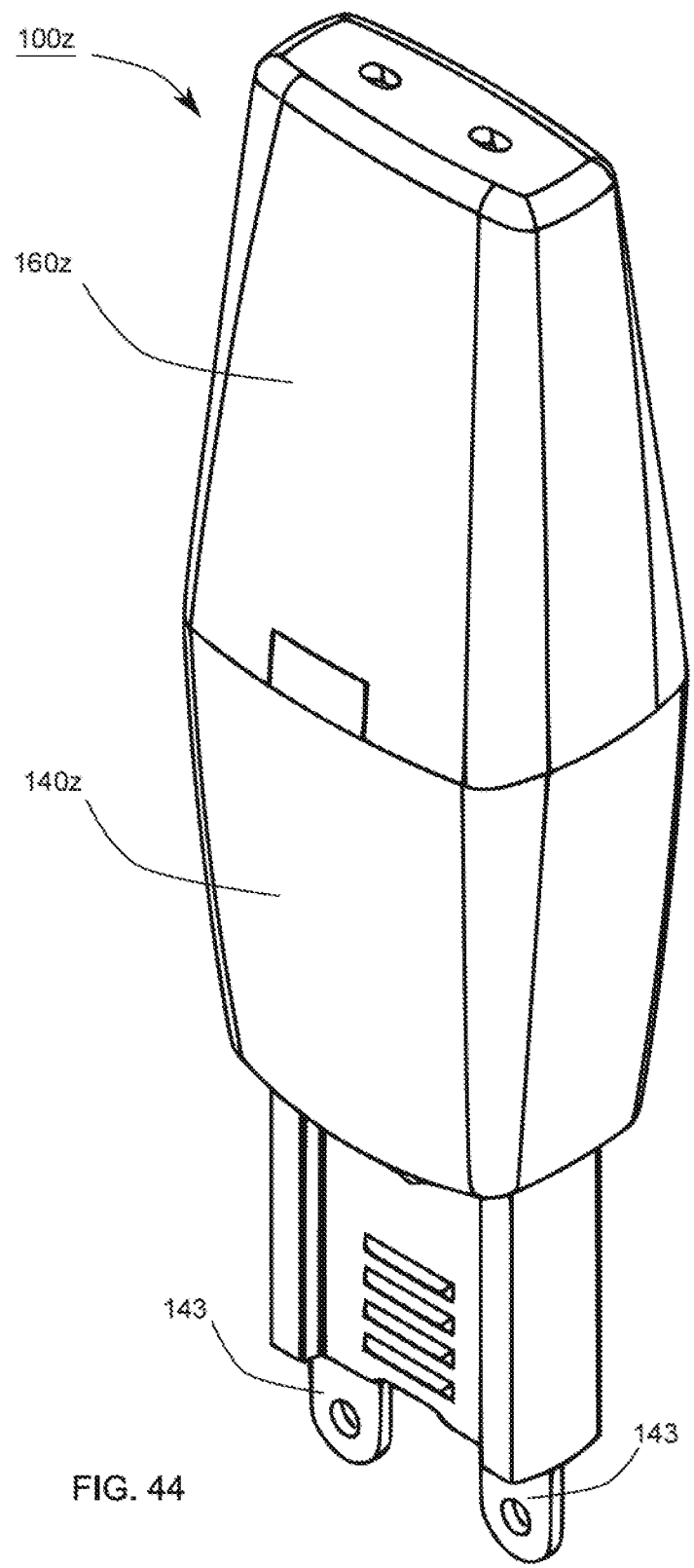
FIG. 44 shows another LED bulb.
Figure 45:
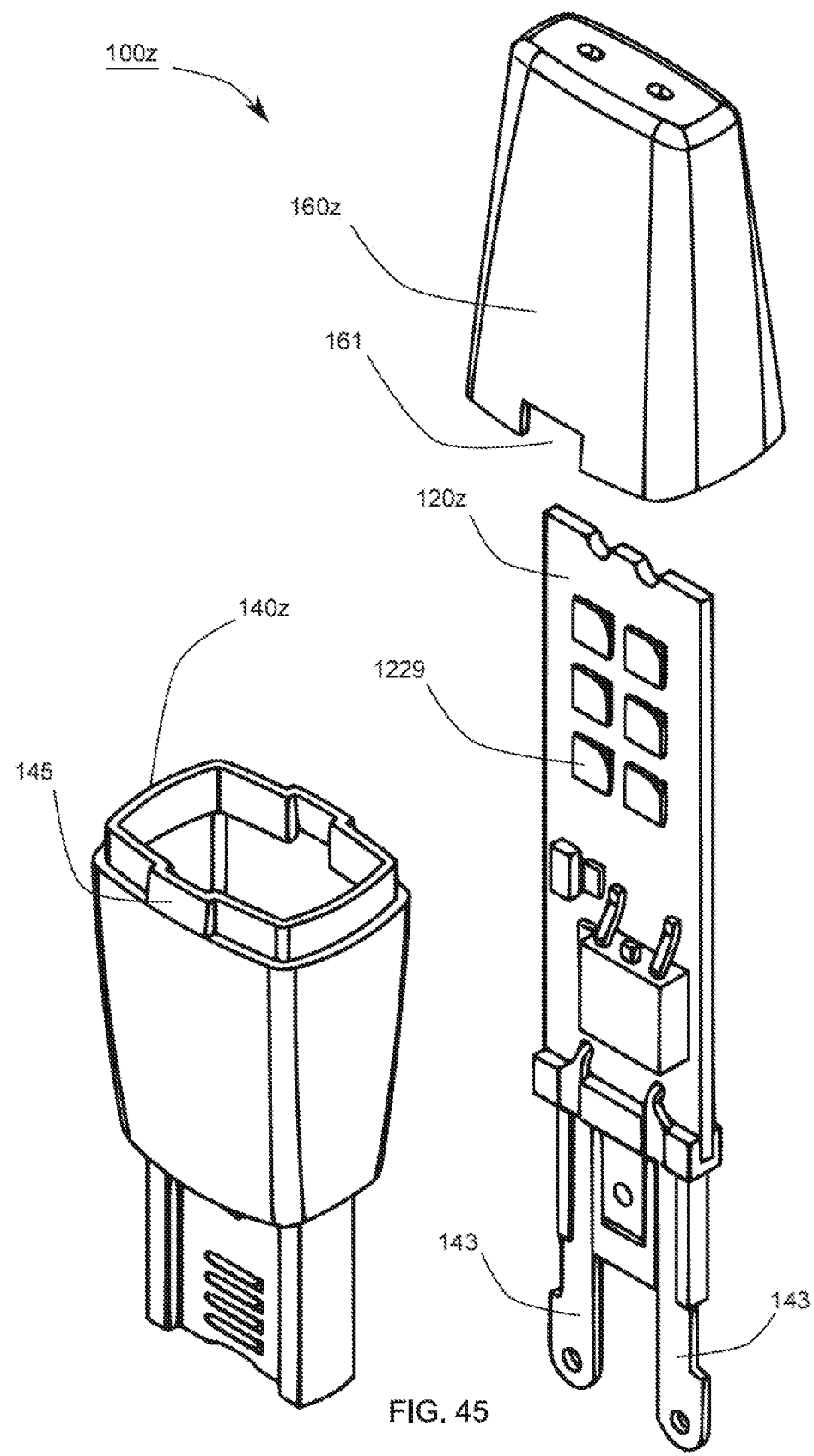
FIG. 45 shows an exploded view of LED bulb shown in FIG. 44.

FIG. 44 shows an LED bulb 100z disclosed in the embodiments in accordance with the present disclosure and FIG. 45 shows an exploded view of the LED bulb 100z. LED bulb 100z is a LED bulb. LED bulb 100z is similar to LED bulb 100y. Although the translucent top cap 160z is different in appearance from the translucent top cap 160y, the translucent top cap 160z is also integrally formed and also has a pen-cap shape structure. When the transparent top cap 160z is buckled on the base 140z, the transparent top cap 160z can cover the light source assembly 120z, so as to prevent dust from falling onto the LED 1229 of the light source assembly 120z. In this embodiment, pins 143 can meet the standard of G9 bulb. In another embodiment, the height of the notch 161 under the transparent top cap 160z may be greater than the height of the protrusion 145 of the base 140z. Therefore, a gap is formed when the transparent top cap 160z is buckled with the base 140z, so that the heat generated by the light source assembly 120z can be exchanged with air in the external environment through the gap and the temperatures of the light source assembly 120z are reduced.

Figure 46B:
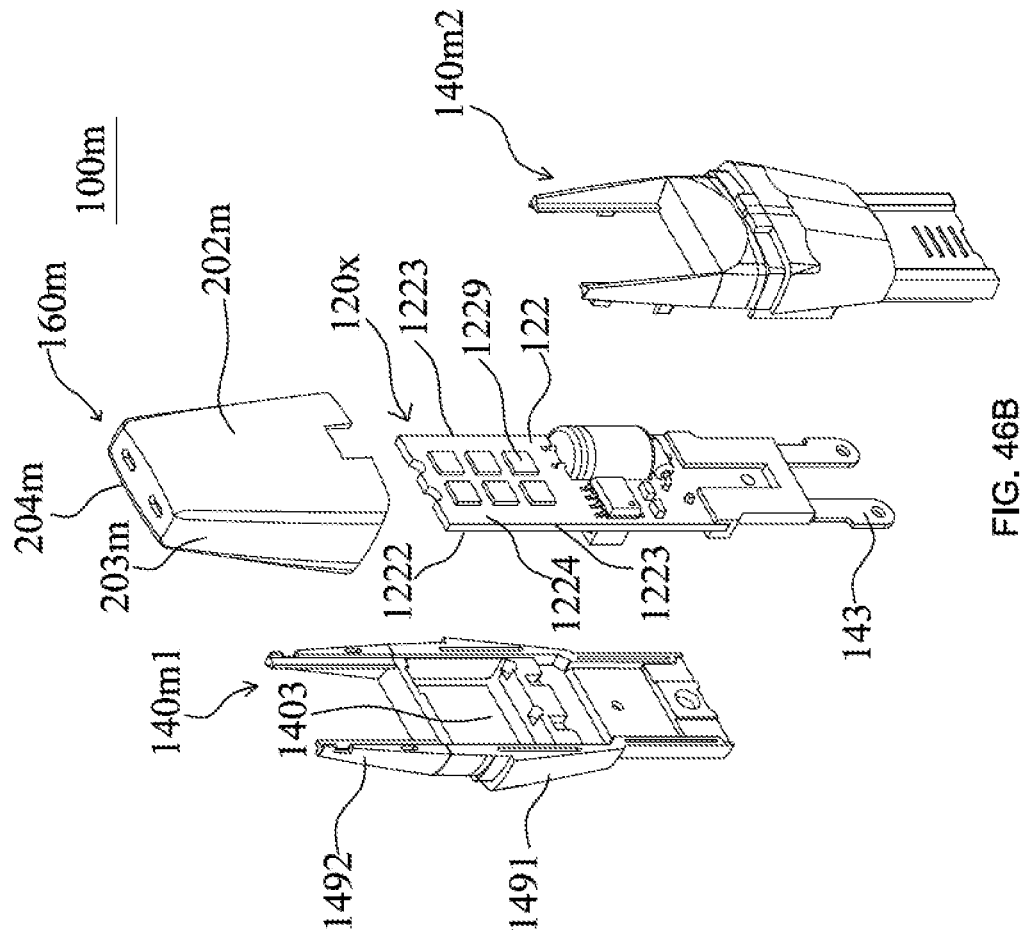
FIG. 46B shows an exploded view of LED bulb shown in FIG. 46A.
Figure 46A:
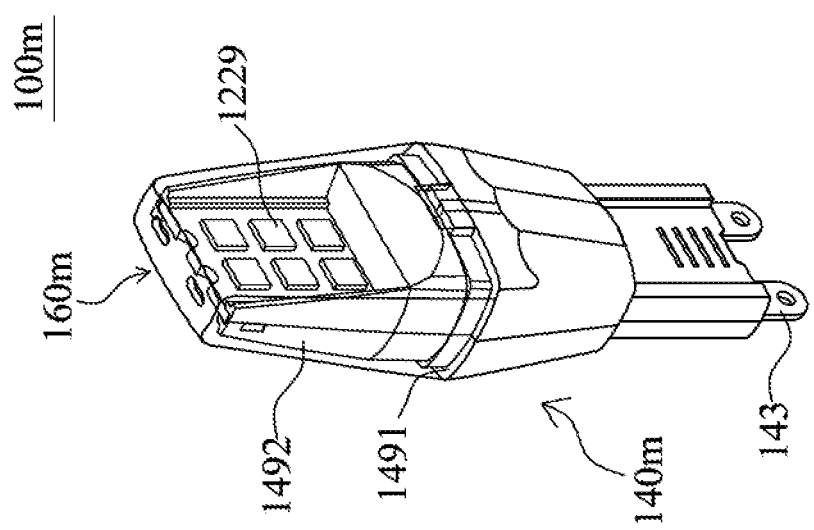
FIG. 46A shows another LED bulb.

FIG. 46A shows an LED bulb 100m disclosed in accordance with the present disclosure. FIG. 46B shows an exploded view of the LED bulb 100m. The LED bulb 100m includes a transparent top cap 160m, a light source assembly 120x, a base 140m, and pins 143. For the sake of clarity, in FIG. 46A, it is drawn in a transparent drawing. Therefore, the light source assembly 120x is visible. However, in actual products, the light source assembly 120x cannot be seen through the transparent top cap 160m. The light source assembly 120x includes a PCB circuit board 122 as a carrier plate. The PCB circuit board 122 has a front surface 1222, a back surface 1224, and two side surfaces 1223, on which LEDs 1229 are set respectively. A plurality of electronic parts is also set on the PCB circuit board 122. The transparent top cap 160m covers and surrounds the light source assembly 120x and a portion of the base 140m.

The base 140m includes a first base portion 140m1 and a second base portion 140m2. The first base portion 140m1 has a first part 1491 covering the electronic parts, and a second part 1492. The second part 1492 extends upward (positive z-direction) from the first part 1491 and has a gradual width. The gradual width is smaller and smaller from the direction of the first part 1491 toward the second part 1492 (positive z-direction). Moreover, the second part 1492 covers and directly contacts the side surfaces 1223. The structure of the second base portion 140m2 is substantially the same or similar with the first base portion 140m1, and the first base portion 140m1 and the second base portion 140m2 are symmetrical to each other with respect to the light source assembly 120x. In one embodiment, the second part 1492 may have a portion that does not directly contact the side surfaces 1223 due to a process deviation. Therefore, an air gap exists between the second part 1492 and the side surfaces 1223. Optionally, a thermal paste (not shown) can be filled into the air gap to replace the air as the conductive medium to further increase the thermal conductivity of the PCB circuit board 1222 and the base 140m.

The transparent top cap 160m includes two extending portions 202m and 204m, and two side portions 203m extending between the two extending portions 202m and 204m. The two extending portions 202m and 204m respectively cover the front surface 1222 and the back surface 1224 of the PCB circuit board 122 but do not directly contact the LED s 1229. The side portions 203m covers the second part 1492 and directly contacts the first base portion 140m1 and the second base portion 140m2.

Figure 47:
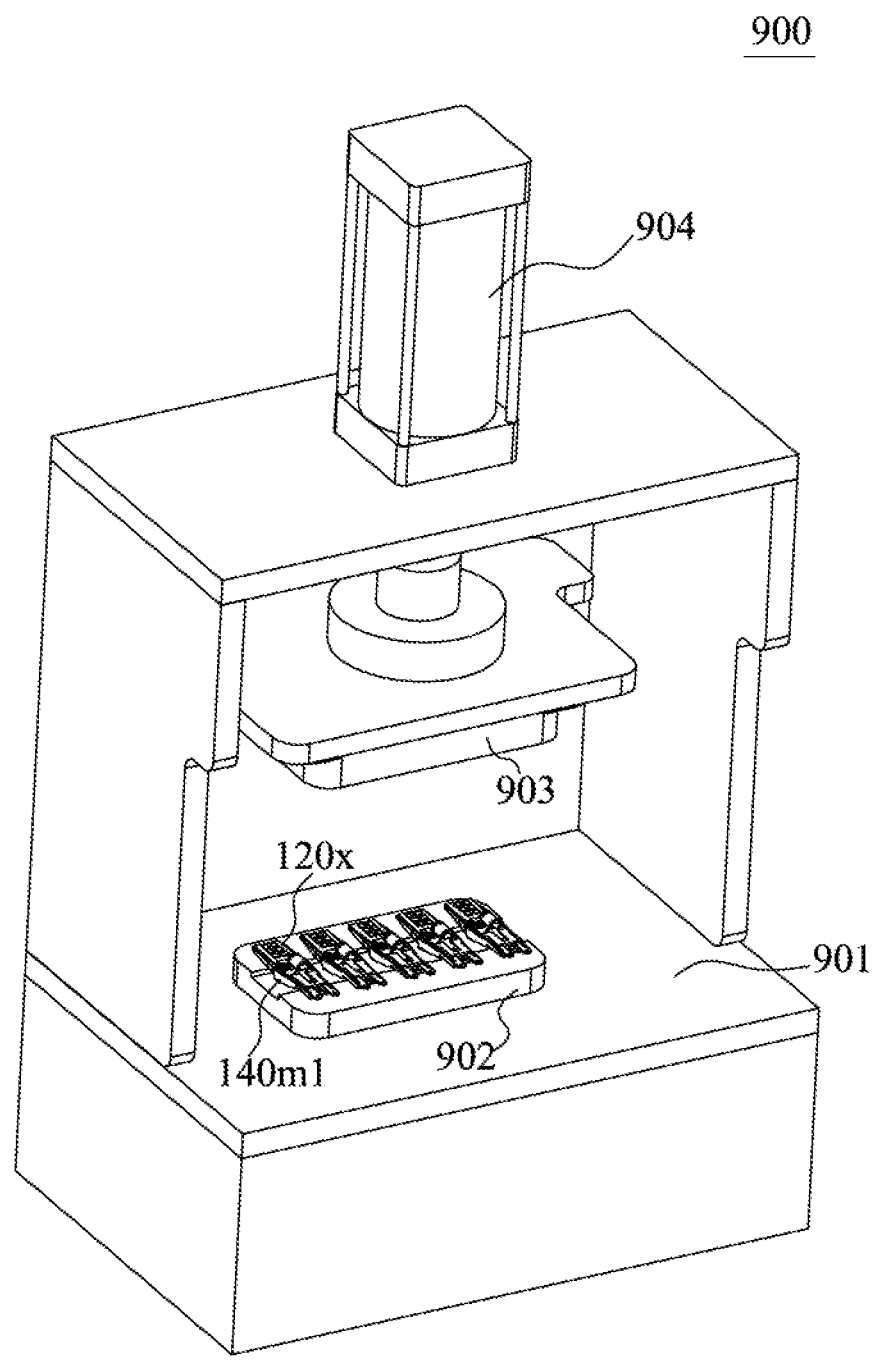
FIG. 47 shows a jig.

FIG. 47 shows a jig 900 to make an LED bulb 100m. The jig 900 includes a stage 901, a lower mold 902 having a plurality of cavities (with five cavities as an example), an upper mold 903 corresponding to the lower mold, and a pneumatic portion 904. Different from FIG. 40, in this embodiment, the base is not integrally formed by the injection molding process, but the two-part components are formed and then assembled by the jig 900.

In detail, the first base portion 140m1 and the second base portion 140m2 can be respectively formed by molding. A first base portion 140m1 is disposed in the cavity of the lower mold 902 and coated with a thermal paste (not shown) on the inner surface 1403 (as shown in FIG. 46B). Next, the light source assembly 120x is disposed on the first base portion 140m1. After the inner surface of the second base portion 140m2 (not shown) is coated with the thermal paste and the adhesive, the second base portion 140m2 is disposed on the light source assembly 120x. The pneumatic portion 904 is activated to press the upper mold 903 downward (at this time, the lower mold 902 is fixed), whereby the first base portion 140m1, the light source assembly 120x, and the second base portion 140m2 are adhered to each other. Finally, the transparent top cap 160m1 is assembled to complete the LED bulb 100m.

In addition to adhering the first base portion 140m1 and the second base portion 140m2 with adhesive, the first base portion 140m1 and the second base portion 140m2 may also be designed to have a buckle, so that the first base portion 140m1 and the second base portion 140m2 can be quickly assembled and disassembled. For example, the buckle of the first base portion 140m1 and the second base portion 140m2 may include a snap-fit connection. Moreover, when the first base portion 140m1 and the second base portion 140m2 are damaged, the user can replace the part by oneself.

In the production of base by the injection molding process of FIG. 40, the light source assembly 120x needs to be placed in the mold, and then the plastic material be filled into the mold. If the process conditions are not set well, there will be LED and/or electronic parts shift, poor appearance of the base and other issues, thereby reducing the yield. In the manufacturing process of the LED bulb 100m, the structure of the base 140m for covering the light source assembly 120x is made by assembly rather than the mold, so that the above problems can be avoided, thereby improving the manufacturing yield.

The above descriptions are merely preferred embodiments of the present disclosure, and all equivalent changes and modifications according to the scope of the claims of the present disclosure shall be within the scope of the present disclosure.

What is claimed is:

1. A lighting bulb, comprising:
a light source assembly, including:
a carrier plate, having a first surface and a second surface;
a first plurality of light-emitting units mounted on the first surface; and
a second plurality of light-emitting units mounted on the second surface;
a base for fixing the carrier plate, thereby the first surface faced to a first direction and the second surface faced to a second direction, the first direction opposite to the second direction; and
a transparent top cap having an inner surface facing a third direction perpendicular to the first and second directions, the first and second plurality of light-emitting units located between the transparent top cap and the base, wherein the transparent top cap refracts or scatters the light emitted from the first and second plurality of light-emitting units,
wherein the transparent top cap is not overlapped over the first plurality of light-emitting units in the first direction and the second plurality of light-emitting units in the second direction.

2. The lighting bulb of claim 1, wherein each of the first plurality of light-emitting units mainly emits light in the first direction; each of the second plurality of light-emitting units mainly emits light in the second direction.

3. The lighting bulb of claim 1, wherein none of the first plurality of light-emitting units has the third direction as a main illumination direction.

4. The lighting bulb of claim 1, wherein the first and second plurality of light-emitting units are surface mounted LED.

5. The lighting bulb of claim 1, wherein the base includes two side frames and the carrier plate is fixed between the two side frames.

6. The lighting bulb of claim 5, wherein the base includes a bottom body, the side frames and the bottom body are integrally formed.

7. The lighting bulb of claim 1, wherein the transparent top cap includes a plurality of micro-lens areas and each of the plurality of micro-lens areas includes a plurality of recessed optical structures.

8. The lighting bulb of claim 1, wherein the first plurality of light-emitting units form a light emitting area on the first surface; the light emitting area has a light emitting center; the transparent top cap has a first side; a radiation angle is defined by the first side, the light emitting center and the first direction; the radiation angle is not greater than 67 degrees.

9. The lighting bulb of claim 1, wherein the base is made of thermal conductive plastic.

10. The lighting bulb of claim 1, wherein the base includes a plurality of pins.

11. The lighting bulb of claim 1, wherein the carrier plate is a PCB circuit board.

12. The lighting bulb of claim 11, further comprising a light source driving circuit disposed on the PCB circuit board, enclosed by the base, for driving the first and second plurality of light-emitting units.

13. The lighting bulb of claim 12, wherein the light source driving circuit is a single-stage linear driver.

14. The lighting bulb of claim 1, further comprising a first transparent side cover over the first plurality of light-emitting units and a second transparent side cover over the second plurality of light-emitting units.

15. The lighting bulb of claim 14, wherein the first transparent side cover is identical to the second transparent side cover.

16. The lighting bulb of claim 14, wherein the transparent top cap comprises a first latch groove and a second latch groove for fixing the first transparent side cover and the second transparent side respectively.

\* \* \* \* \*